| FLIP FLOP | FF● | FF* | FF* OUT |
|---|---|---|---|
| I | 0V | −6V | "1" |
| II | 0V | −6V | "1" |
| III | 0V | −6V | "1" |
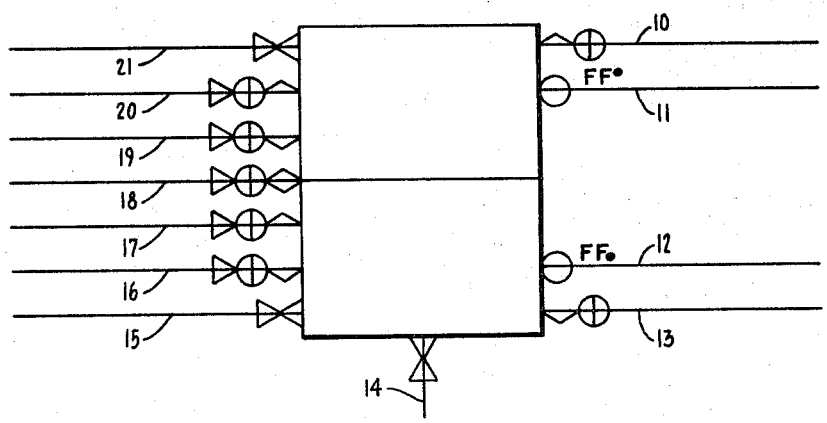
FIG_7
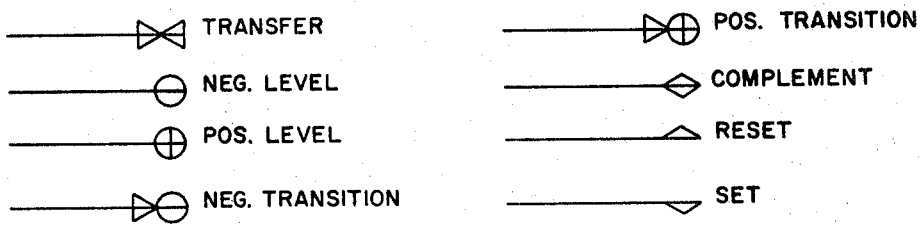
FIG_8
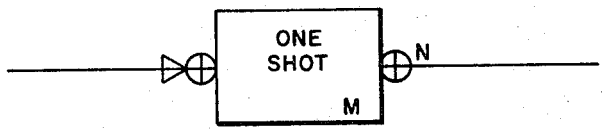
FIG_9

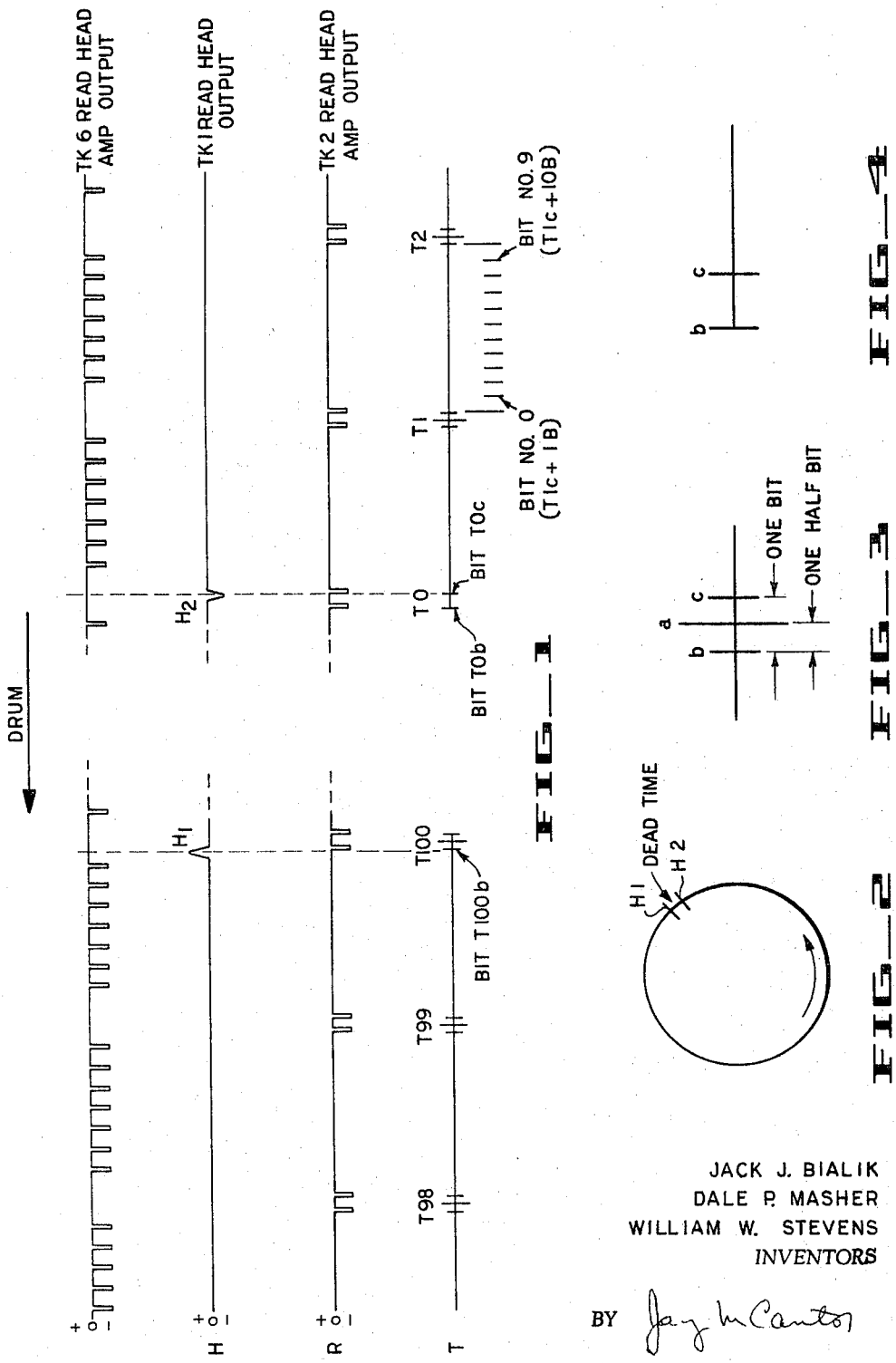

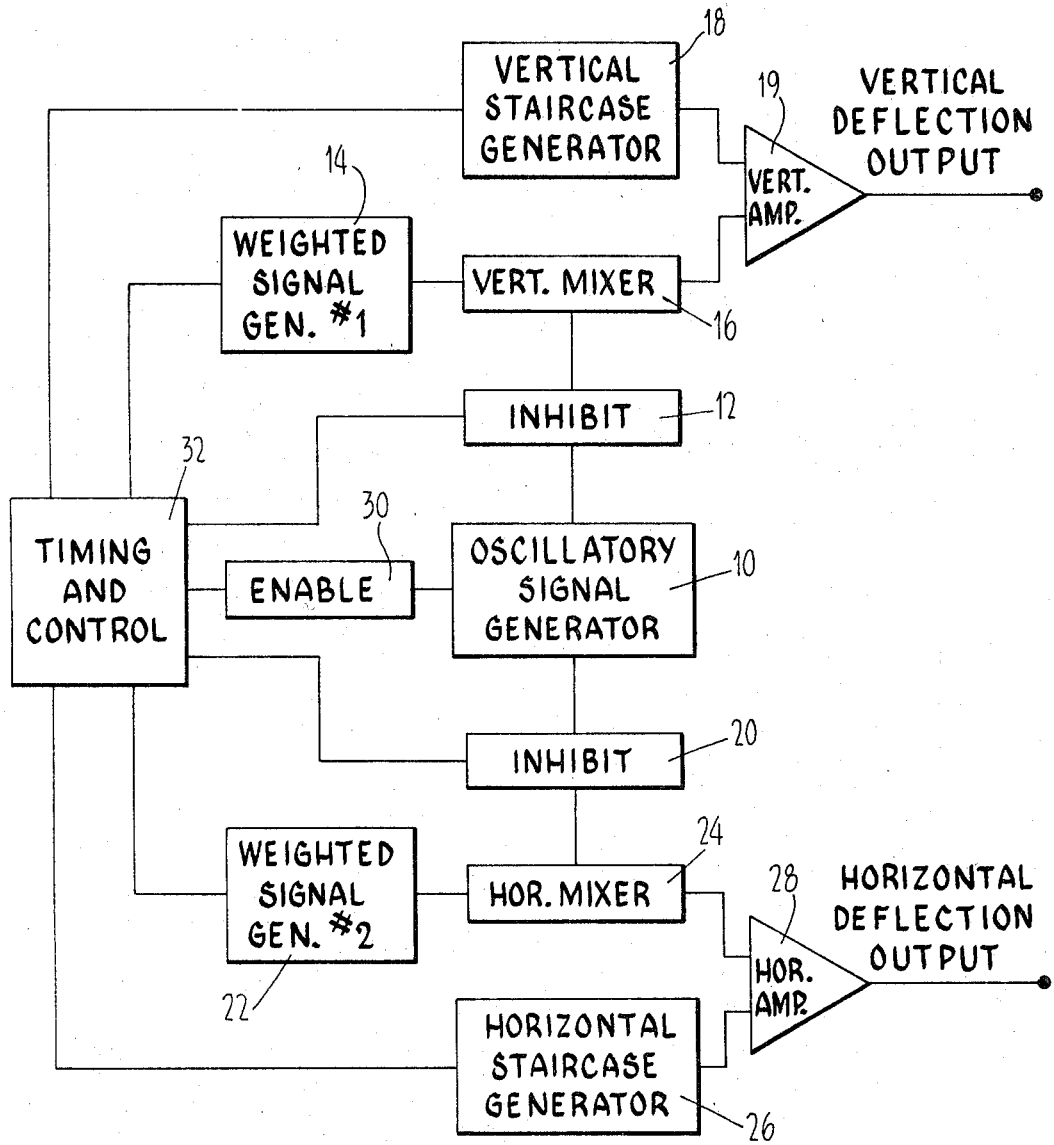

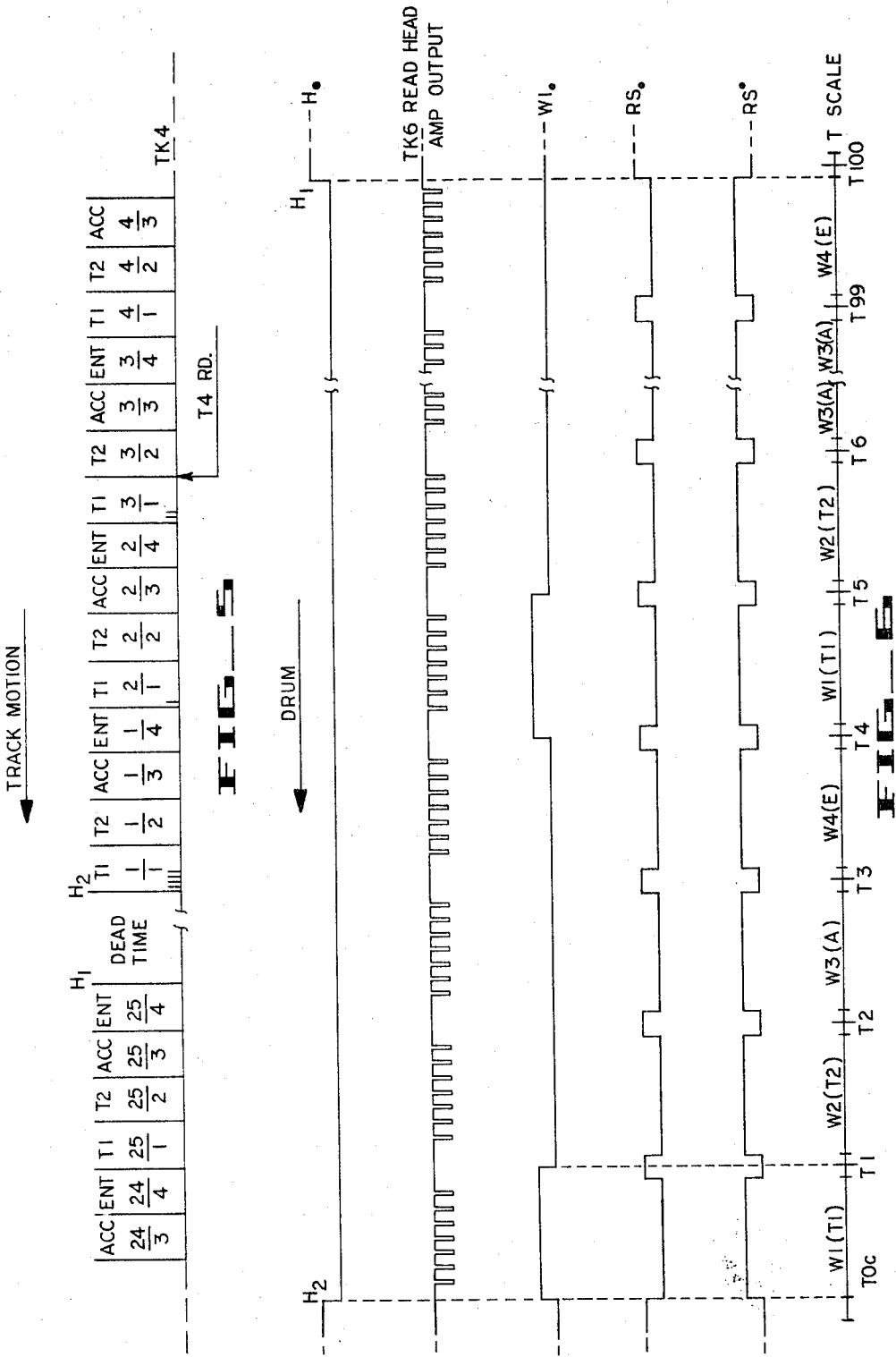

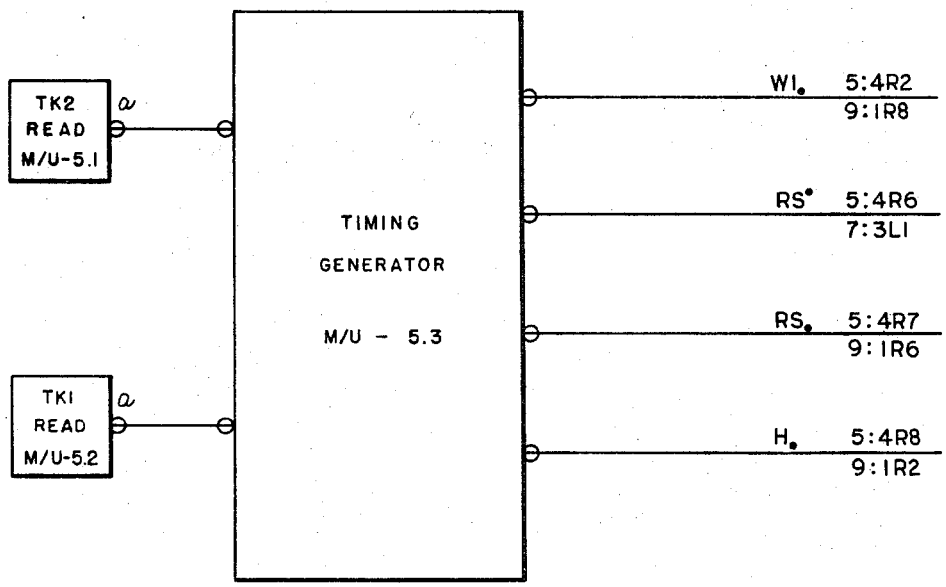
FIG_10 (5:4)

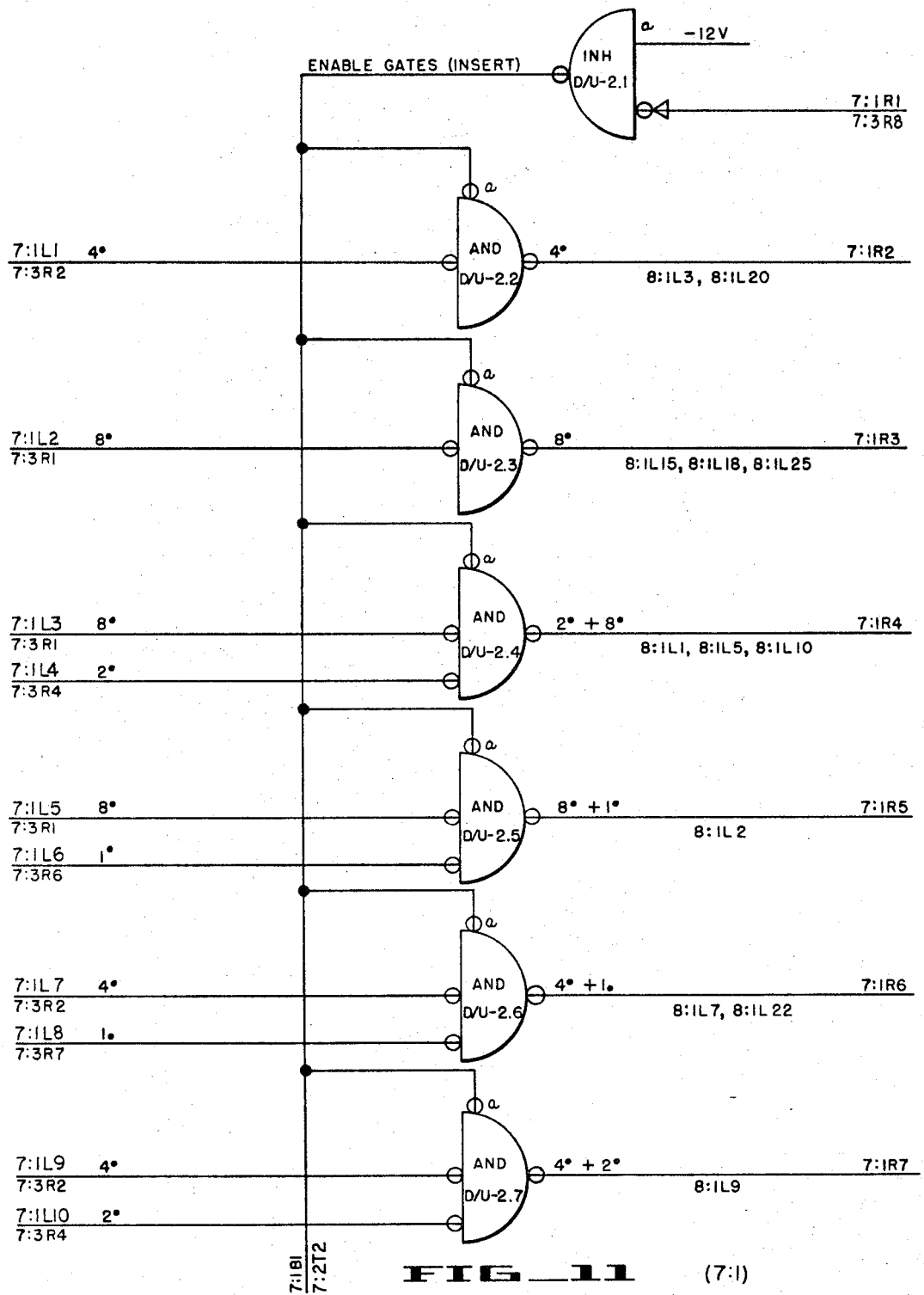
FIG.-11 (7:1)

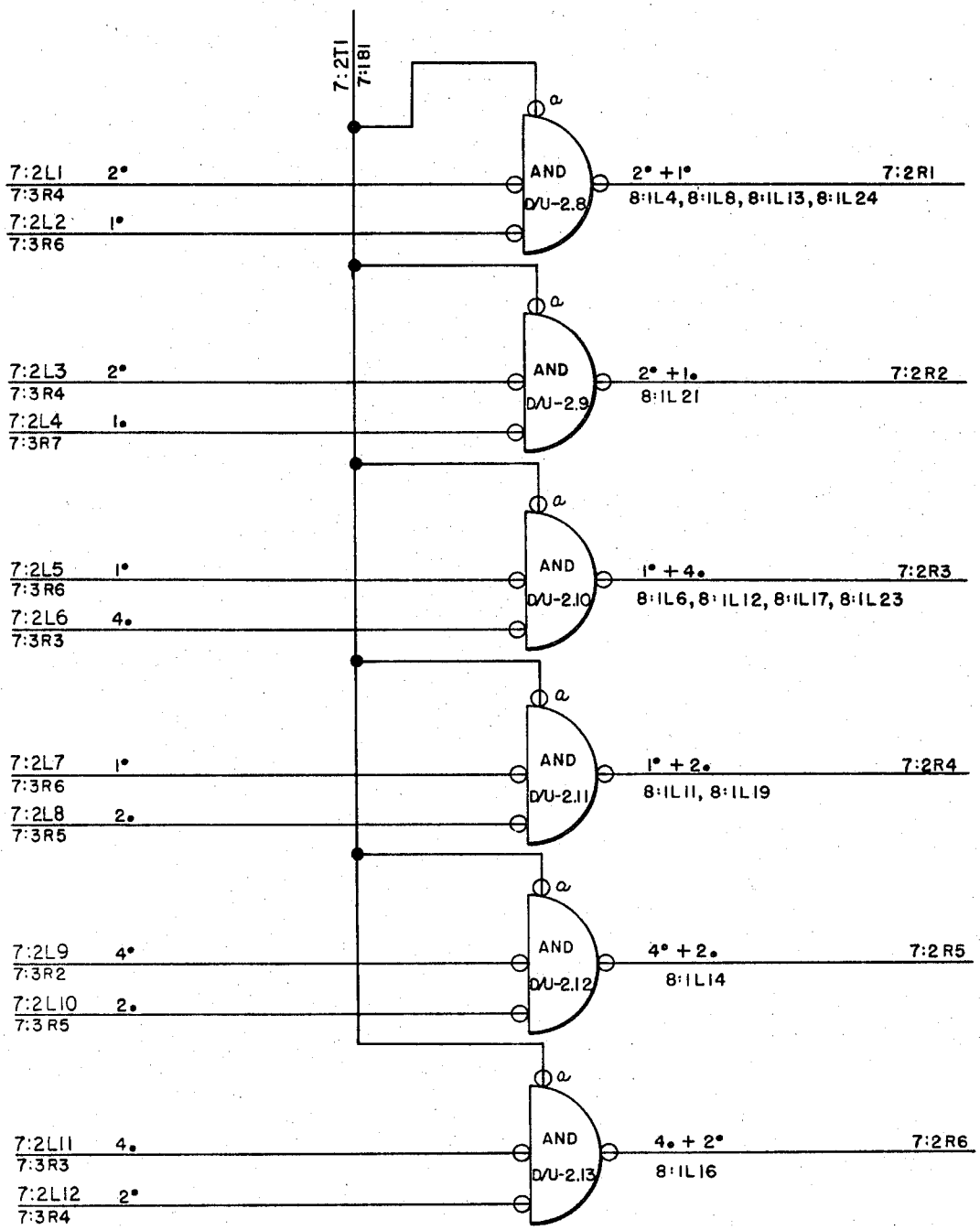
FIG_12  (7:2)

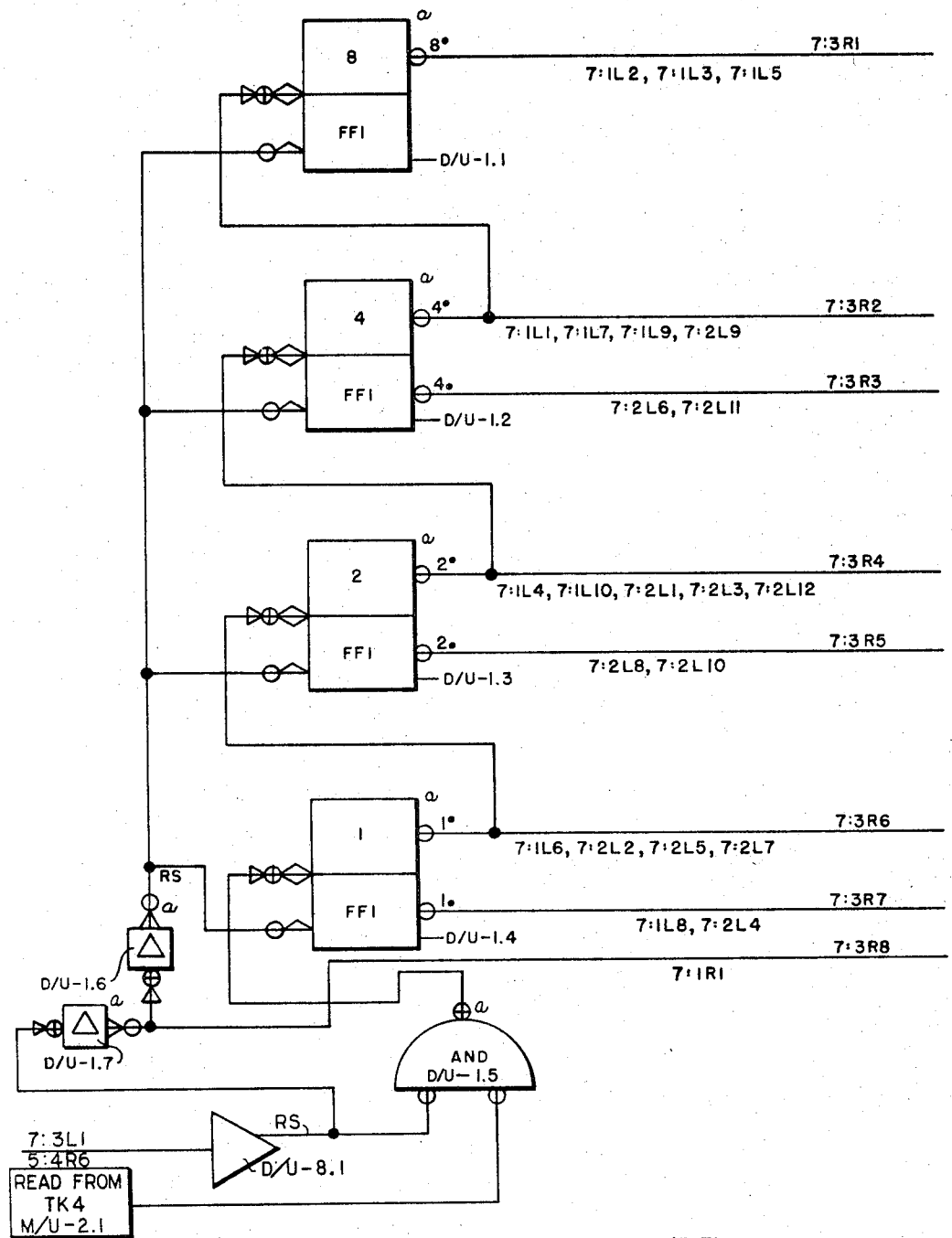
FIG_13 (7:3)

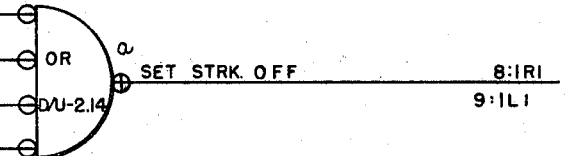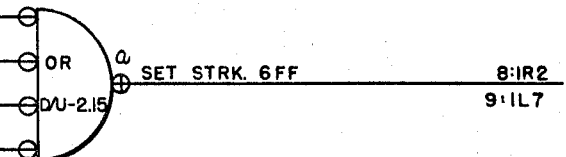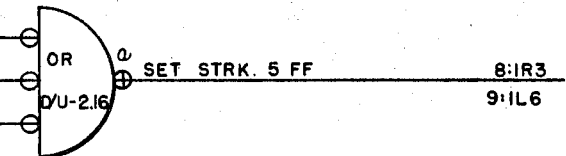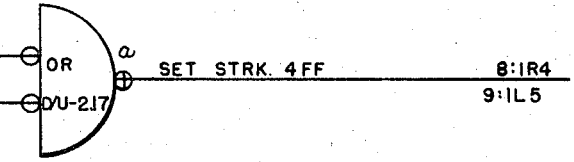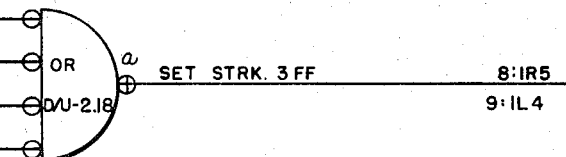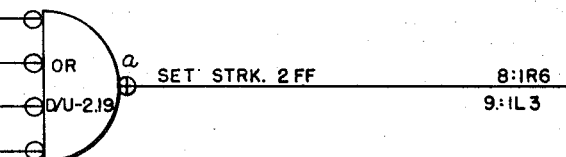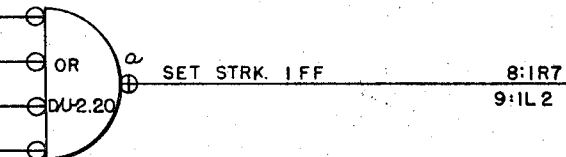
FIG_14 (8:1)

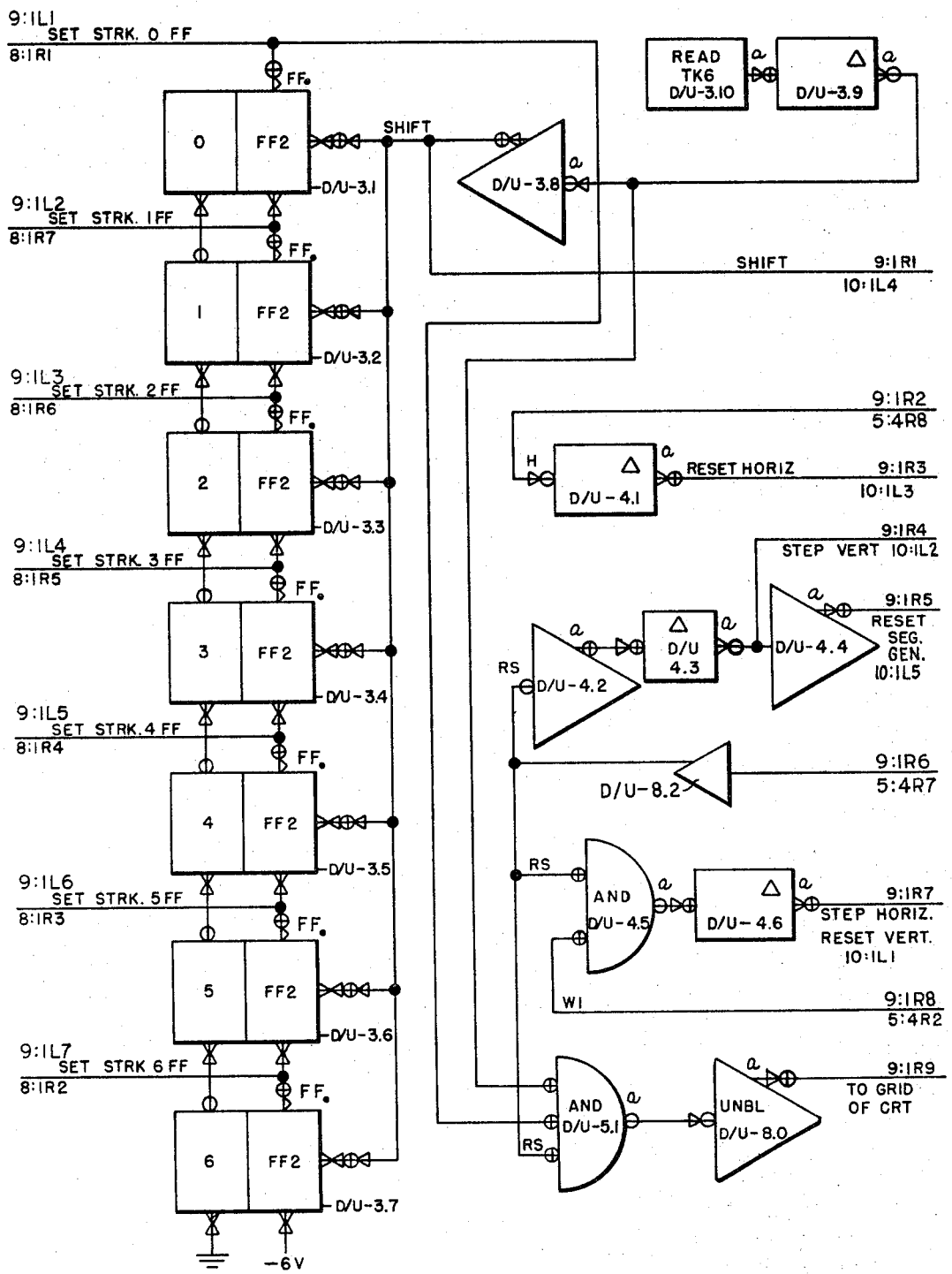
FIG_15 (9:1)

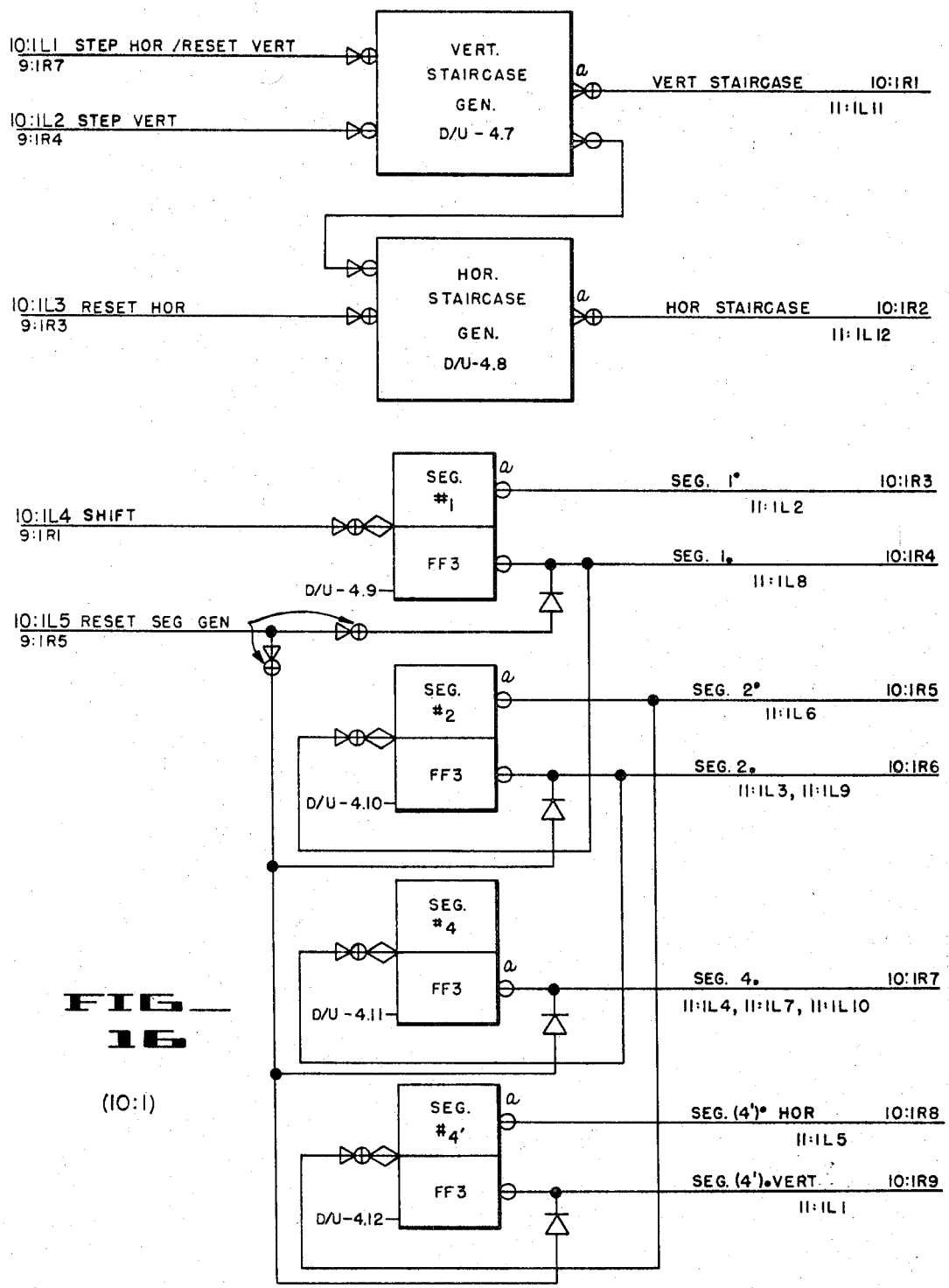
FIG_16

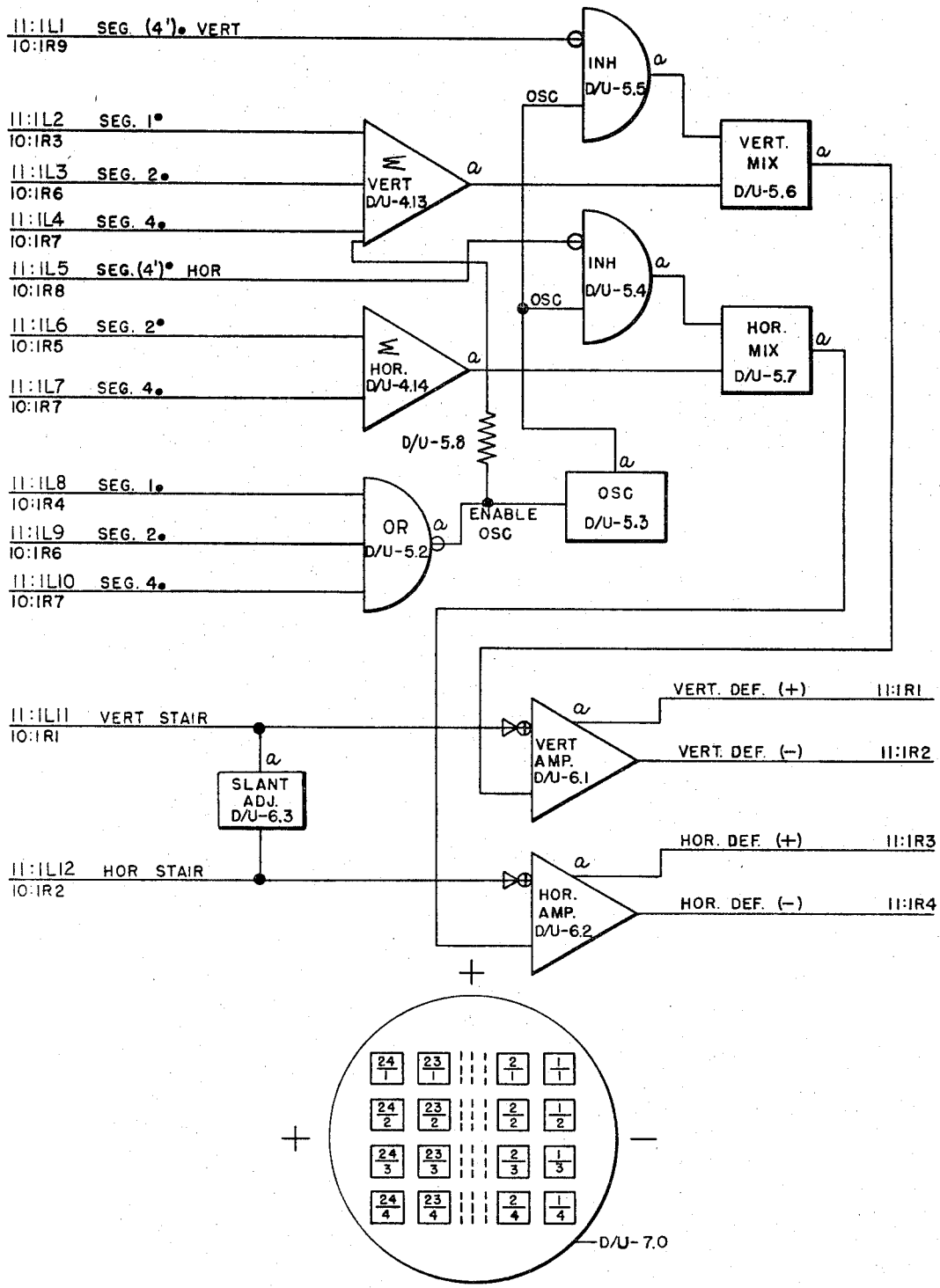
FIG_17

| FLIP FLOP | "0" | "1" | F.F. OUT |
|---|---|---|---|
| I | GND. | -6V | Q |
| II | GND. | -6V | Q |
| III | GND. | -12V | Q |
∼ GND.= POS. VOLTAGE LEVEL
∼ -6VOLTS OR -12VOLTS = NEG.VOLTAGE LEVEL
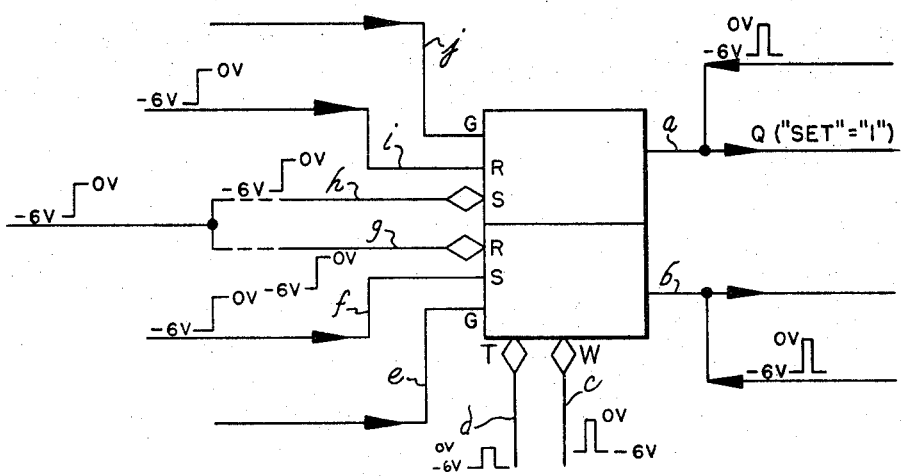
FIG_18
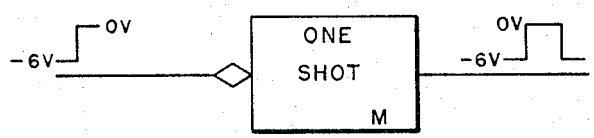
FIG_19

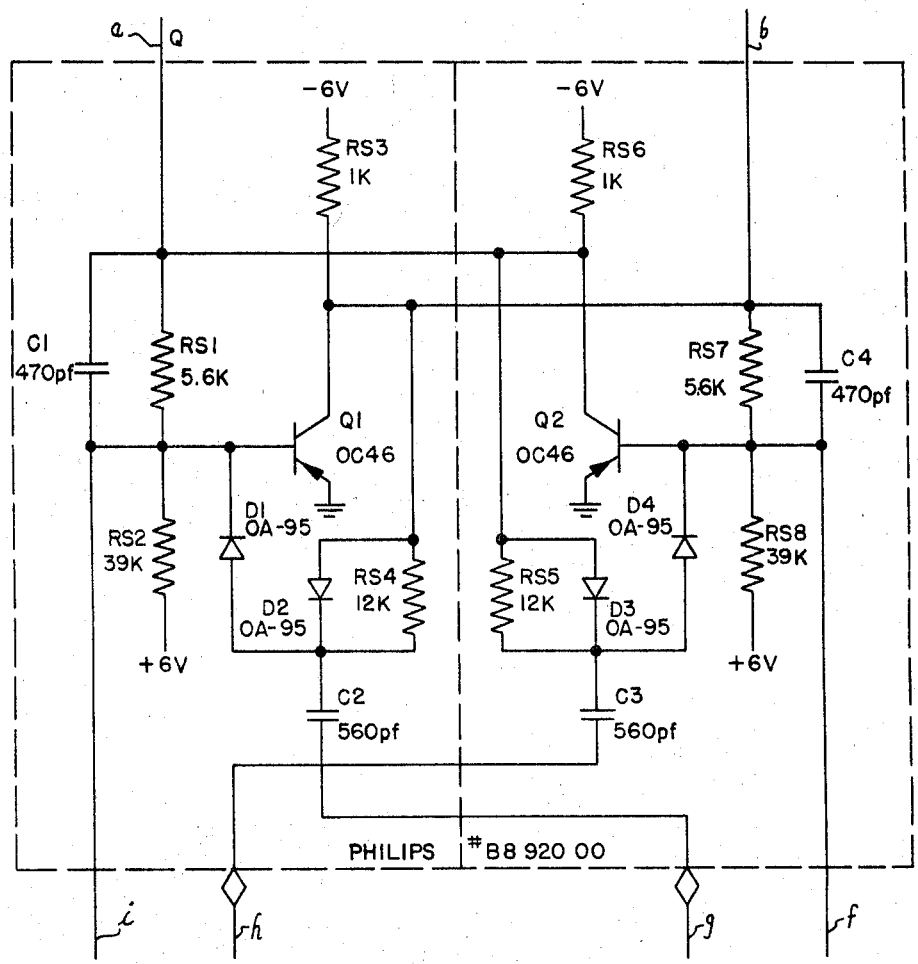
FIG_20
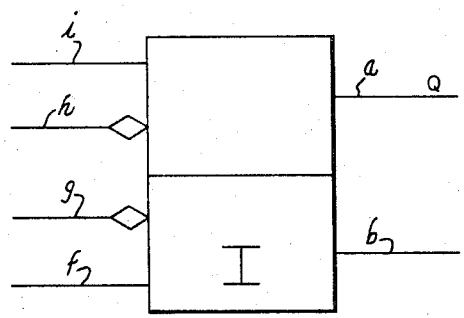
FIG_21

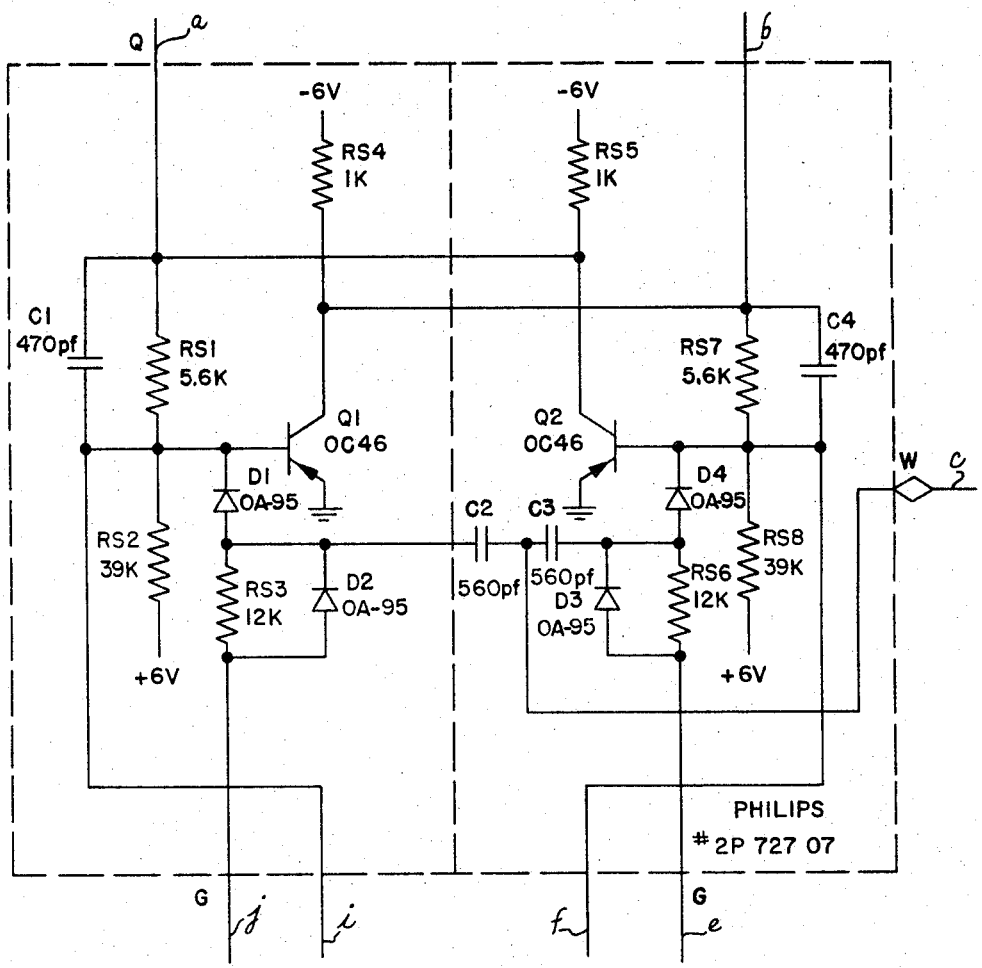
FIG_22
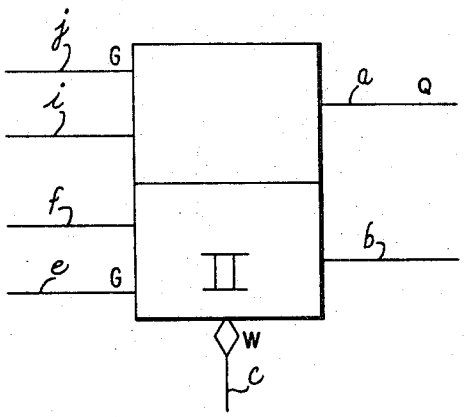
FIG_23

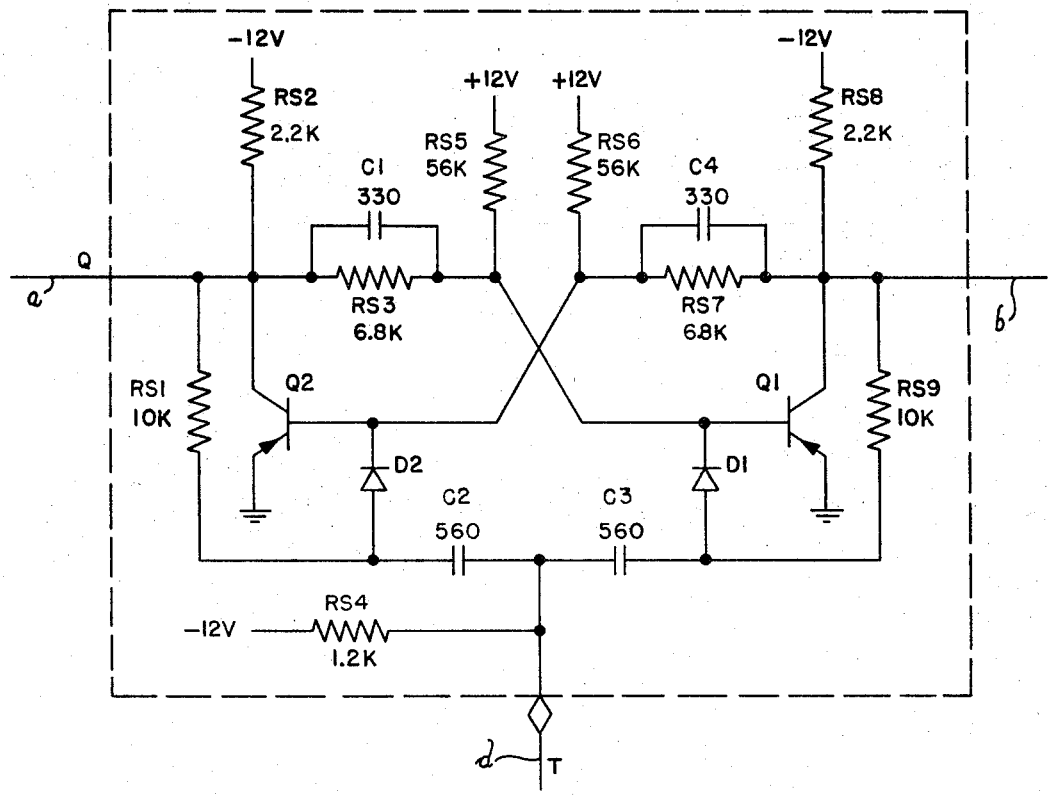
FIG_24
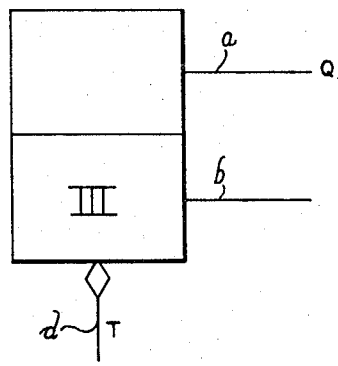
FIG_25

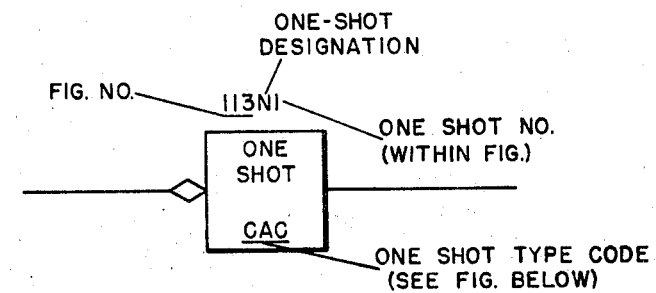
FIG_26
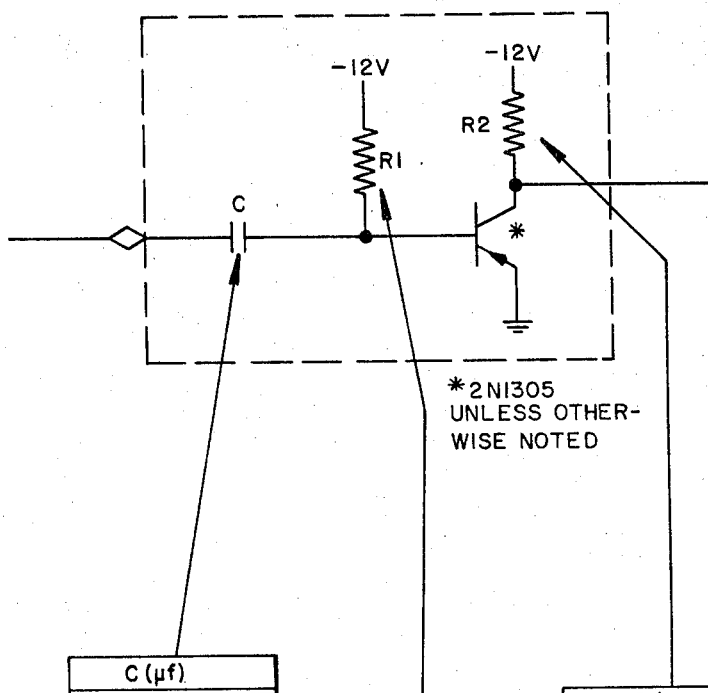
FIG_27

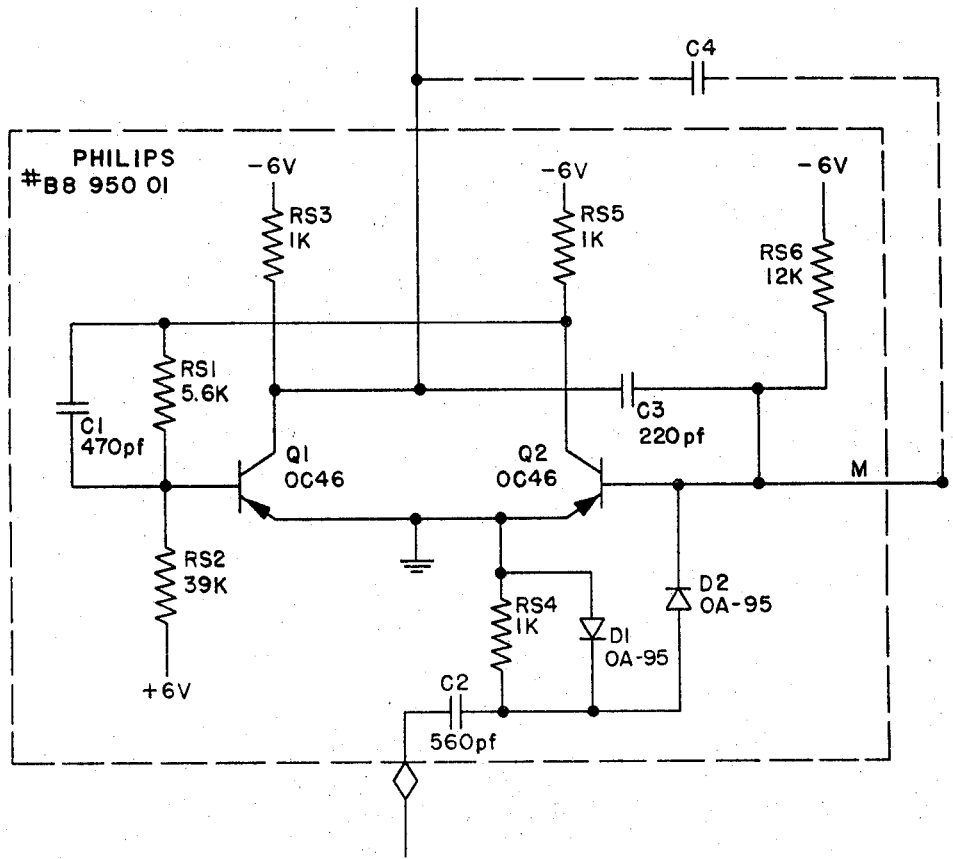
FIG_28
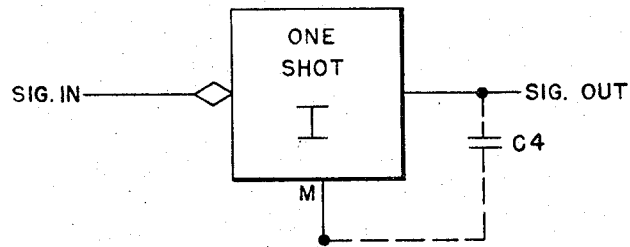
FIG_29

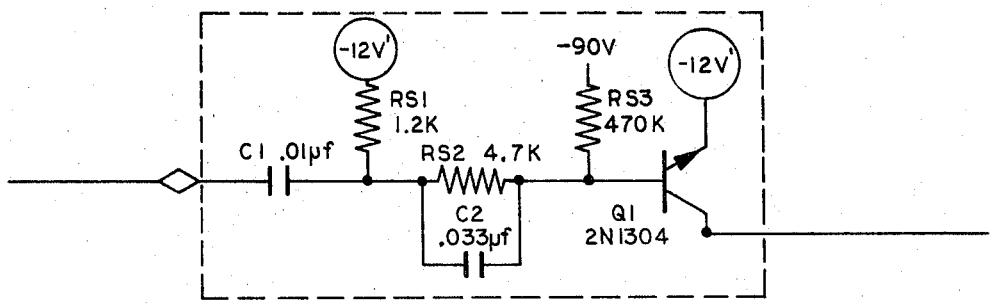
FIG_30
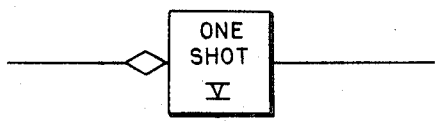
FIG_31
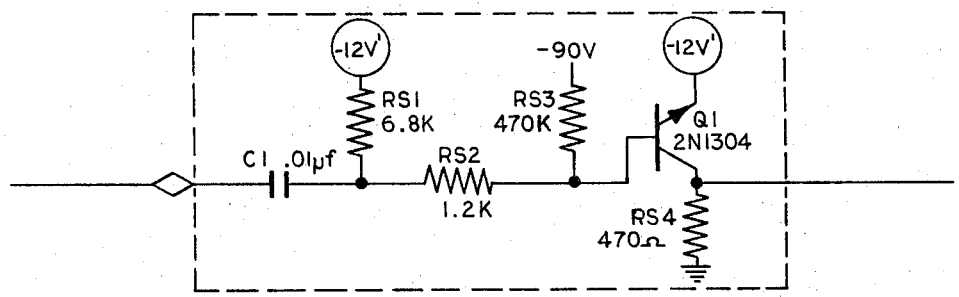
FIG_32
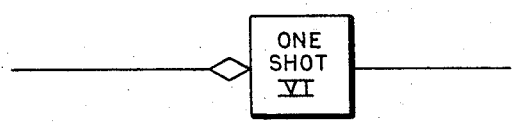
FIG_33

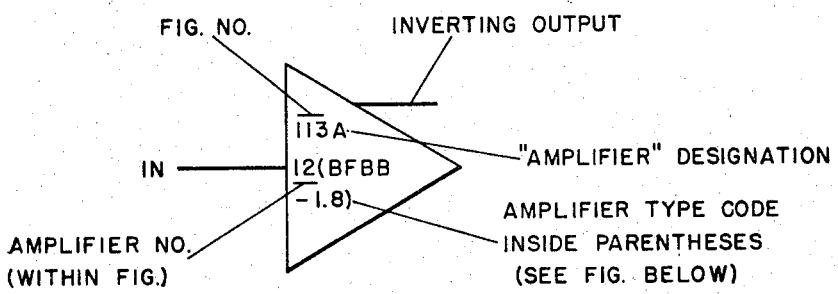
FIG_34
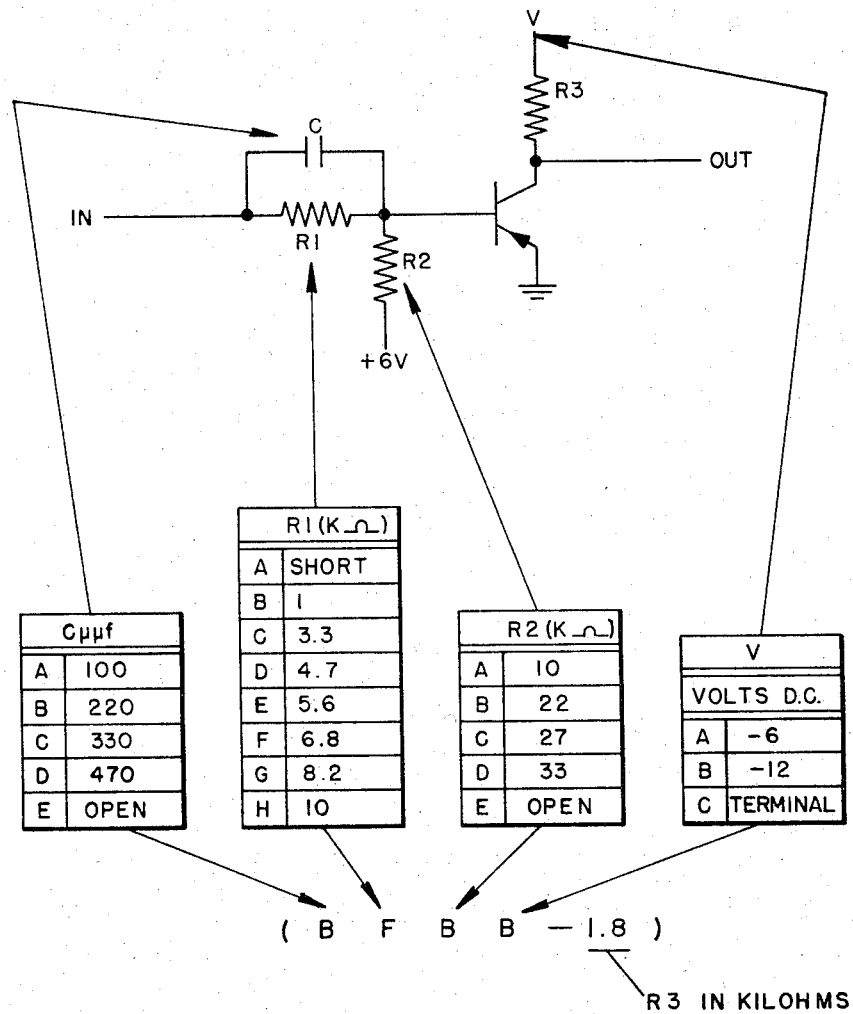
FIG_35

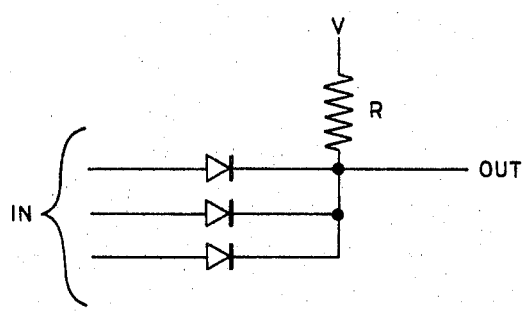
FIG_36
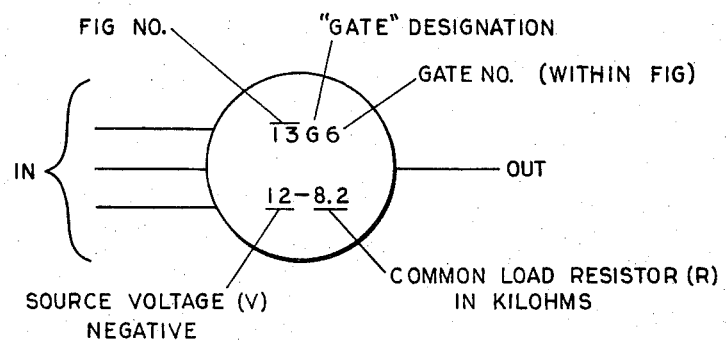
FIG_37

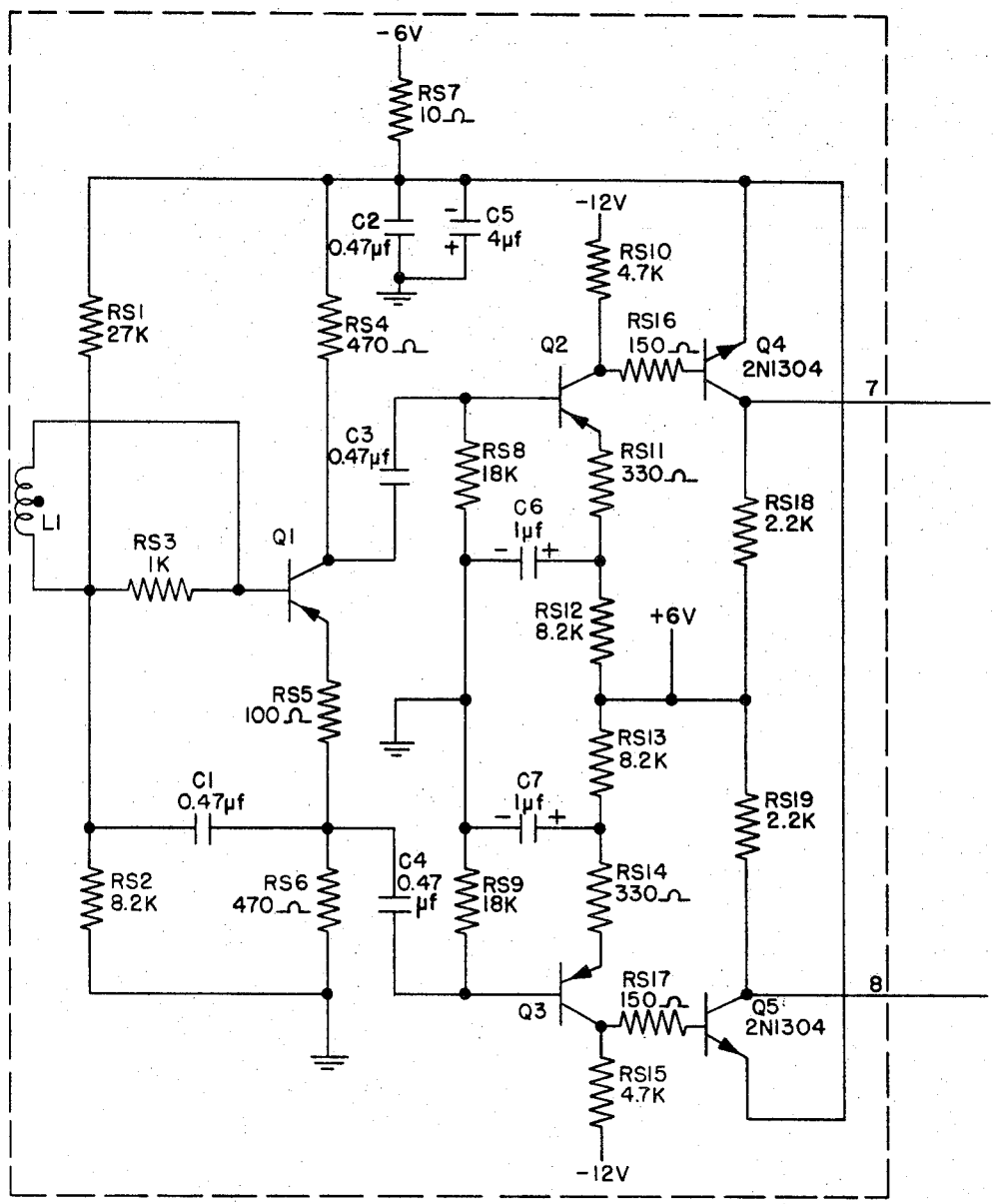
FIG_38
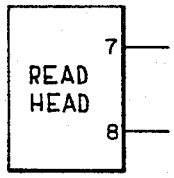
FIG_39

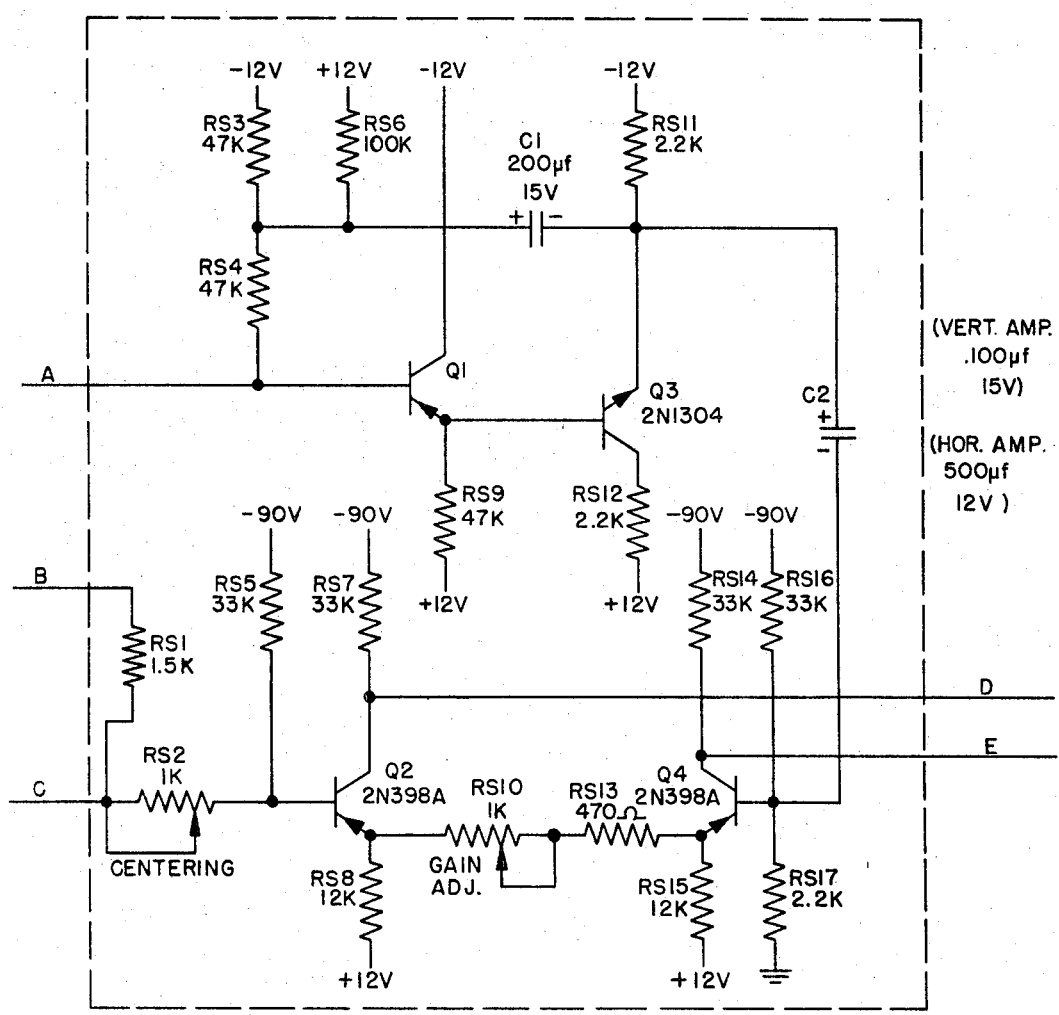
FIG_40
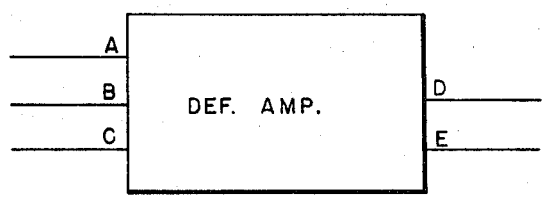
FIG_41

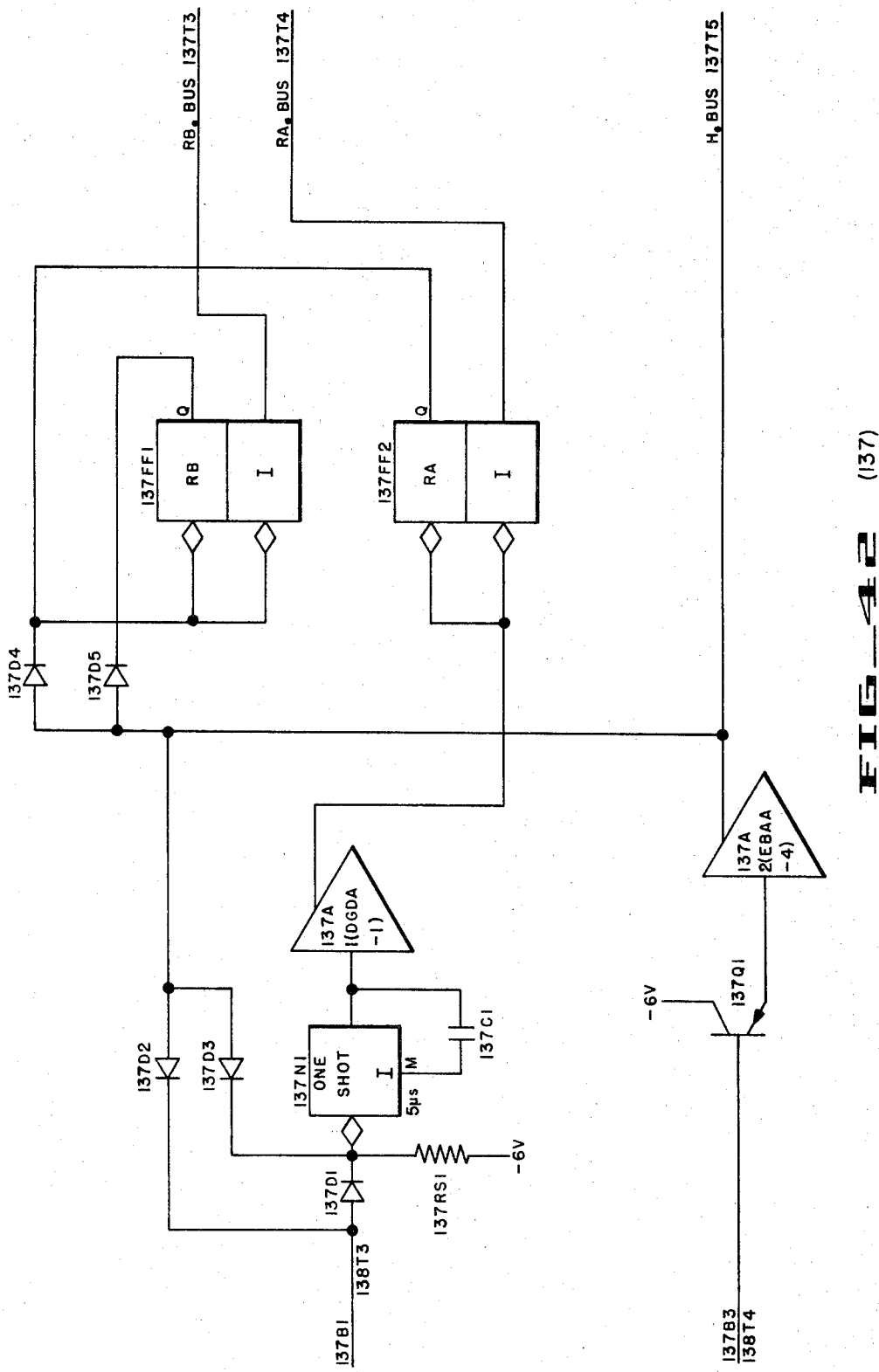
FIG. 42 (137)

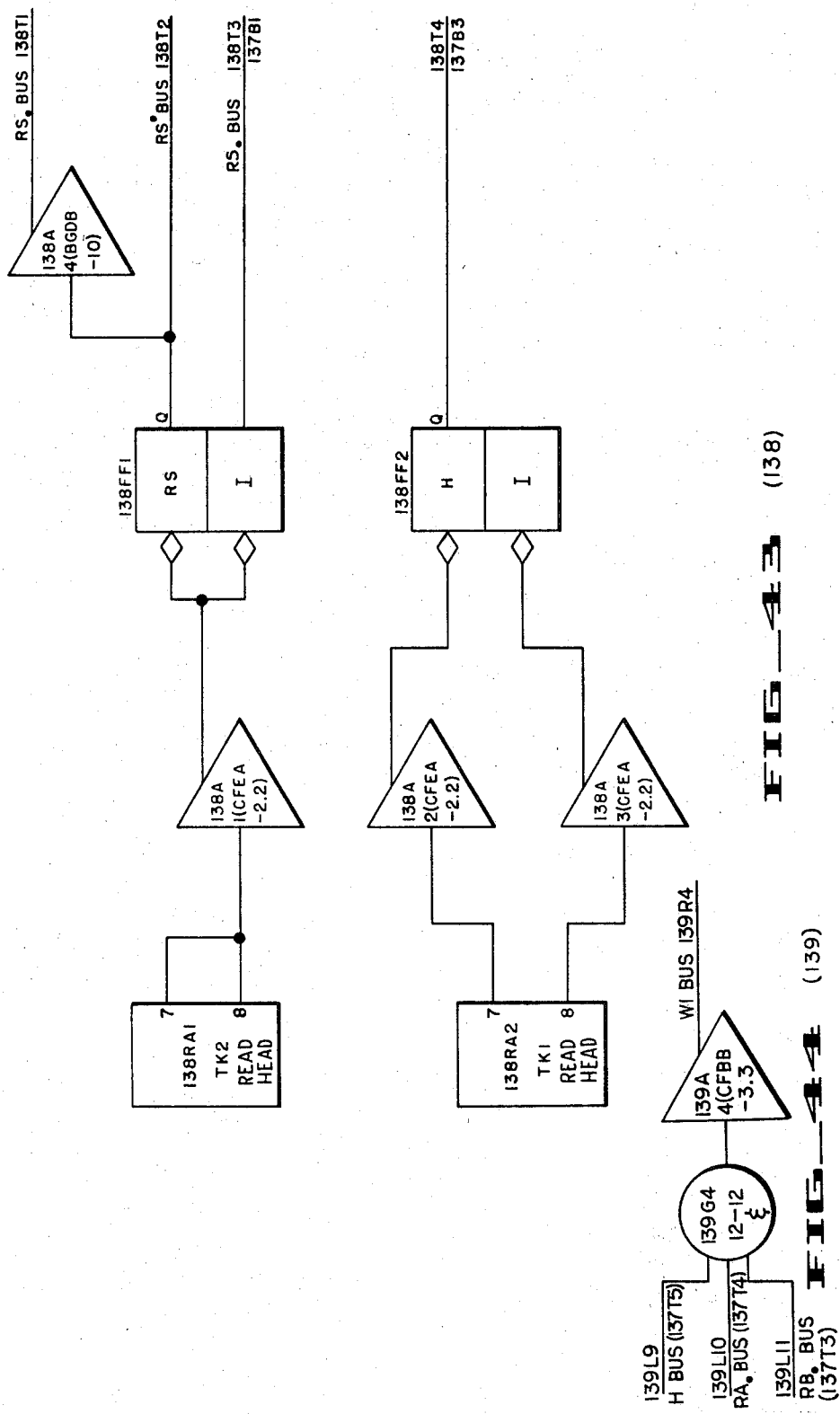

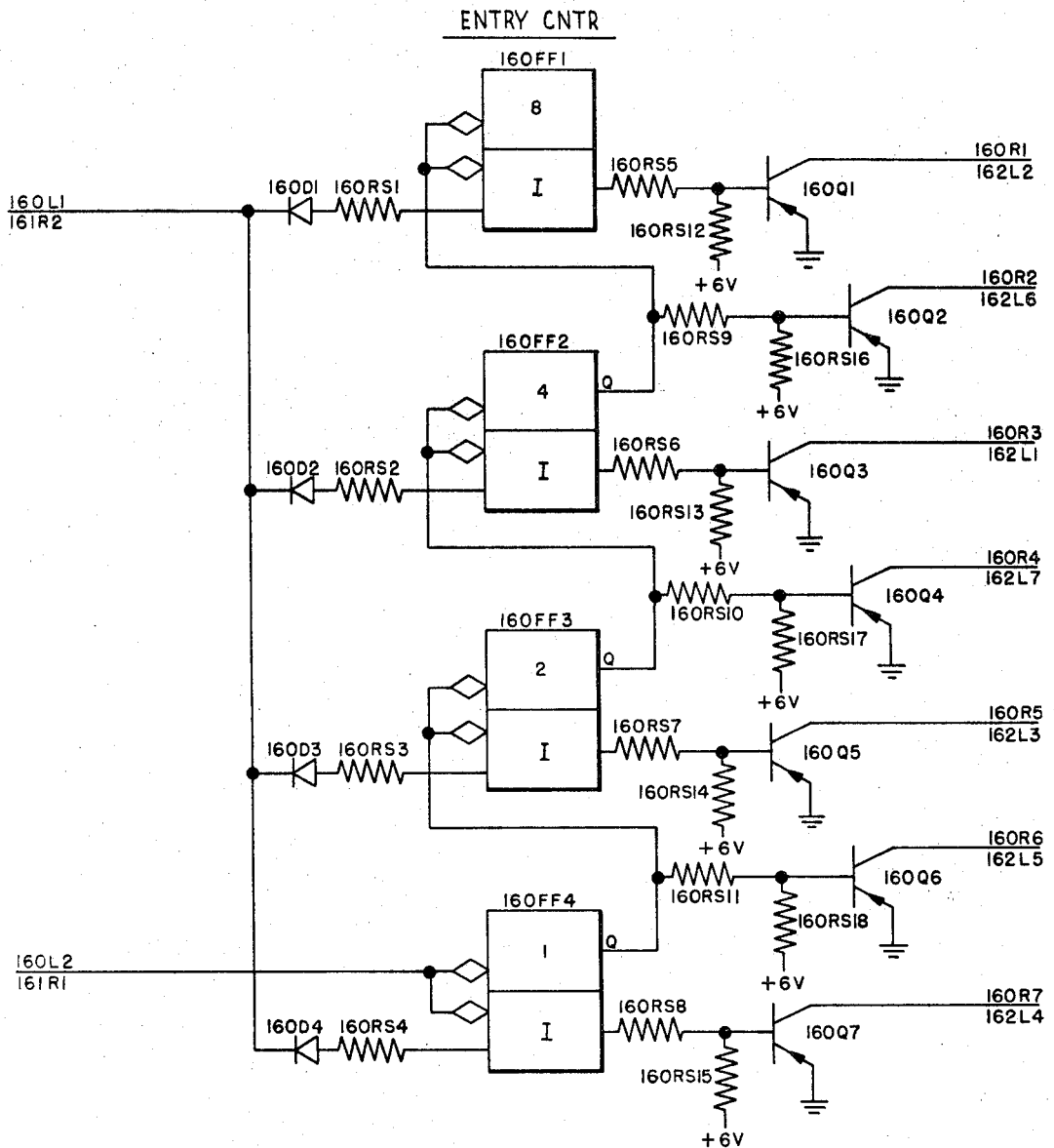
FIG_45 (160)

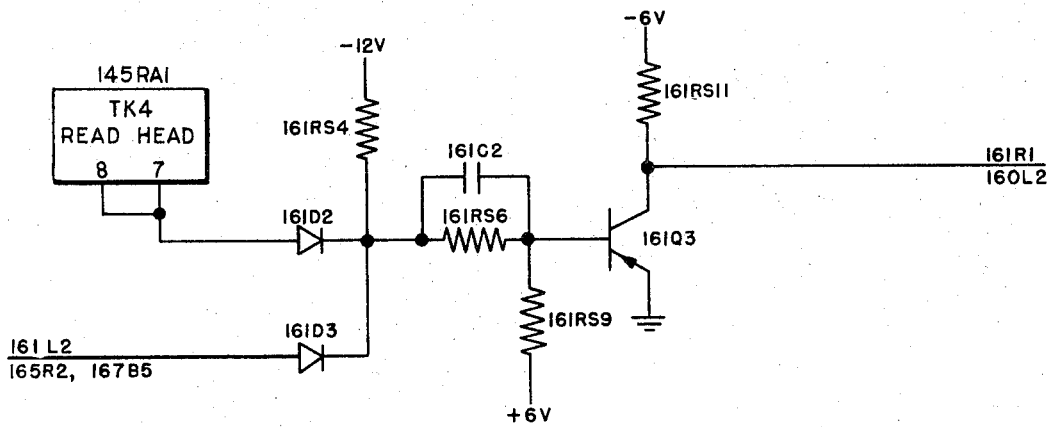
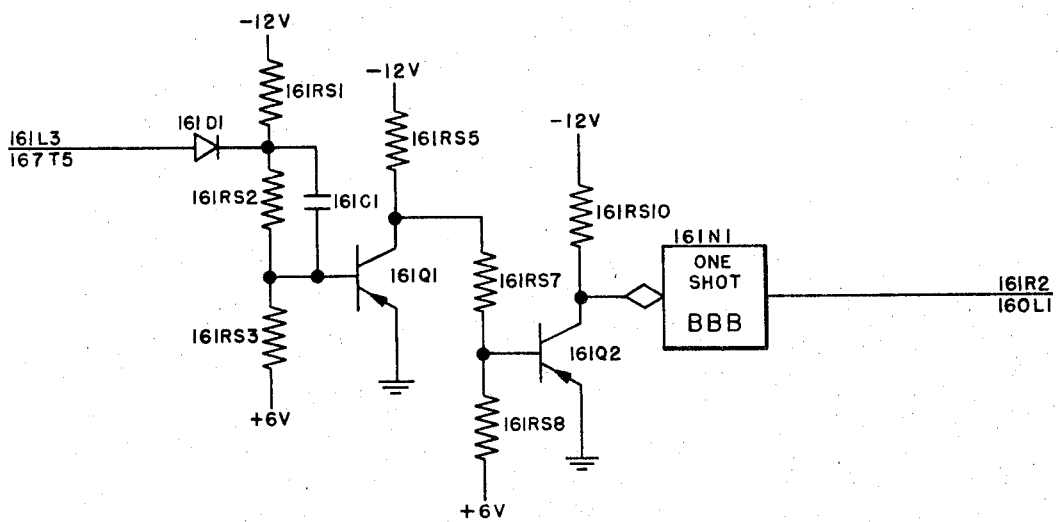
FIG_46 (161)

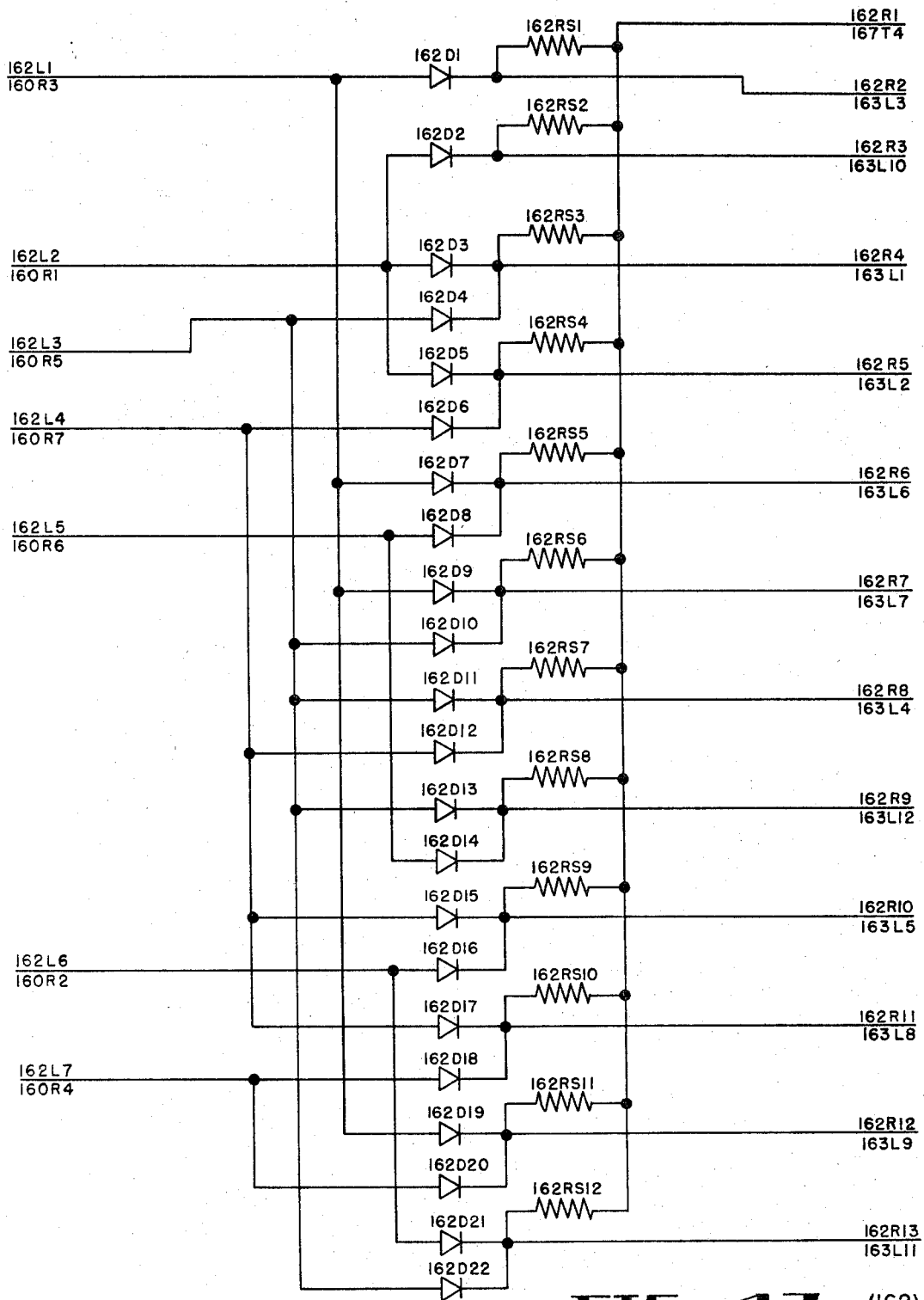

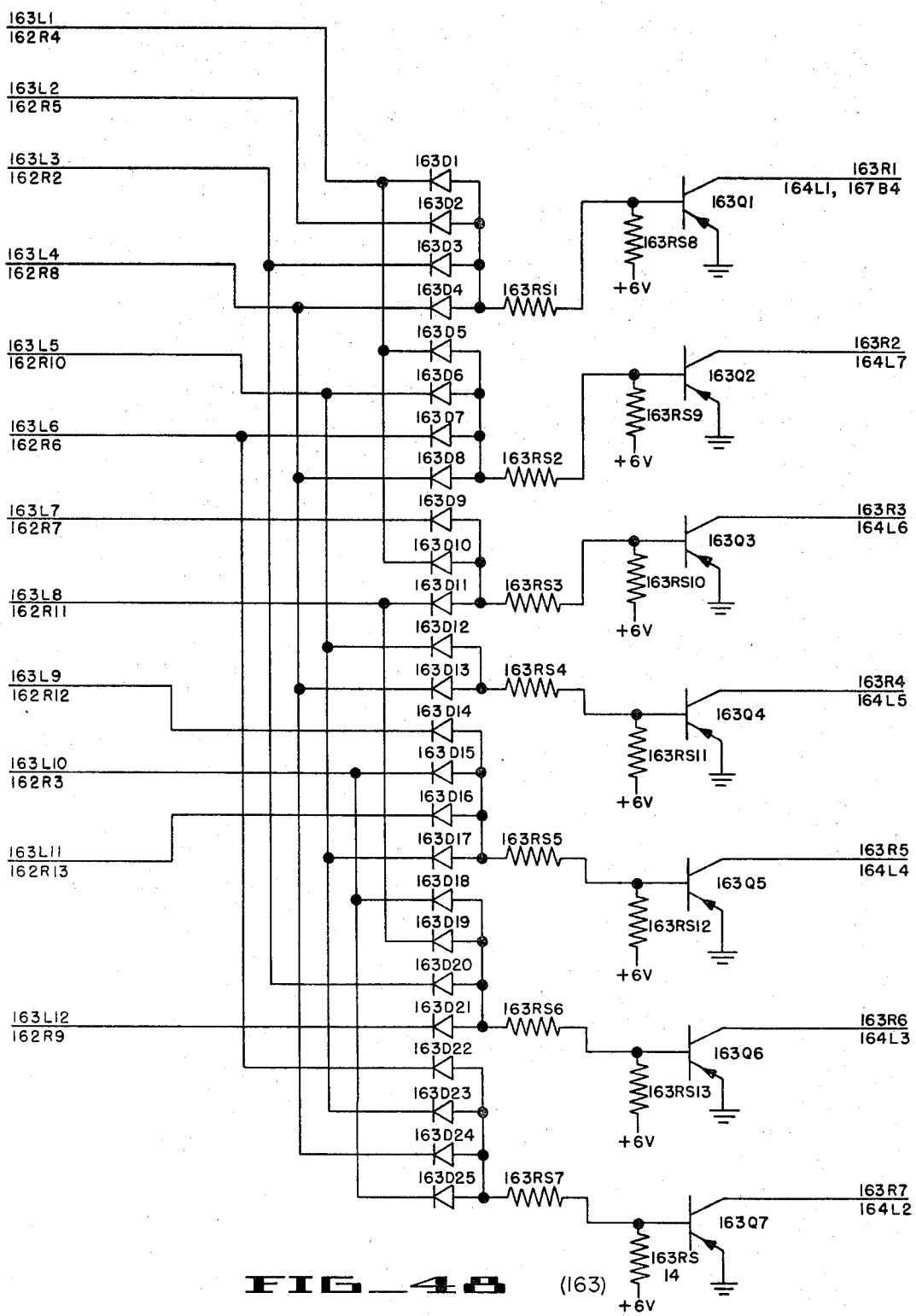
FIG_48 (163)

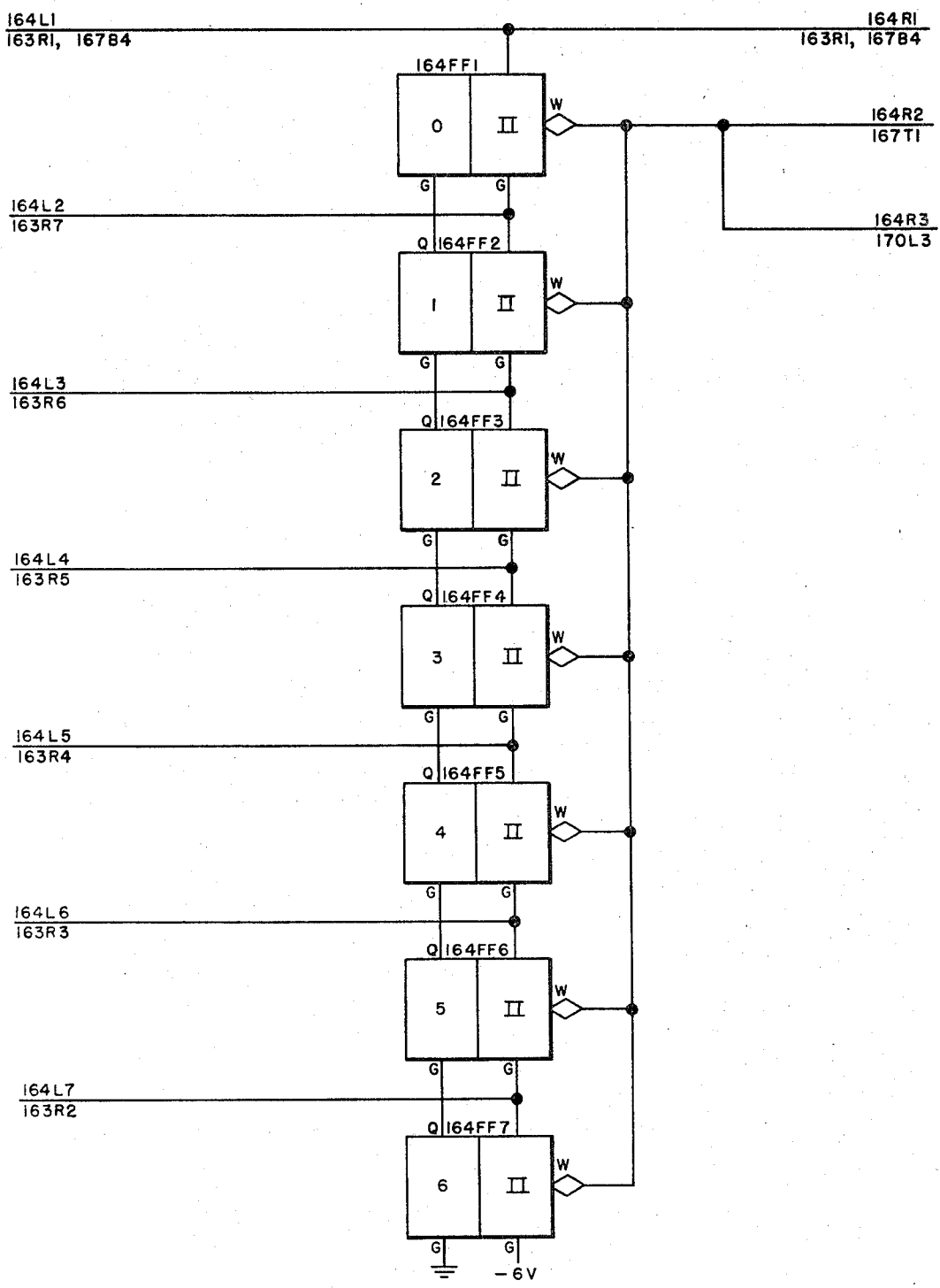
FIG_49 (164)

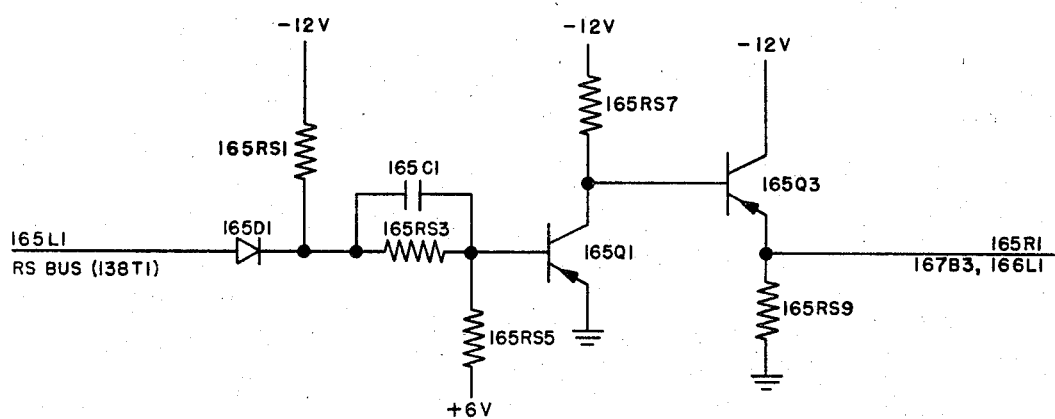
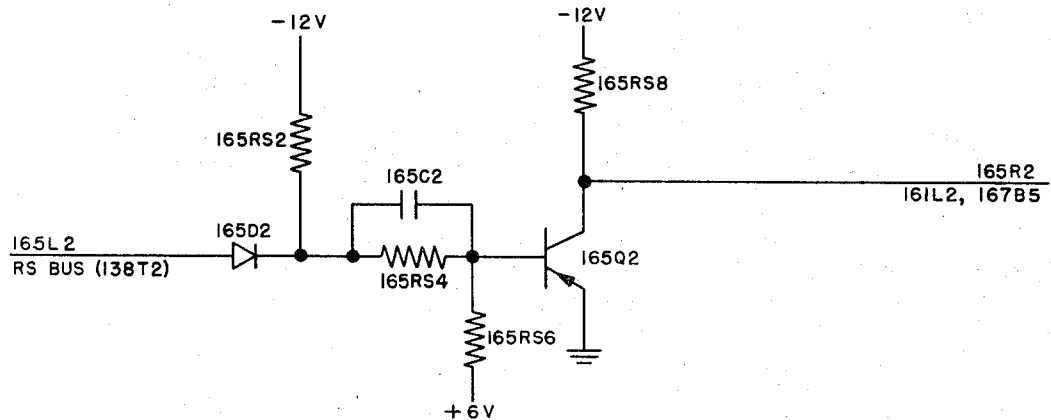
FIG_50 (165)

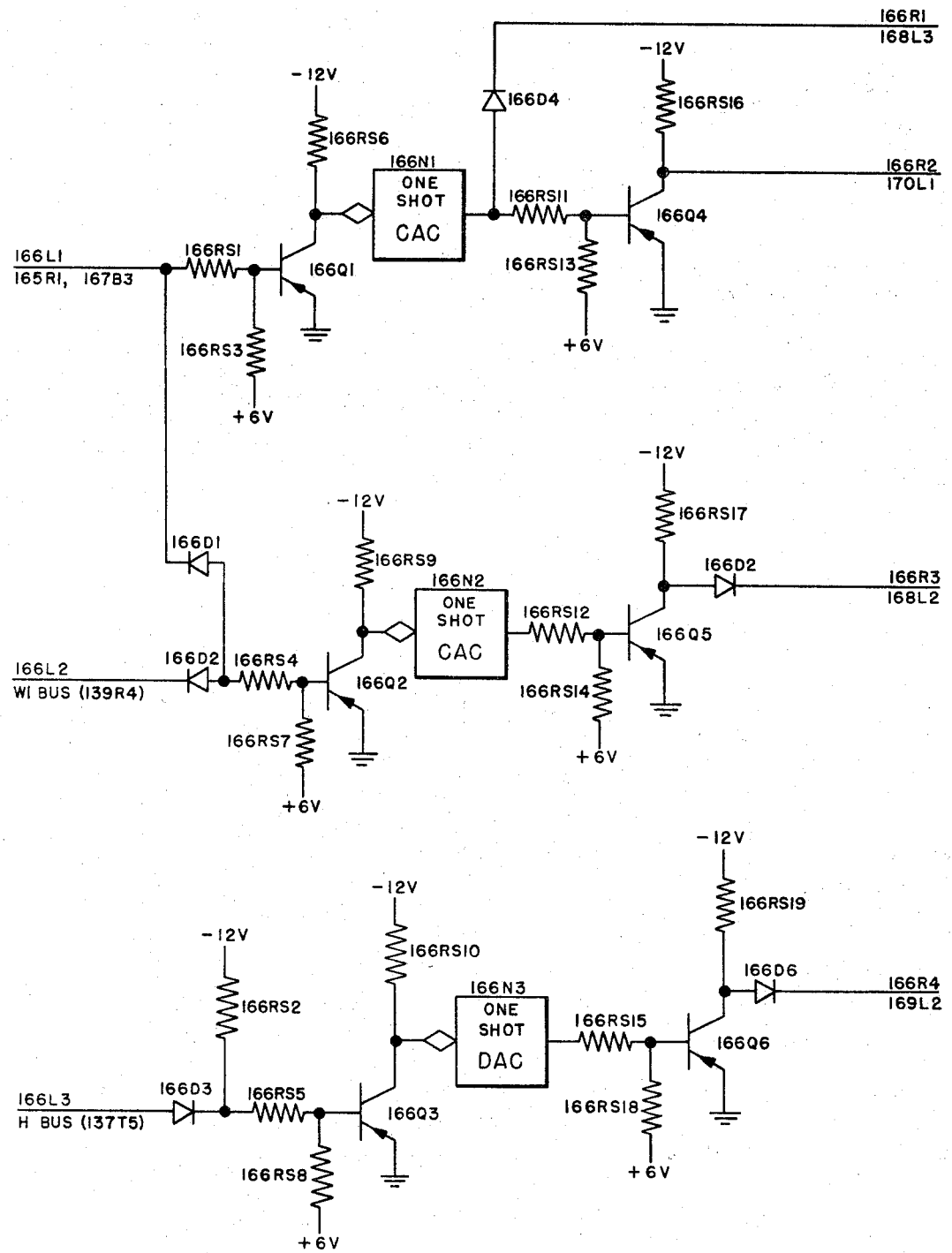
FIG_51 (166)

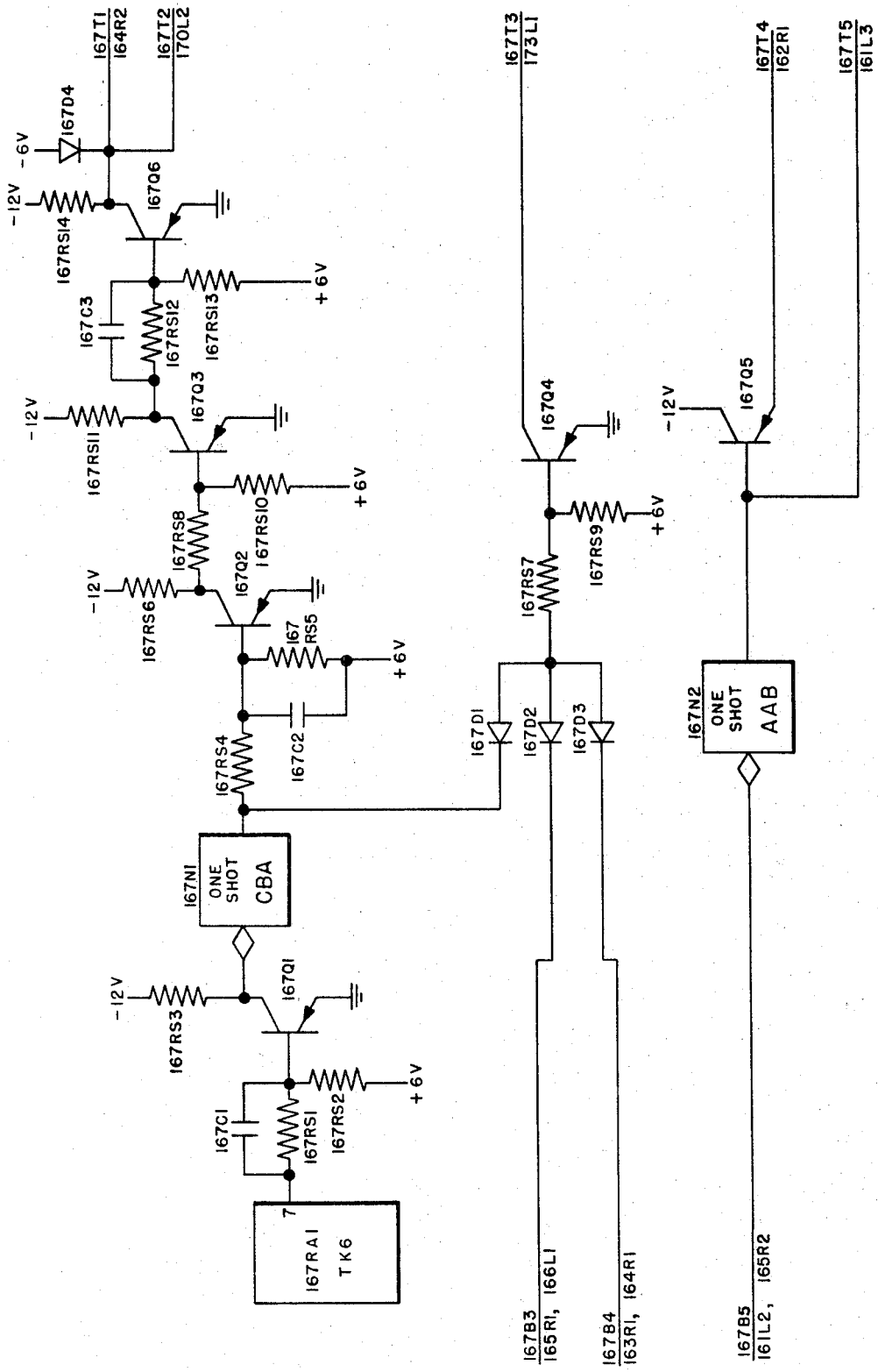

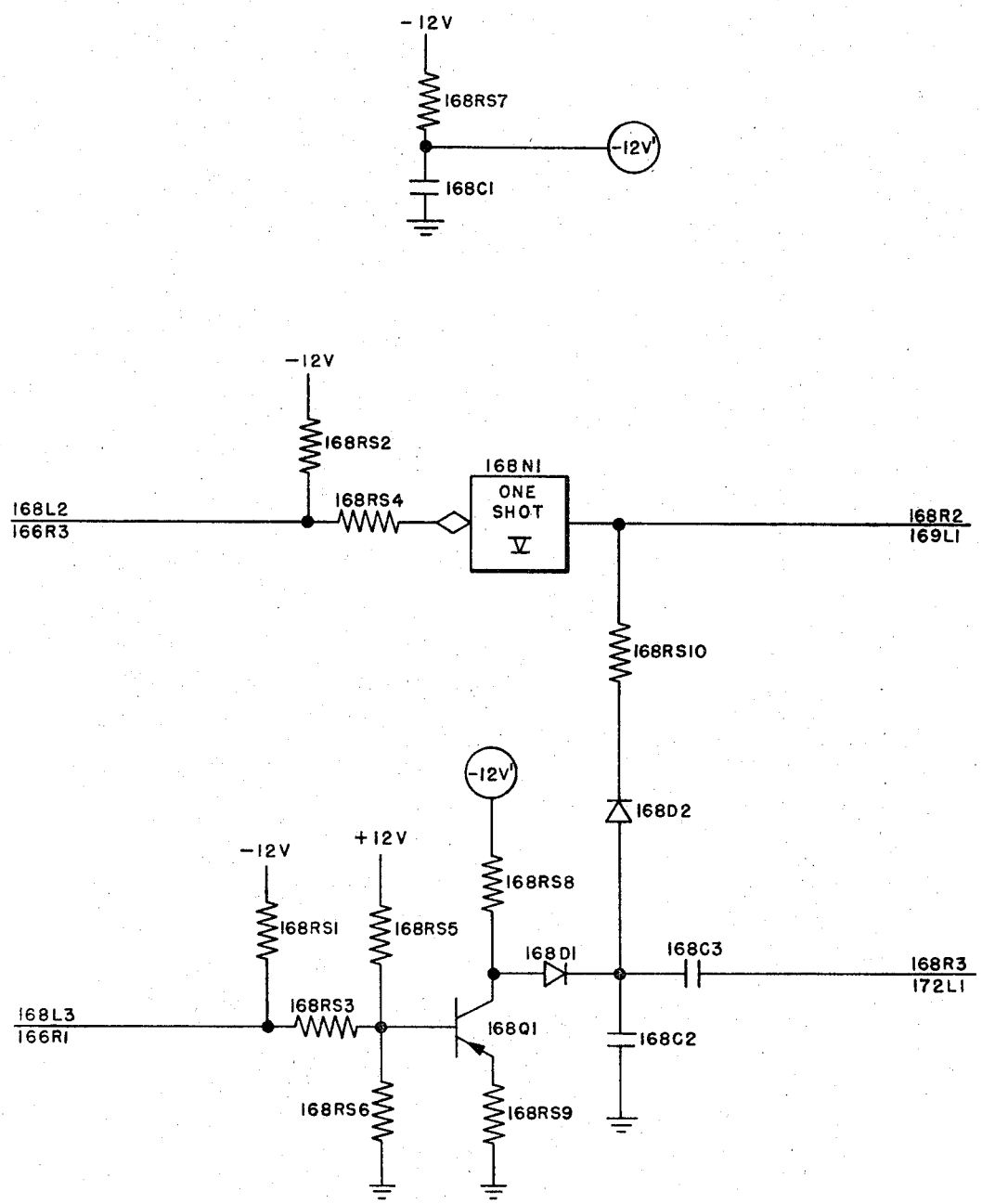
FIG_53 (168)

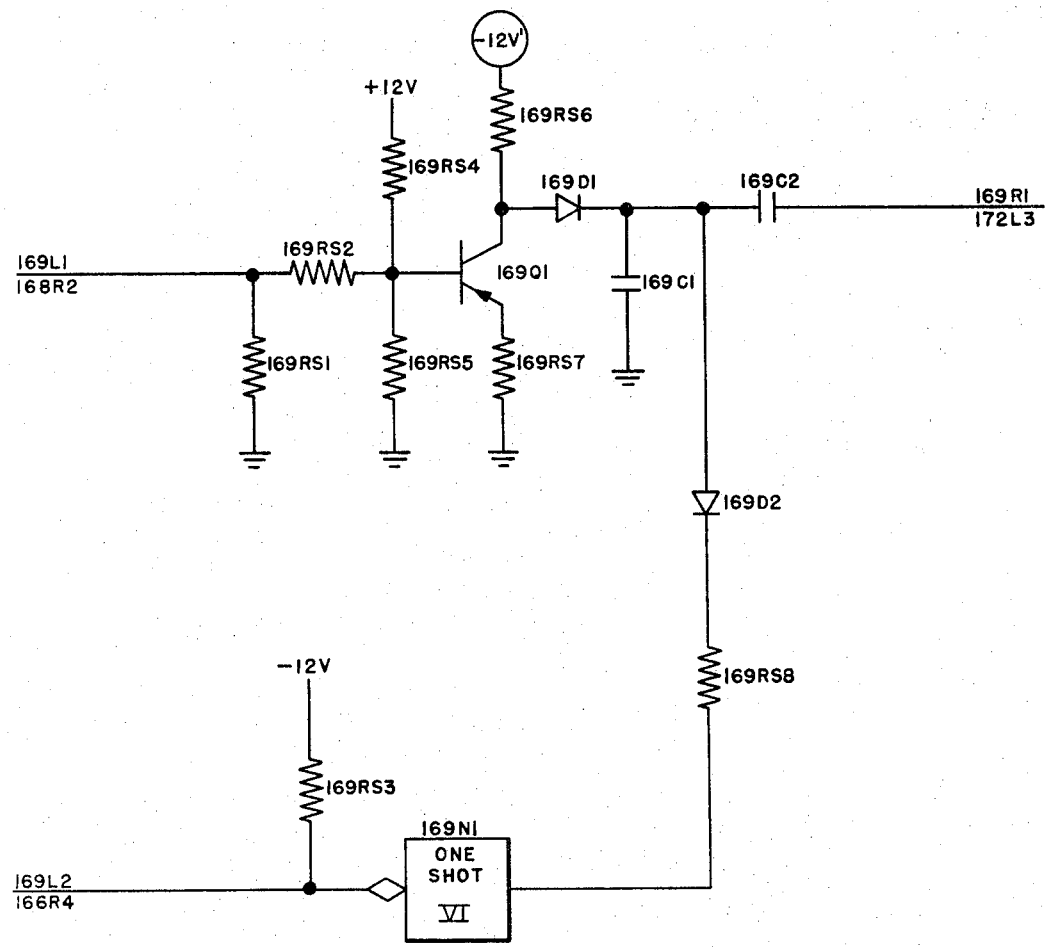
FIG_54 (169)

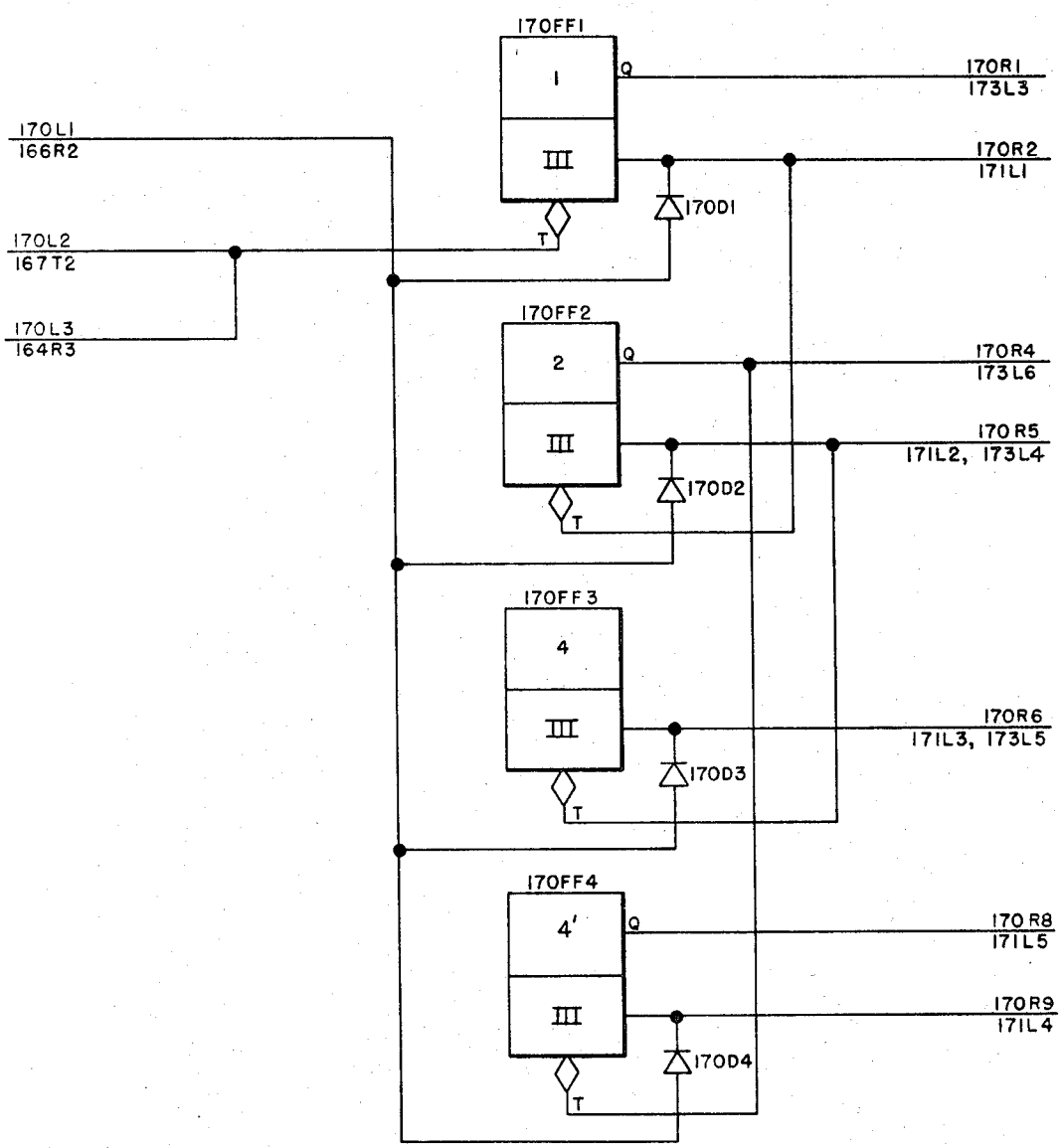
FIG_55 (170)

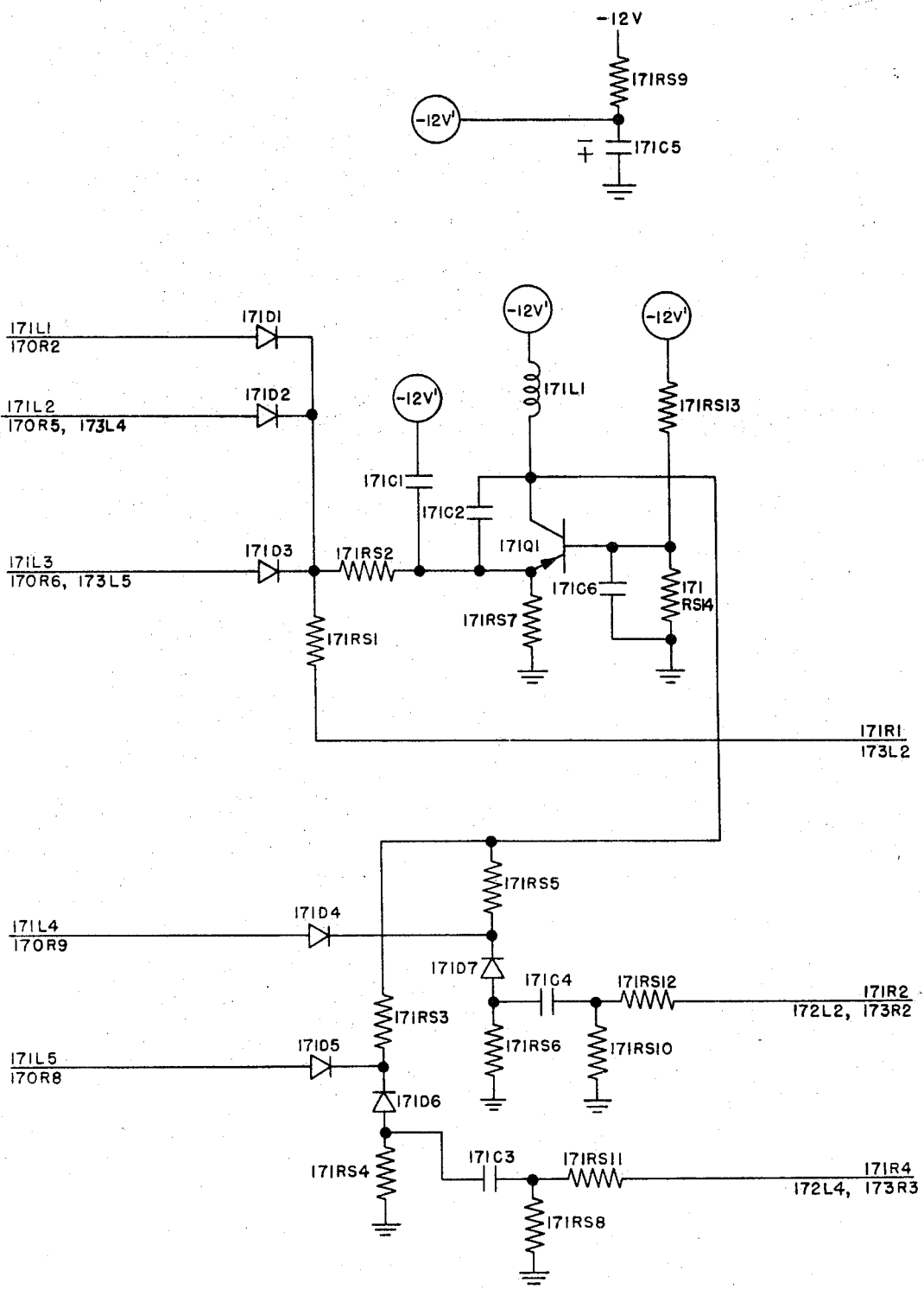
FIG_56 (171)

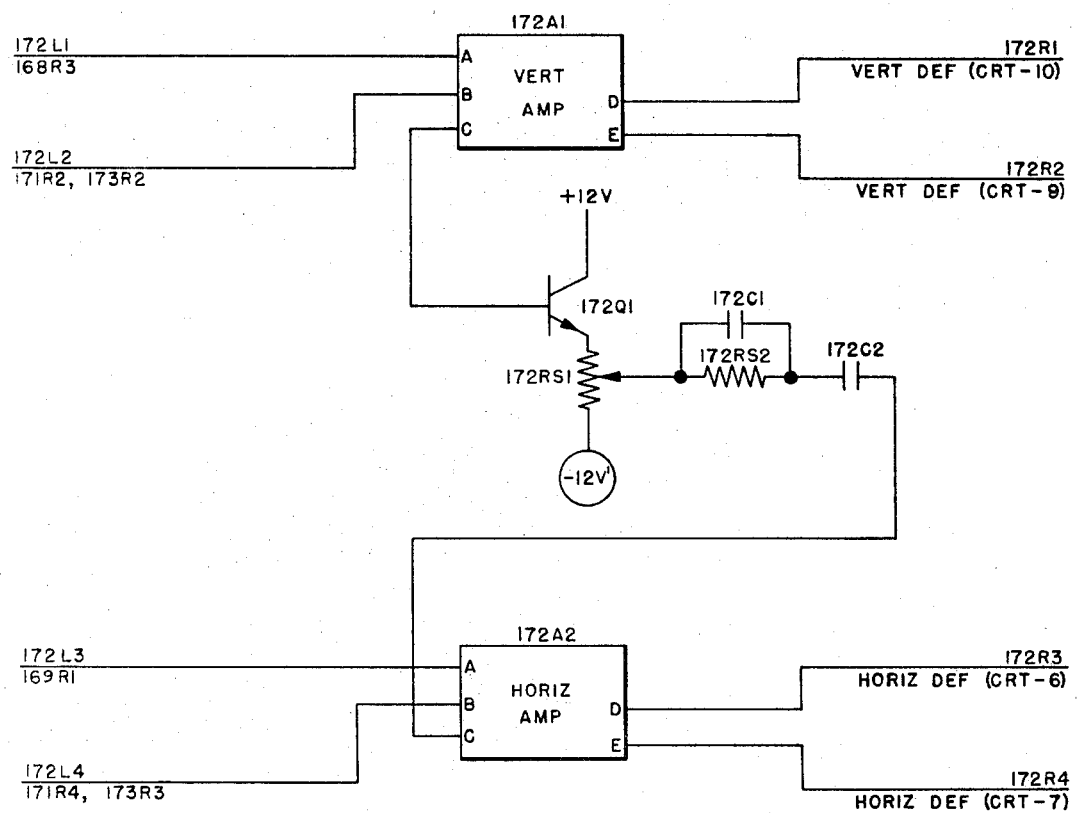
FIG_57 (172)

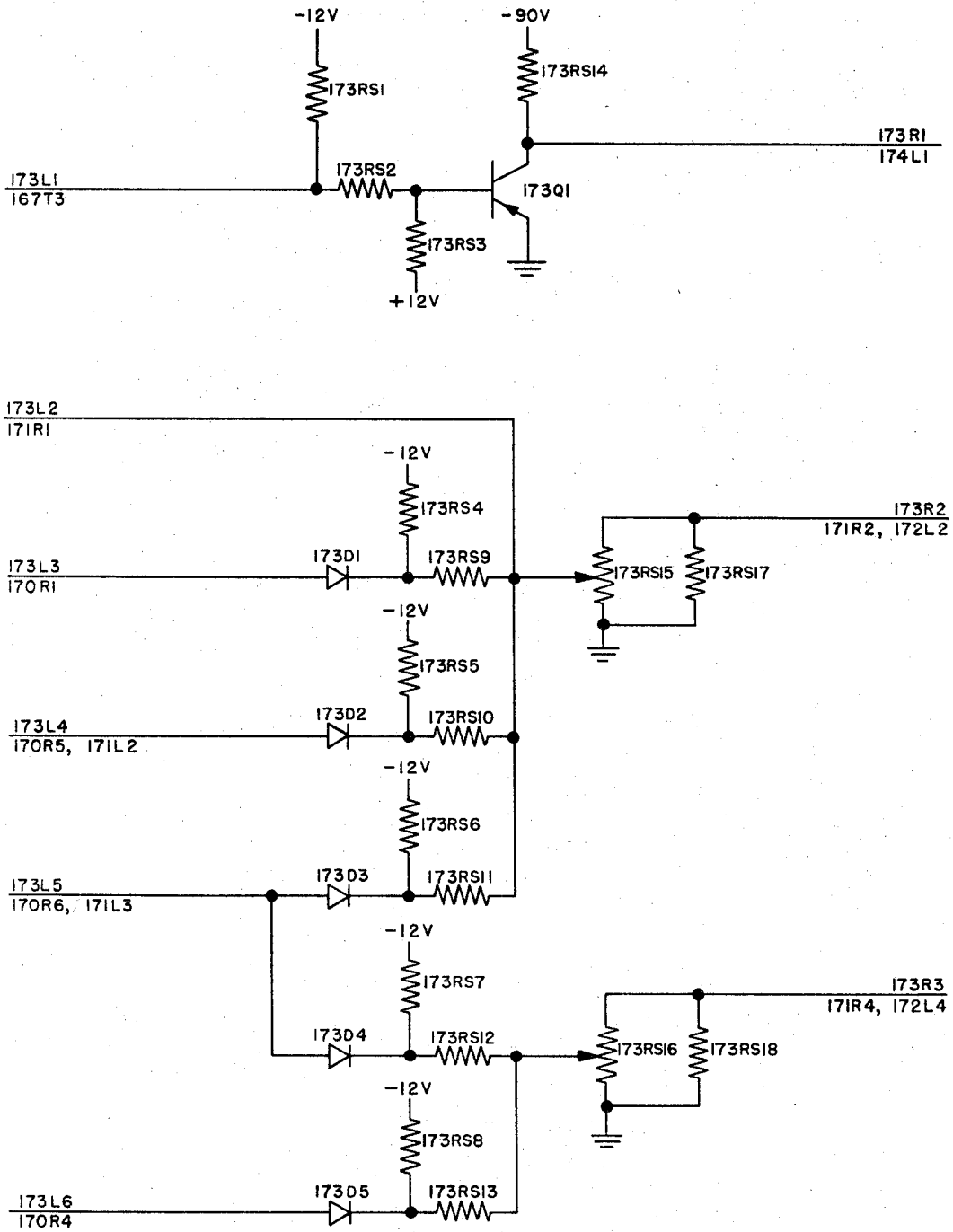
FIG_58 (173)

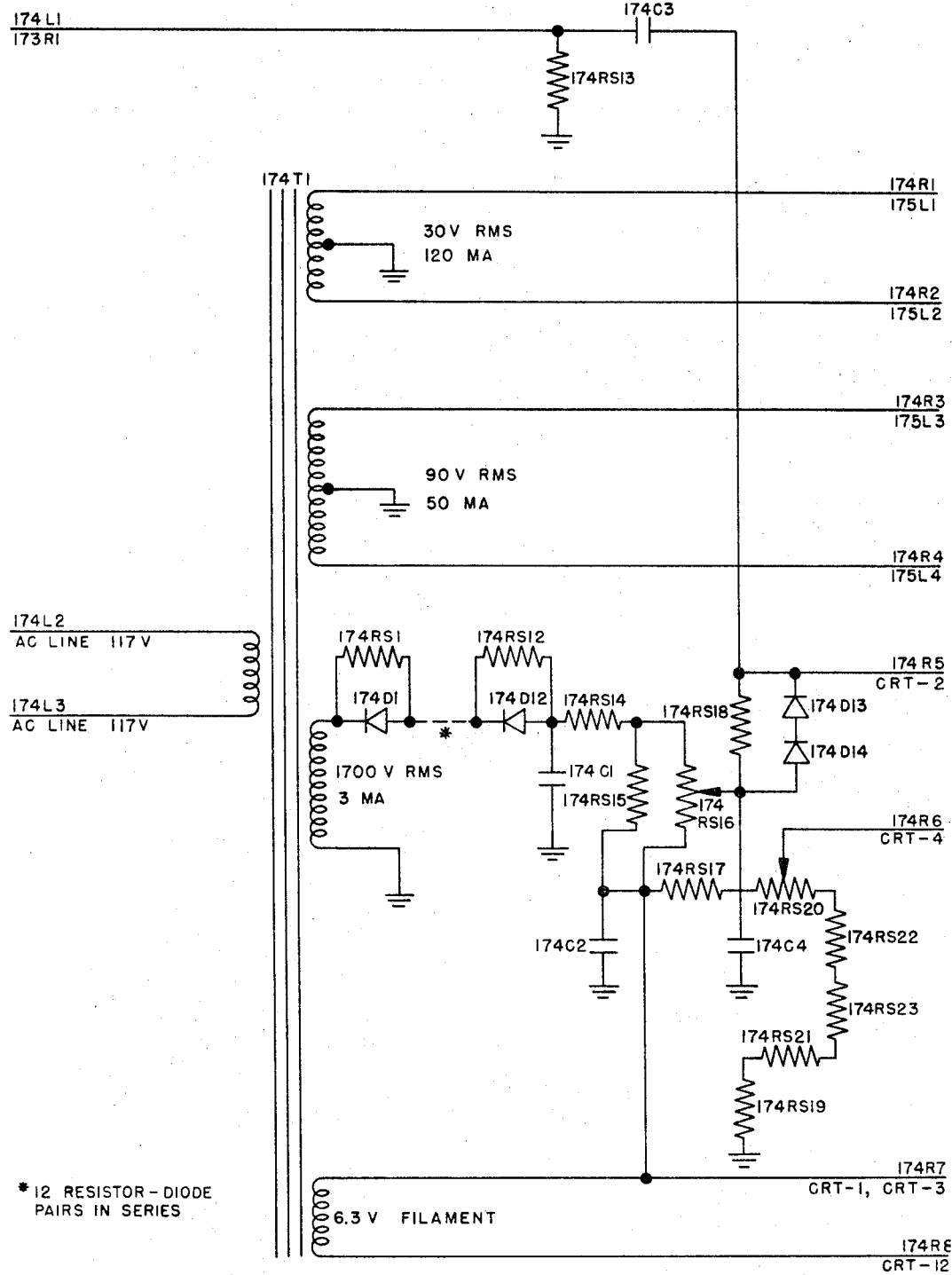

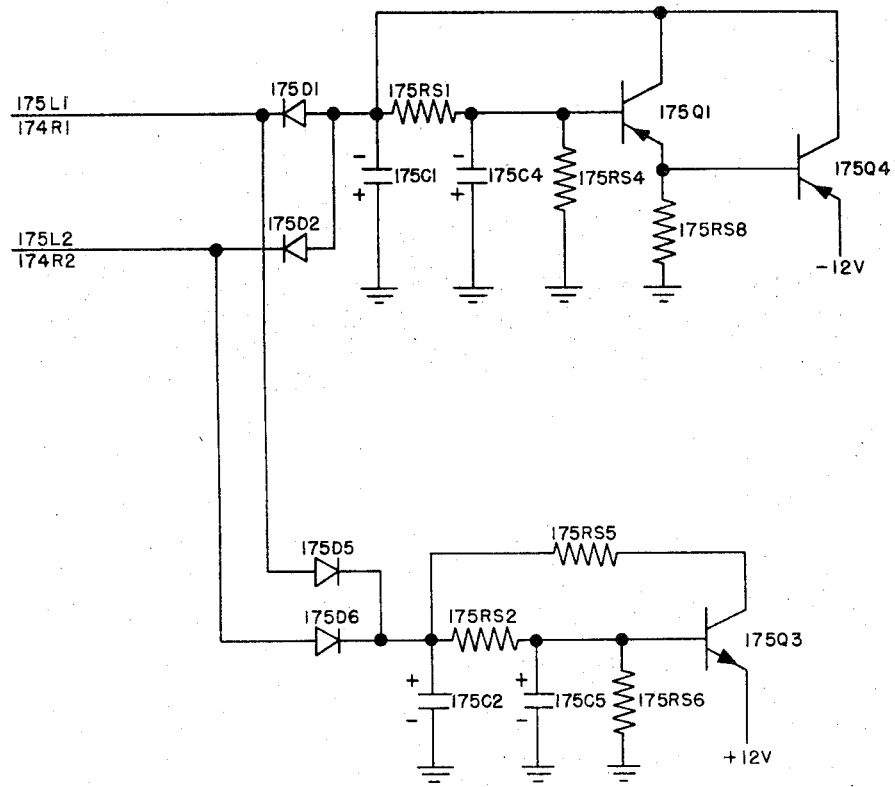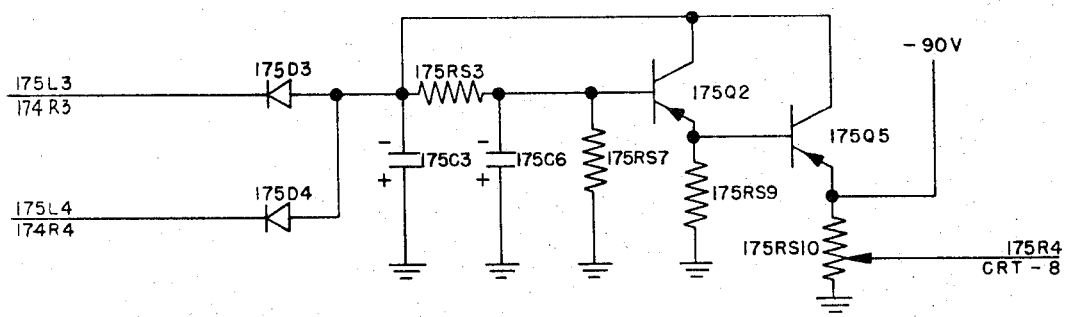
FIG_60 (175)

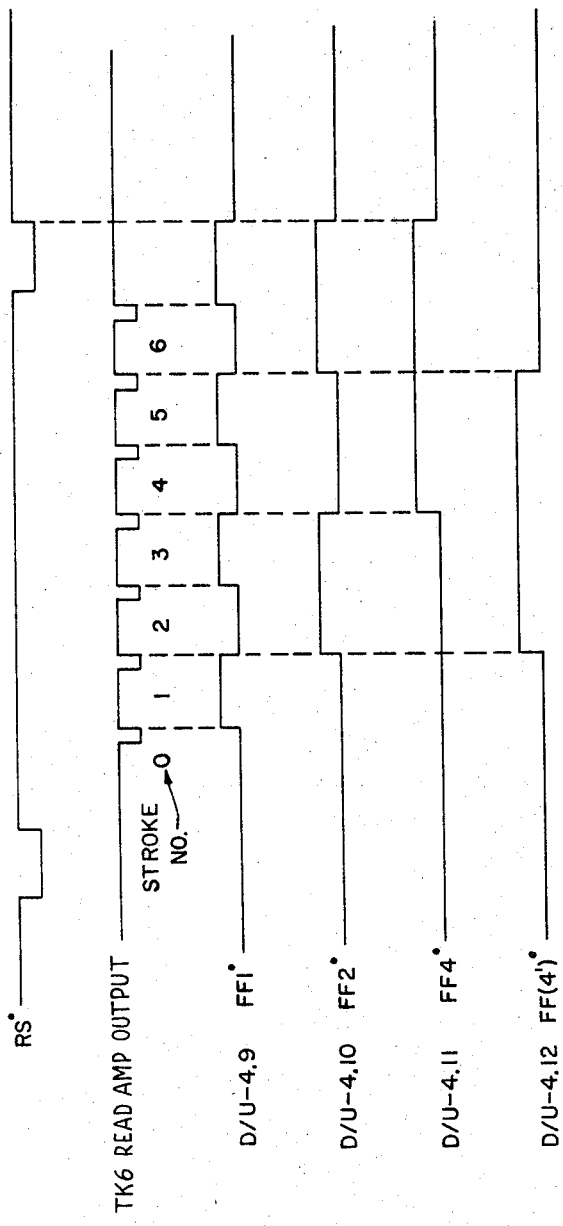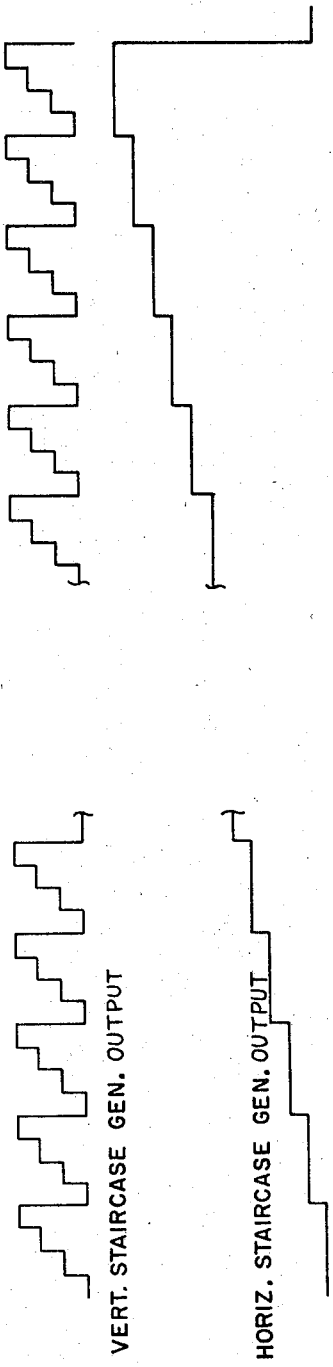

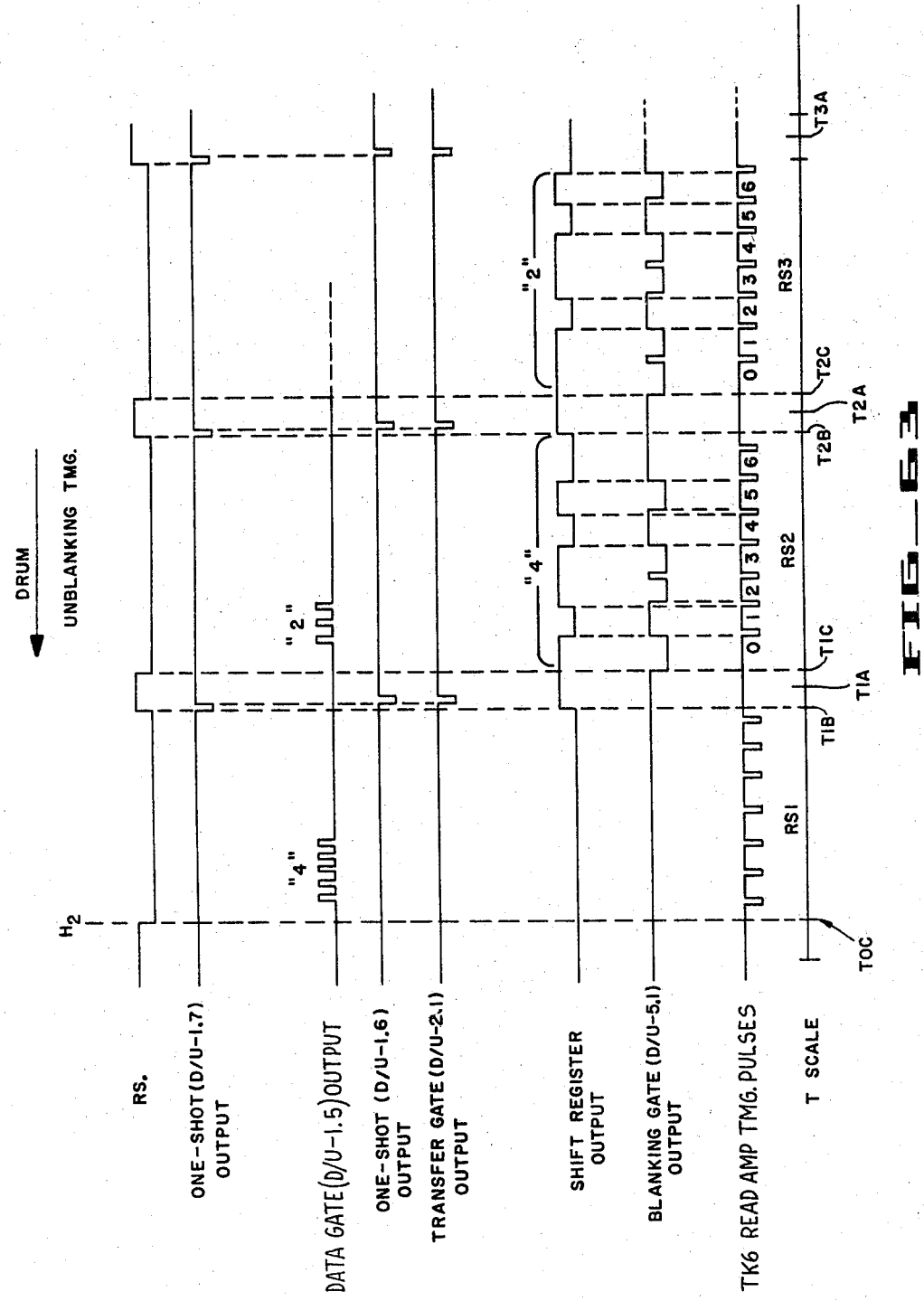

TYPICAL CHARACTER RASTER
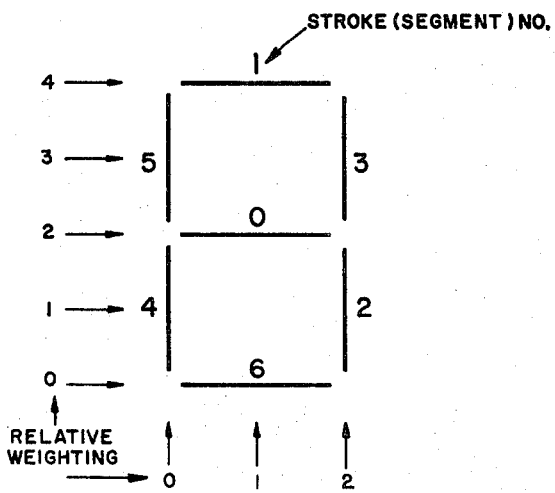
FIG_64
GENERATION OF STROKE WEIGHTING
| | | STROKE ORIGIN | | | | | |
|---|---|---|---|---|---|---|---|
| | | VERT. COORDINATE RELATIVE WEIGHTING (UNITS OF VOLTAGE) | | | | HORIZ. COORDINATE RELATIVE WEIGHTING (UNITS OF VOLTAGE) | |
| FLIP-FLOP OUTPUTS → | | 1. | 4. | 2. | | 2. | 4. |
| HORIZ. STROKE | 0 | − | + | + | 2 | − | + | 1 |
| | 1 | + | + | + | 4 | − | + | 1 |
| VERT. STROKE | 2 | − | + | − | 1 | + | + | 2 |
| | 3 | + | + | − | 3 | + | + | 2 |
| | 4 | − | − | + | 1 | − | − | 0 |
| | 5 | + | − | + | 3 | − | − | 0 |
| HORIZ. STROKE | 6 | − | − | − | 0 | + | − | 1 |
FIG_65

United States Patent Office 3,430,095
Patented Feb. 25, 1969

3,430,095
CATHODE RAY TUBE BEAM POSITIONING SYSTEM EMPLOYING COMPOSITE SIGNALS
Jack J. Bialik, Saint Germain-en-Laye, France, and Dale P. Masher, Menlo Park, and William W. Stevens, Palo Alto, Calif., assignors to Friden, Inc., San Leandro, Calif., a corporation of Delaware
Filed July 8, 1965, Ser. No. 470,370
U.S. Cl. 315—18                16 Claims
Int. Cl. H01j 29/72

ABSTRACT OF THE DISCLOSURE

There is disclosed an apparatus for and method of controlling the position of a cathode ray tube beam used in character display systems. The beam position is controlled by producing both horizontal and vertical deflection signals, each deflection signal being produced by mixing a beam position signal and a stroke position signal. Provision is made for adding an oscillatory signal to each stroke position signal and for inhibiting the oscillatory signal in response to the condition of a bistable device.

---

This invention relates to improved character display signal generator apparatus and to improved methods for generating character display signals. Character display generators are well known in the prior art, being described in United States Patent No. 2,762,862 to Bliss, in United States Patent No. 2,766,444 to Sheftelman, in United States Patent No. 2,875,951 to Schreiner, in United States Patent No. 3,090,041 to Dell, and in United States Patent No. 2,834,831 to Giffard. A character display signal generator, then, may be defined as a device capable of producing a plurality of synchronized electrical signals which, when applied to the proper input terminals of a cathode ray tube, an oscilloscope, or the like, cause one or more symbols to be displaced thereupon; said symbols and their configuration, e.g., in rows and columns, being selectable by input signals, keyboard actuation, or the like. More particularly, the present invention relates to character display signal generating apparatus and methods which are free from the necessity of employing the costly, specialized and critical components and subcircuits which characterize the devices of the prior art.

As can be seen from the afore-mentioned United States patents, many of the devices of the prior art were characterized by the employment of specialized, costly and critical components and circuitry.

The device of the Bliss patent, for instance, employs a flying-spot cathode ray tube scanner, or a kinescope, within the signal generator itself, in addition to the cathode ray tube employed to display the symbols resulting from the generated signals.

Giffard employs a tube of the class known as monoscopes, or phasmajectors, and also a Williams-type storage tube, both within the signal generator, in addition to the cathode ray display tube.

The device of Sheftelman is also characterized by the employment of costly, specialized and critical components, viz., a plurality of closely-matched delay lines, each having a plurality of critically located taps.

It will be clear from the above, then, that one of the principal problems in the character display signal generating apparatus of the prior art is the high cost, complexity and criticality of certain components and circuits found therein. As is well known to those skilled in the art, these characteristic features of the devices of the prior art render them applicable only to highly specialized applications, wherein cost, compactness and ease of maintenance are not primary considerations. It is to the solution of the problem of providing a novel character display signal generating apparatus and method characterized by low cost, compactness and ease of maintenance that the present invention is directed.

It is therefore an object of the present invention to provide character display signal generating apparatus and methods which are substantially free from the need for special components that characterize present character display signal generators.

It is another object of the instant invention to provide character display signal generators employing noncritical circuitry throughout.

It is a further object of the instant invention to provide methods of generating character display signals, which methods may be carried out without the use of critical apparatus.

It is yet another object of the instant invention to provide a method of generating predetermined symbols upon the faces of fugitive pattern tracing display devices, which method may be practiced without the employment of critical circuits or components, or circuits or components specially adapted only to the practice of that method.

It is still another object of the instant invention to provide apparatus and methods for generating character display signals of minimum band width, thereby ensuring that said apparatus will be characterized by minimum criticality, and maximum ease of maintenance.

It is a yet further object of this invention to provide a deflection system responsive to a binary counter type segment generator system.

It is a yet further object of this invention to provide a voltage weighting circuit responsive to the count of a segment generator for providing proper input voltages to vertical and horizontal amplifiers of a display.

It is a still further object of this invention to provide an oscillator controlled varying signal to the inputs of vertical and horizontal amplifiers for providing line stroke segments defining characters to be displayed on a cathode ray tube.

It is a yet further object of this invention to provide a pair of input signals to a deflection amplifier of a CRT display system composed of a first predetermined weighted voltage and a second varying voltage, the combination thereof providing a line scan at a predetermined position on a cathode ray display tube.

It is a yet further object of this invention to provide a deflection system responsive to a binary device for forming a vertical or horizontal stroke depending upon the condition of said binary device.

It is a yet further object of this invention to provide a pair of input signals to a deflection amplifier, one such input signal being a varying voltage and the second being a ramp function for providing a deflection signal.

Other objects of the instant invention will in part be obvious, and will in part appear hereinafter.

The instant invention, accordingly, comprises the several steps and the relation of one or more of such steps to each of the others, and the apparatus embodying features of construction, combinations of elements, and arrangements of parts which are adapted to effect such steps, all of which are exemplified in the following detailed disclosure. The scope of the instant invention will be indicated in the claims.

For a fuller understanding of the nature and objects of the invention, reference should be had to the following detailed description, taken in conjunction with the accompanying drawings, in which:

FIGURE 1A is a block diagram of the display device according to the invention.

FIGURE 1 is a pictorial description of the output signals from track 1, track 2 and track 6 read head circuits of the magnetic drum including a reference scale designated T.

FIGURE 2 is a pictorial description of track 1 of the magnetic drum.

FIGURES 3 and 4 are pictorial explanations of the definition of the signal time periods.

FIGURE 5 is a pictorial description of the registers of track 4 of the magnetic drum and the relationship of the read head therefore.

FIGURE 6 is a description of the timing signals obtained from the timing circuits and the levels of these timing signals during the various time periods of operation.

FIGURE 7 is a symbolic diagram of a flip flop as used in the logic diagrams of FIGURES 10 to 17.

FIGURE 8 is a description of symbols utilized in the description of the logic diagram of FIGURES 10 to 17.

FIGURE 9 is a symbolic diagram of a one shot as used in the logic diagrams of FIGURES 10 to 17.

FIGURES 10 to 17 comprise a logic diagram of the display device in accordance with the present invention.

FIGURE 18 is a symbolic diagram of a flip flop as used in the circuit diagram of FIGURES 42 to 60.

FIGURE 19 is a symbolic diagram of a one shot as used in the circuit diagram of FIGURES 42 to 60.

FIGURE 20 is a circuit diagram of a type I flip flop.

FIGURE 21 is a symbolic diagram of a type I flip flop.

FIGURE 22 is a circuit diagram of a type II flip flop.

FIGURE 23 is a symbolic diagram of a type II flip flop.

FIGURE 24 is a circuit diagram of a type III flip flop.

FIGURE 25 is a symbolic diagram of a type III flip flop.

FIGURES 26 and 27 describe the circuit of certain one shots used in the circuit diagram of FIGURES 42 to 60.

FIGURE 28 is a circuit diagram of a type I one shot.

FIGURE 29 is a symbolic diagram of a type I one shot.

FIGURE 30 is a circuit diagram of a type V one shot.

FIGURE 31 is a symbolic diagram of a type V one shot.

FIGURE 32 is a circuit diagram of a type VI one shot.

FIGURE 33 is a symbolic diagram of a type VI one shot.

FIGURES 34 and 35 describe the circuit of the inverters used in the circuit diagram of FIGURES 42 to 60.

FIGURES 36 and 37 describe the circuit of certain gating circuits used in the circuit diagram of FIGURES 42 to 60.

FIGURE 38 is a circuit diagram of the read head circuit used in the circuit diagram of FIGURES 42 to 60.

FIGURE 39 is a symbolic diagram of the read head circuit of FIGURE 38.

FIGURE 40 is a circuit diagram of the vertical and horizontal deflection amplifiers used in the circuit diagram of FIGURES 42 to 60.

FIGURE 41 is a symbolic diagram of the vertical and horizontal deflection amplifiers of FIGURE 40.

FIGURES 42 to 60 comprise a circuit diagram of the display in accordance with the present invention.

FIGURE 61 is a timing diagram of the operation of the segment flip flops of the display unit and a description of the timing signals obtained from the magnetic drum track 6 read head circuit.

FIGURE 62 is a pictorial description of the output signal of the vertical staircase generator and the horizontal staircase generator of the display device.

FIGURE 63 is a timing diagram of the unblanking circuitry of the display system.

FIGURE 64 is a diagram of a typical character raster produced on the face of the cathode ray tube of the display unit.

FIGURE 65 is a table of the weighting of the output signals of the segment flip flops of the display unit.

GENERAL SYSTEM

FIGURE 1A shows the display device in block diagram form. A first signal from oscillatory signal generator 10 is coupled through inhibit device 12 and combined with the output of weighted signal generator 14 in vertical mixer 16. The output of mixer 16, along with the signal from vertical staircase generator 18, are coupled to vertical amplifier 19 which provides the vertical deflection signal. A second output from oscillatory signal generator 10 is coupled through inhibit device 20 and combined with the output of weighted signal generator 22 in horizontal mixer 24. The output of mixer 24, along with the signal from horizontal staircase generator 26, are coupled to horizontal amplifier 28 which provides the horizontal deflection signal. The vertical and horizontal deflection circuits, including enable means 30, are under the control of timing and control unit 32. All the above elements are described in greater detail below.

TIMING

Since the operation of this display device is primarily dependent upon the timing therein, it is initially essential to understand the operation of the timing pulse generator system and, subsequently, the timing required for the performance of each operation of the display. The basic timing signals utilized in the display in accordance with the present invention are obtained from the magnetic tracks located on the drum of a calculator such as described in the application of Ragen, Ser. No. 398,902 filed Sept. 24, 1964. This subject matter is incorporated herein by reference.

FIGURE 1 sets forth the output of the read heads of tracks 1, 2 and 6 of the drum indicated as TK1, TK2 and TK6, respectively. It is assumed that the drum is rotating toward the left as indicated by the arrow in FIGURE 2. Track 1 produces H pulses, track 2 produces R pulses and track 6 produces dipslay pulses. Each pulse in FIGURE 1 represents a change in the state of the magentic materal on the drum, this change being sensed by the reading heads associated with the drum to produce a bit pulse.

Track 1 produces H pulses, these pulses comprising two individual pulses per revolution of the magnetic drum, these pulse bits being closely spaced on the drum as shown in FIGURE 2. The short space of time between these H pulses lettered H1 and H2 is referred to as "dead time" since no operations of the display circuit take place during this time period. Track 2 produces 101 equally spaced pairs of timing pulses positioned in time from T0B to T100C. These pulses are set forth in FIGURES 3 and 4 at the B and C times. It will be noted that B time occurs one half bit time prior to A time (the A times being equally spaced between B and C times) and the C time corresponding to the second bit of the R bit pair occurring one half bit time after an A time.

Track 6 produces display pulses, these pulses comprising seven spaced pulses appearing in the period slightly after a C time and before the following B time. Therefore, seven negative pulses will appear in the period just after T0C and before T1B of FIGURE 1. Also, seven such pulses will appear in the time period between T1C and T2B and so on for each of the one hundred time periods reprsented in FIGURE 1. These pulses are shown in more deail in FIGURES 62 and 63.

In summary, it can therefore be seen that in the operation of the drum, first an H1 pulse will appear, then there will be a short period of "dead time" when no operations occur. There will then be a first R pulse at time T0B (FIGURE 1) then, one bit later at T0C time, an H2 pulse and a second R pulse at time T0C. This is followed by 7 bit pulses occurring via track 6, these 7 bit pulses occurring in the time period from just after the T0C time until just prior to the next following T1B time. The above time periods are set forth on the exemplary time scale T of FIGURE 1. This sequence will continue for one hundred such pulse groups about the track until time T100B has been reached, whereupon an H1 pulse and an R pulse are received and then a "dead time" returns until the following R pulse which occurs one bit time prior to the next H2 pulse.

Referring now to FIGURE 5, the track therein is labelled track 4 of the magnetic drum and includes a space marked H which corresponds to the space between position H1 and H2 of track 2 or the "dead time." This space is not restricted as to size. Immediately upon occurrence of the H2 signal, the following track space, which corresponds to the portion of track 4 corresponding to times T0C to T1A of track T in FIGURE 1, is the area in which the least significant digit of a number to be stored in the temporary storage register No. 1 (T1) will be stored by the reading therein of a number of bits equal to the value of the number to be stored therein. As shown, the number "4" is stored therein. The portion of scale T corresponding to the time period from time T1A to time T2A, corresponds to the portion of track 4 labelled T2, this portion of track 4 being similar to register T1 and being utilized as a second temporary storage register. The portion of track 4 corresponding to track T in time T2A to T3A is referred to as the accumulator (ACC) whereas the portion of track 4 corresponding to times T3A to T4A is referred to as the entry register (ENT). Each of track portions T1, T2, accumulator register and entry register indicated as 1/1, 1/2, 1/3 and 1/4, repectively, will store the least significant digit of a number to be stored in the entire temporary register T1 or T2, accumulator register or entry register. During subsequent times as referred to in the T scale of FIGURE 1, track 4 will continue to include space for more significant digits of the storage register T1, storage register T2, accumulator register and entry register until at time T100A there will have been 25 of each of these registers. The registers set forth in track 4, as indicated supra, are referred to by utilization of two numbers located in each register block, the top number of which indicates the significance of the digit and the bottom number of which indicates the particular register, i.e., temporary storage register T1 (1), temporary storage register T2 (2), accumulator register (3) or entry register (4). A read head is positioned adjacent track 4 for reading therefrom.

Referring now to FIGURE 6, there is shown a timing diagram of the various timing signals provided by the timing circuitry of the display device. The T scale indicates the various time periods from T0C to T100A, identical to the T scale of FIGURE 1.

H TIMING SIGNALS

The H signal shifts from the negative voltage level at time T0C to the positive voltage level and remains at the positive voltage level until time T100C when this signal then shifts back to the negative voltage level. This signal is indicated as H.. It will be noted that the portion of the drum between the H1 and the following H2 signal is the "dead time" indicated in FIGURE 2.

This H signal is provided by the circuitry set forth in FIGURE 43, wherein the H2 indication on track 1 on the drum is sensed by track 1 read head 138RA2 and transferred through inverters 138A2 and 138A3 to the input terminals of the H flip flop 138FF2. The input signal provided by inverter 138A2 is a positive-going pulse, also the signal provided by inverter 138A3 is a positive-going pulse. The positive-going pulse produced by inverter 138A2 is applied to the input of the flip flop 138FF2 and sets this flip flop, thereby providing negative voltage level signal on the H· bus 138T4. This signal will appear and will remain on bus 138T4 until the next following H2 pulse which will reset the H flip flop 138FF2 and invert the voltage level on this bus. The output on the bus 138T4 passes through the emitter follower 137Q1 and is inverted by the inverter 137A2 to provide an H. signal on the output bus 137T5.

RS TIMING SIGNALS

The negative voltage level RS. signal is obtained on bus 138T3 100 times during each revolution of the drum from time T0C to T1B, T1C to T2B . . . T99C to T100B as indicated in FIGURE 6. It will be noted that the first RS. signal commences at time T0C by going, at that time, from a positive voltage level to a negative voltage level and remaining in this negative state until the next following B time whereupon this signal reverts to its positive voltage level until the next following C time whereupon this signal again reverts to its negative level. This cycle commences for 100 T periods. Similarly, the positive voltage level RS· signal on bus 138T2 is identical in all respects to the RS. signal on bus 138T3 except that this signal goes from a negative voltage level to a positive voltage level at the identical times that the RS. signal on bus 138T3 goes from a positive voltage level to a negative voltage level and vice versa.

These RS signals are obtained by reading the signals from track 2 as shown in FIGURE 1 with the track 2 reading head 138RA1 (FIGURE 43), these signals being inverted in the inverter 138A1 and transferred to the complement inputs of the RS flip flop 138FF1. Upon reading the signal on track 2 corresponding to the B time of FIGURES 3 and 4, the RS flip flop 138FF1 is set by a positive-going voltage pulse thereto, and provides a negative voltage level output on RS· bus 138T2. Simultaneously, a positive voltage level signal is applied to the RS bus 138T1 through inverter 138A4. When the following bit pulse taken from track 2, which corresponds to the time C of FIGURES 3 and 4, is received from track 2 read head, this signal will provide a second positive-going voltage level and reset the RS flip flop. Thereby, the voltage levels on the RS buses 138T1 and 138T2 are inverted to provide significant voltage levels on these buses only in the time period between a C time and the following B time on the drum.

W TIMING SIGNAL

The pulses on bus 138T3 (FIGURE 43) are transferred through a diode 137D1 (FIGURE 42), a time delay one shot 137N1, and the inverter 137A1 to the complement inputs of the RA flip flop 137FF2. This RA flip flop, along with the RB flip flop 137FF1, comprises a binary counter with four states. Therefore, for each positive-going transition on the RS flip flop RS. bus, there will be a corresponding change in state of the counter composed of the RA and RB flip flops. It can be seen that the RA and RB flip flops are initially both in the reset condition due to a positive-going transition resetting signal applied on the H. bus 137T5. This positive voltage level on the bus 137T5 disables the one shot 137N1 through diode 137D3 by holding the one shot input at a positive voltage level.

It should be noted that the H flip flop 138FF2 and the RS flip flop 138FF1 are synchronized by the positive voltage level on bus 137T5, which level is applied through the diode 137D2 to the RS. bus 138T3, thereby setting the RS flip flop for time synchronization with the H flip flop. When the voltage level on the H bus 137T5 then goes to a negative voltage level, the RA, RB and RS flip flops and the one shot 137N1 are unlocked.

Concurrently with the unlocking of the RS, RA and RB flip flops and the one shot 137N1, an input signal to the RS flip flop 138FF1 resets this flip flop, this resetting having no effect on the timing circuitry. At time T1B, a positive-going transition to the complement input of the RS flip flop 138FF1 sets this flip flop and provides a positive-going transition on the RS. output bus thereof. This positive-going transition is delayed in the one shot 137N1, the negative-going output therefrom being inverted by the inverter 137A1 and setting the RA flip flop 137FF2 at time T1A. At time period T1C, a positive-going transition to the input of the RS flip flop 138FF1 will reset this flip flop, producing a negative level on the RS. bus, this negative level having no effect as before. This procedure is continued for each T time to thereby step the counter composed of the RA and RB flip flops and provide various significant voltage levels on the buses 137T1 through 137T4 in accordance with the condition of the RA and RB flip flops. The voltage levels on these buses 137T1 through 137T4 will aid in providing the W timing signals as will be described hereinbelow.

The RA and RB signals are utilized to provide the W1 signal on the bus 139R4 in the display. As shown in FIGURE 6, the W1 signal remains in its negative voltage level condition except during times indicated as T1, i.e., the time period between times T0C and T1A, the time period between times T4A and T5A, .... It will be seen that this W1 pulse is provided at every fourth time period beginning with time T0C. It should also be noted that the W1 pulse extends in time from a first A time to the next succeeding A time as shown in FIGURE 3 for all time periods except T0. This extended range is provided by the time delay obtained in the one shot 137N1 since the RA and RB counter advances during the positive-going portion of the RS signal on bus 138T3.

It can now be seen that, in the time period between time T0C to T1A, the H bus 139L9 will have a significant negative voltage level signal thereon as explained supra and shown in FIGURE 6. Also, since at time T0C the RA and RB flip flops 137FF1 and 137FF2 will both be in the reset state and thereby provide a negative voltage level output signal on the RA bus 137T4 and 139L10 and a negative voltage level signal on the RB bus 137T3 and 139L11. Accordingly, at this time and the AND gate 139G4 is enabled and provides a negative voltage output therefrom, this negative voltage level being inverted by inverter 139A4 to provide a positive voltage level output on the W1 bus 139R4.

At time T1B, the RS flip flop is set and applies a delayed positive-going signal through the one shot 137N1 to set the RA flip flop 137FF2 at time T1A. Accordingly, at this time, the RB bus 137T3 will remain in its negative voltage condition whereas, the RA bus 137T4 and 139L10 have now changed from a negative voltage level condition to a poistive voltage level condition, thereby disenabling the AND gate 139G4.

The next positive-going transition on the bus 138T3, as before, will again change the count of the RA and RB flip flops by "1" and, accordingly, the RA buses 137T4 and 139L10 will be at a negative voltage level, and the RB buses 137T3 and 139L11 will be at a positive voltage level.

At the next positive-going transition of the RS signal on bus 1388T3, as before, the counter composed of flip flops 137FF2 and 137FF1 will again change in count by "1," etc.

Accordingly, as set forth supra, each of the W1 timing signals required is obtained at its proper time by means of the above described circuitry as clearly set forth in FIGURE 6.

The preferred embodiment of the invention will first be described with reference to the logic diagrams thereof wherein the display is depicted by logical circuitry. These diagrams comprise FIGURES 10 to 17.

CONVENTIONS

It is necessary to understand certain conventions that are utilized herein. In FIGURE 7, e.g., is shown a symbolic diagram of a flip flop as used in the logical circuitry herein. The flip flop comprises terminals numbered from 10 to 21. The output terminals are numbered 11 and 12 and will be referred to as the FF- and FF. output terminals, respectively. As noted in the table, a binary "1" or set condtion exists when a negative voltage level appears on the FF- output terminal (about —6 volts) and a positive voltage level appears at the FF. output terminal (about 0 volts). It follows that the flip flop will be set when the FF. output terminal thereof is at a positive voltage level and the FF- output terminal thereof is at a negative voltage level. At some places herein the FF- terminal is designated Q, or a; and the FF. terminal is designated non-Q, or b.

Referring now to FIGURE 8, taken in conjunction with FIGURE 7, there are noted the various symbols utilized and the definitions thereof. The transfer symbol is located on the flip flop of FIGURE 7 at terminals 14, 15 and 21 thereof. These three symbols always occur together and are defined to indicate that the impressing of a positive-going voltage transition on terminal 14 will transfer the voltages on the terminals 15 and 21 respectively to the terminals 12 and 11. That is, if a negative voltage is located on terminal 21 and a positive voltage is located on terminal 15, the application of a positive-going transition on terminal 14 will set the flip flop, or, in other words, place a negative voltage level at the FF- output terminal and a positive voltage level at the FF. output terminal thereof. Of course, if the flip flop is already set, no change will take place. Also, if the terminals 15 and 21 each have a negative signal thereon, no change will take place.

The symbol on terminals 17 and 20 indicates that the occurence of a positive-going transition on one of the said terminals will reset the flip flop. The symbol on terminals 19 and 16 indicate that the occurrence of a positive-going transition on one of the said terminals will set the flip flop. The symbol on terminal 18 indicates that the occurence of a positive-going transition on this terminal will complement the flip flop, i.e., change the state of the flip flop from the set condition to the reset condition or from the reset condition to the set condition, depending upon the initial condition of the flip flop.

The symbol on terminal 10 of the flip flop indicates that the placement of a positive voltage level thereon will reset the flip flop. The symbol on terminal 13 of the flip flop indicates that the placement of a positive voltage level thereon will set the flip flop. The above symbols and the other symbols set forth in FIGURE 8 can be used to depict each of the operations of the flip flops utilized in the display to be described hereinafter.

The symbols set forth in FIGURE 8 are also utilized to depict the various gate circuits utilized in the present invention. The gate circuits set forth in FIGURES 10 to 17 are labelled as either AND gates or OR gates. The symbols at the input and output terminals are defined to indicate the type of input and output terminals are defined to indicate the type of input required to provide the designated output. That is, assuming an AND gate, if all input terminals thereto are provided with the negative level symbol of FIGURE 8 and the output terminal thereof is provided with the positive level symbol of FIGURE 8, the symbology states that if a negative level is applied to all input terminals of the gate (AND function) then a positive voltage level will appear at the output terminal thereof. If the gate under consideration is an OR gate having the positive level symbol on the input terminals thereto and a negative level symbol on the output terminal therefrom, the symbology states that if a positive level is applied to at least one of the input terminals thereof (OR function) then a negative voltage level will appear at the output terminal thereof. Other types of gate configurations utilizing the above explained symbology can also be utilized.

The symbology set forth in FIGURE 8 can be used in many other situations. This symbology, when tied to a bus legend, will indicate the signal required on that bus for the bus function to be performed. This symbology is also utilized at the input and output terminals of other types of circuits to indicate the output obtained when a particular input signal is applied thereto. This type of symbology is depicted in FIGURE 9, wherein a one shot is set forth, the symbology indicating that a positive-going transition signal at the input thereto will provide a positive level at the output terminal thereof.

It should be understood that various combinations of the signal symbols set forth in FIGURE 8 can be used, each symbol indicating the function defined thereby.

In the labelling of all buses, the numbers above the bus indicate bus number designation, whereas numbers below the bus indicate continuing portions of the bus. The numbers utilized to designate buses include a first number and a second number after a colon indicating the sheet of drawing as marked in parentheses on said sheets, a letter (T, B, L, R) indicating the top, bottom, left or right side of the sheet and a number indicating the bus designation on the sheet. For example, a bus marked 10:1R7 describes a bus on FIGURE 16 (sheet 10:1) leaving this figure from the right and being the seventh bus down from the top.

With the above conventions and positioning of the figures in mind, the display will now be described in detail with respect to the logic diagram as set forth in FIGURES 10 to 17.

The following is a description of the operation of a preferred embodiment of the display system which can be utilized with a calculator or a like device capable of providing digital information indicative of indicia to be displayed.

The content of each of the storage regsters on track 4 of the drum (FIGURE 5) will be constantly displayed by the display device. The content of each register is displayed on a separate row on the face of a cathode ray tube, thereby indicating the contents of each element of the individual registers, i.e., the entry register, the accumulator register, the temporary storage register No. 1 and the temporary storage register No. 2.

We assume that the track 4 read head M/U–2.1 (FIGURE 13) is initially at the trailing edge of the dead time portion of track 4, and is about to commence reading of data stored in the first or least significant digit position of the temporary storage register No. 1. This section of the temporary storage register No. 1 is indicated by the numbers 1/1 of track 4 in FIGURE 5.

As the track 4 read head passes over the first section (1/1) of the temporary storage register No. 1, all bits stored therein will be read and, for each bit read, a pulse will be obtained having a negative-going transition, this negative-going transistion being applied to the input terminal of the AND gate D/U–1.5. The concurrence of a positive level on the RS bus 7:3L1 inverted by the inverter D/U–8.1, and the negative-going transition from the track 4 read head will enable AND gate D/U–1.5 and provide a positive-going transition at the output thereof, this positive-going transition being applied to the complement input of the No. 1 flip flop of a display entry counter composed of flip flops D/U–1.1 to D/U1.4. All subsequent negative-going transitions on the track 4 read bus 7:3L2 will provide additional positive-going transitions at the output of the AND gate D/U–1.5 and thereby continually set the display entry counter to provide an indication of the number stored in the first section of the temporary storage register No. 1. It will be noted that the count obtained from the temporary storage register No. 1 herein will include the "excess" bit (an integer being represented by a number of bits equal to the integer plus one) and, therefore, the count obtained in the entry counter of the display circuit will be one greater than the number to be ultimately displayed on the display device. This excess bit is merely used by choice, it being understood that almost any code configuration could be utilized.

The flip flops of the display entry counter are, therefore, either in their set or reset condition to indicate the digit read from the element 1/1 temporary storage register No. 1. This reading into the display entry counter takes place during the time period beginning at T0C and ending at T1B, this being the first RS period as shown on FIGURE 63. At the end of the first RS time period, the negative-going transition on the RS bus 7:3L1 is inverted and applied to the input of a one shot D/U–1.7, a negative-going pulse being developed at the output of this one shot. This negative-going pulse is applied over the bus 7:3R8 to the bus 7:1R1, this bus being an input terminal of the inhibit gate D/U–2.1, the other input to this gate being a negative voltage level signal. The concurrence of this negative voltage level signal and a negative-going transition on the input bus thereto 7:1R1 will enable this gate D/U–2.1 and produce a negative voltage level at the output thereof. This negative voltage level is applied to one of the input terminals of each of the AND gates D/U–2.2 to D/U–2.13 of FIGURES 11 and 12. Each of these AND gates D/U–2.2 to D/U–2.13 will provide a negative voltage level output thereat if each of the input terminals thereto is at a negative level. The input terminals of these AND gates are directly connected to the output terminals of the entry counter flip flops D/U–1.1 through D/U–1.4 (FIGURE 13).

It can be seen that the FF· output of the No. 8 flip flop D/U–1.1 of the display entry counter is applied via the bus 7:3R1 to the sole input of AND gate D/U–2.3, an input of the AND gate D/U–2.4, an input of the AND gate D/U–2.5.

The output of the FF· output terminal of the No. 4 flip-flop of the display entry counter is transferred along the bus 7:3R2 to an input terminal of the AND gate D/U–2.6, and the AND gates D/U–2.7, D/U–2.12 and the only input of D/U–2.2.

The output signal on the FF output terminal of the No. 4 flip-flop D/U–1.2 of the entry counter provides a signal on the bus 7:3R3, this signal also appearing at the input terminal of the AND gates D/U–2.10 and D/U–2.13.

The FF· output of the No. 2 flip flop D/U–1.3 of the display entry counter provides a signal along the bus 7:3R4 to the AND gates D/U–2.4, D/U–2.7, D/U–2.8, D/U–2.9 and D/U–2.13.

The FF output of the No. 2 flip flop DU/–1.3 of the display entry counter provides a signal on the bus 7:3R5, this signal being applied to an input terminal of the AND gates D/U–2.11 and DU/–2.12.

The FF· output terminal of the No. 1 flip flop D/U–1.4 of the display entry counter provides a signal along the bus 7:3R6 to an input terminal of AND gates D/U–2.5, D/U–2.8, D/U–2.10 and D/U–2.11.

The FF output terminal of the No. 1 flip flop of the display entry counter D/U–1.4 provides a signal along the bus 7:3R7 to an input terminal of the AND gates D/U–2.6 and D/U–2.9.

At the end of the RS period, the RS bus 7:3L1 will have a negative-going transition thereon, this negative-going transition being inverted by the inverter D/U–8.1 (FIGURE 13) and applied to the input of the one shot D/U–1.7. The one shot D/U–1.7 provides an inverted negative-going transition at the output thereof. The negative-going transition has no effect on the one shot D/U–1.6. After a short delay, the output from one shot D/U–1.7 reverts to a positive voltage level to provide a positive-going transition at the input of one shot D/U–1.6.

This output from the one shot D/U–1.7 is delayed and inverted by one shot D/U–1.6 to provide a negative-going transition at the output thereof to reset the flip flops D/U–1.1 to D/U–1.4 inclusive after the information has been read into the shift register D/U–3.1 to D/U–3.7 inclusive (to be explained hereinafter).

Prior to resetting of the entry counter, the AND gates (FIGURES 11 and 12) are enabled by a negative voltage level at the output terminal of inhibit circuit D/U–2.1 provided by the negative-going transition at the output of one shot D/U–1.7. It can be seen by an inspection of the input terminals of the AND gates D/U–2.2 through D/U–2.13 that the AND gate D/U–2.2 will provide a negative voltage level at the output thereof when the No. 4 flip flop of the display entry counter is in the set condition. The AND gate D/U–2.3 will provide a negative voltage level at the output thereof when the No. 8 flip flop of the display entry counter is in the set condition. The AND gate D/U–2.4 will provide a negative voltage level at the output thereof when both the No. 8 flip flop and the No. 2 flip flop of the display entry counter are in the set condition. The AND gate D/U–2.5 will provide a negative voltage level at the output thereof when both the No. 8 and the No. 1 flip flops of the display entry counter are in the set condition. The AND gate D/U–2.6 will provide a negative voltage level at the output thereof when the No. 4 flip flop of the display entry counter is set and the No. 1 flip flop thereof of this counter is reset. The AND gate D/U–2.7 will provide a negative voltage level at the output thereof when both the No. 4 flip flop and the No. 2 flip flop of the display entry counter are in the set condition. The AND gate D/U–2.8 provides a negative voltage level at the output thereof when both the No. 2 and the No. 1 flip flops of the display entry counter are in the set condition. The AND gate D/U–2.9 provides a negative voltage level at the output thereof when the No. 2 flip flop of the display entry counter is in the set condition and the No. 1 flip flop thereof is in the reset condition. The AND gate D/U–2.10 provides a negative voltage level at the output thereof when the No. 1 flip flop of the display entry counter is in the set condition and the No. 4 flip flop thereof is in the reset condition. The AND gate D/U–2.11 provides a negative level at the output thereof when the No. 1 flip flop of the display entry counter is in the set condition and the No. 2 flip flop thereof is in the reset condition. The AND gate D/U–2.12 provides a negative voltage level at the output thereof when the No. 4 flip flop of the display entry counter is in the set condition and the No. 2 flip flop thereof is in the reset condition. The AND gate D/U–2.13 provides a negative voltage level at the output thereof when the No. 4 flip flop of the display entry counter is in a reset condition and the No. 2 flip flop thereof is in the set condition.

It can be seen from an inspection of the above and FIGURES 11 and 12 that each of the respective buses 7:1R2 to 7:1R7 and 7:2R1 to 7:2R6 will have a negative voltage level thereon when their associated AND gates have been properly enabled.

It should, at this point, be understood that the characters to be displayed are produced from a scanning raster designed to scan a figure "8." This raster is displayed in FIGURE 64 wherein the figure "8" is composed of a plurality of stroke segments numbered from 0 through 6. Each of the possible characters to be displayed on the face of the cathode ray tube is composed of certain ones of these stroke segments and, therefore, in order to properly display a particular character, it is only necessary to suppress the display of certain ones of the strokes.

Suppression of the undesired strokes is accomplished by means of the OR gates D/U–2.14 through D/U–2.20 of FIGURE 14.

The OR gate D/U–2.14 is coupled to the output terminal of the AND gates D/U–2.2, D/U–2.4, D/U–2.5 and D/U–2.8. Therefore, when a negative voltage level appears at the output terminal of any of the above-mentioned AND gates coupled to an input of the OR gate D/U–2.14, a positive voltage level will appear at the output of this OR gate on set stroke zero flip flop bus 8:1R1.

The OR gate D/U–2.15 provides a positive voltage level at the output thereof on the set stroke 6 flip flop bus 8:1R2 when at least one of the AND gates D/U–2.4, D/U–2.6, D/U–2.8 or D/U–2.10 has a negative voltage level at the output thereof.

The OR gate D/U–2.17 provides a positive voltage level at the output thereof on the set stroke 5 flip flop bus 8:1R3 when a negative voltage level is provided at the output terminal of one of the AND gates D/U–2.4, D/U–2.7 or D/U–2.11.

The OR gate D/U–2.7 provides a positive voltage level on the set stroke 4 flip flop bus 8:1R4 when a negative voltage level appears at the output of one of the AND gates D/U–2.8 or D/U–2.10.

The OR gate D/U–2.18 provides a positive voltage level on the set stroke 3 flip flop bus 8:1R5 when a negative voltage level appears at the output terminal of one of the AND gates D/U–2.3, D/U–2.10, D/U–2.12 or D/U–2.13.

The OR gate D/U–2.19 provides a positive voltage level at the output thereof on the set stroke 2 flip flop bus 8:1R6 when a negative voltage level appears at the output terminal of one of the AND gates D/U–2.2, D/U–2.3, D/U–2.9 or D/U–2.11.

The OR gate D/U–2.20 provides a positive voltage level on the output thereof on the set stroke 1 flip flop bus 8:1R7 when a negative voltage level appears at the output terminal of one of the AND gates D/U–2.3, D/U2.6, D/U–2.8 or D/U–2.10.

The signal levels on the buses 8:1R1 to 8:1R7 operate the shift register flip flops D/U–3.1 to D/U–3.7 (FIGURE 15) in the following manner:

The output voltage level signal on the bus 8:1R1 will be applied to the FF. output lead of the zero flip flop D/U–3.1 (FIGURE 15) along the set stroke zero flip flop bus 9:1L1. Similarly, the output voltage level on the bus 8:1R2 will be applied to the FF. output lead of the No. 6 flip flop D/U–3.7; the output voltage level on the bus 8:1R3 will be applied to the bus 9:1L6, this being the FF. output terminal of the No. 5 flip flop D/U–3.6; the output voltage level on the bus 8:1R4 will be applied to the set stroke 4 flip flop bus 9:1L5, this being the FF. output terminal of the No. 4 flip flop D/U–3.5; the output voltage level on the set stroke 3 flip flop bus 8:1R5 will be applied to the set stroke 3 flip flop bus 9:1L4, this being the FF. output terminal of the No. 3 flip flop D/U–3.4; the output voltage level on the set stroke 2 flip flop bus 8:1R6 being applied to the set stroke 2 flip flop bus 9:1L3, this being the FF. output terminal of the No. 2 flip flop D/U–3.3; and the output voltage level on the set stroke 1 flip flop bus 8:1R7 will be applied to the set stroke 1 flip flop bus 9:1L2, this bus being the FF. output terminal of the No. 1 flip flop D/U–3.2.

Thus, when the output voltage level on one or more of the buses 8:1R1 to 8:1R7, as provided by the output signals from the OR gates of FIGURE 14, has a positive going transition thereon, the associated flip flops of the display shift register (FIGURE 15) will be set.

During each of the RS time periods, a series of seven negative-going pulses is generated in response to information on track 6 of the drum (FIGURE 1), these pulses being provided by the track 6 read head D/U–3.10 (FIGURE 15). These negative-going pulses are inverted in the amplifier forming part of D/U–3.10 and then pass through the one shot D/U–3.9 and appear at the output thereof as negative-going transitions. These negative-going transitions which are delayed by the one shot, are then inverted by the inverter D/U–3.8 to provide positive-going transitions on the shift bus, this bus being coupled to the transfer terminal of each of the flip flops of the shift register D/U–3.1 through D/U–3.7.

This transfer input terminal of the flip flops D/U–3.1 to D/U–3.7 will transfer the levels from the input terminals thereof to the output terminals thereof when a positive-going transition is applied thereto. In this manner, the content of the shift register is shifted completely therethrough by the 7 positive-going transitions applied to the transfer input of the flip flops thereof by the track 6 read head (FIGURE 61).

A positive-going transition appears at the output of the one shot D/U–3.9 at the trailing edge of a pulse produced from track 6, this positive-going transition being applied to one of the input terminals of the AND gate D/U–5.1 (FIGURE 15). This AND gate is enabled by the concurrent positive level input provided by the inverter D/U–8.2 which inverts a negative voltage level on the RS bus 9:1R6 and a positive level on the set stroke zero flip flop bus 9:1L1. It can be seen that the level on the set stroke zero flip flop bus 9:1L1, which is applied to the input of the AND gate D/U–5.1, will depend upon the condition at that particular time of the zero flip flop of the shift register D/U–3.1. A set condition of this flip flop will provide a positive level on the FF. output thereof and thereby provide an enabling signal for the AND gate D/U–5.1. However, the absence of a set condition, i.e., a reset condition of flip flop D/U–3.1, will provide a negative level on the FF. output terminal thereof and thereby disenable the AND gate D/U–5.1.

The condition of the AND gate D/U–5.1 determines whether or not an unblanking pulse will be provided to the grid of the cathode ray display tube D/U–7.0 (CRT) (FIGURE 17). The unblanking signal is provided, as explained supra, by the concurrent positive levels at the input terminals of AND gate D/U–5.1, thereby providing a negative output level therefrom, this output level being inverted by the inverter D/U–8.0 (FIGURE 15) to provide a positive level to the grid of the cathode ray tube along the bus 9:1R9. Conversely, it can be seen that the disenabling of AND gate D/U–5.1 will provide a positive output level therefrom and, it follows, that a negative output level will be provided on the bus 9:1R9, thereby cutting off the grid voltage for the CRT and blanking same during that particular stroke time period.

The significant voltage levels on the set stroke zero flip flop bus 9:1L1 (FIGURE 15), which are provided at the input terminal of the AND gate D/U–5.1, are obtained in the following manner: after the flip flops of the shift register have been initially set by the OR gates D/U–2.14 to D/U–2.20 in the manner explained hereinabove, succeeding positive-going transitions applied to the transfer inputs of the shift register flip flops D/U–3.1 to D/U–3.7 will successively shift the output voltage on the output terminals of any one of these flip flops to the next following flip flop of descending order. That is, the output voltage on the FF. and FF· terminals of the No. 6 flip flop D/U–3.7 will be shifted to the output terminals of the No. 5 flip flop D/U–3.6 by the first positive-going transition on the transfer terminal of the No. 6 flip flop. Similarly, the output voltages from the No. 5 flip flop will be transferred to the No. 4 flip flop; the output voltage from the No. 4 flip flop will be transferred to the No. 3 flip flop; the output voltage from the No. 3 flip flop will be transferred to the No. 2 flip flop; the output voltage from the No. 2 flip flop will be transferred to the No. 1 flip flop and the output voltage from the No. 1 flip flop will be transferred to the zero flip flop. Accordingly, for each successive positive-going transition on the transfer inputs of the shift register flip flops, the contents thereof will be shifted upward to the next succeeding flip flop for each incoming positive-going voltage transition.

It can be seen that the shift register will be completely reset after 7 positive-going transitions have been applied to the transfer inputs thereof. This is caused by the fixed voltage levels at the input terminals of the No. 6 flip flop D/U–3.7. The first positive-going transition to the transfer terminal of this No. 6 flip flop will reset this flip flop due to the voltage levels at the input terminals thereof, this reset condition being transferred upward to each of the succeeding flip flops until, after 7 such transitions, all of the flip flops will be reset in the manner described supra for shifting the signals in the shift register.

In the manner described supra, it can be seen that the cathode ray tube grid circuit 9:1R9 will be enable during certain predetermined time periods only, these time periods being determined by the condition of the shift register prior to the application of the transfer signals thereto.

It is also necessary to locate the cathode ray tube beam in the particular area thereof at a particular period in time.

Individual characters are positioned by the application of horizontal and vertical incremental changes in sweep voltage. The appearance of these wave forms is similar to a stair step configuration (FIGURE 62).

There are 4 horizontal tracks displaced on the face of the cathode ray tube. The bottom-most track is a display of the contents of the entry register, the next track is a display of the contents of the accumulator register, the next track is a display of the contents of the temporary storage register No. 2 and the topmost track is a display of the contents of the temporary storage register No. 1. It can therefore be seen that, in order to display, first, the contents of the least significant portion of the temporary storage register No. 1, then the contents of the least significant portion of the temporary storage No. 2, then the contents of the least significant portion of the accumulator register, and then the contents of the least significant portion of the entry register, it is necessary that the position of the cathode ray tube beam be positioned vertically downward by one track level after reading of each section of each of the registers. That is, after the least significant digit of the temporary storage register No. 1 has been displayed, the cathode ray tube beam will be positioned vertically downward to the next track position and the contents of the least significant digit position of the temporary storage track No. 2 will there be displayed. The cathode ray tube beam will then be positioned vertically downward to the next level, whereupon the contents of the least significant digit position of the accumulator register will be displayed and, then, the cathode ray tube beam will again be positioned vertically downward to the bottom most track, whereupon the contents of the least significant digit position of the entry register will be displayed. This process continues with the beam being shifted horizontally by one digit position and vertically back to the topmost row, whereupon the vertical scanning cycle continues ad infinitum until the entire contents of each digit section of the registers have been displayed.

The above is accomplished in the following manner:

The voltage waveform necessary to effect a change in the vertical position of a cathode ray tube beam is developed by the vertical staircase generator circuit D/U–4.7 (FIGURE 16). This circuit receives a negative-going input signal at the end of each RS period. This negative-going voltage level is obtained when the RS bus 9:1R6 (FIGURE 15) goes positive, thereby providing a negative-going output from the inverter D/U–8.2 and a positive-going output from the inverter D/U–4.2. This positive-going output is delayed and inverted by the one shot D/U–4.3 to provide a negative-going output on the step vertical bus 9:1R4. This step vertical signal is applied to the step vertical bus 10:1L2, this bus being an input terminal of the vertical staircase generator D/U–4.7 (FIGURE 16).

These input pulses at the end of each RS period are received by the vertical staircase generator and, through a voltage build-up of a capacitor circuit therein, a voltage waveform is built up, causing the required deflection of the election beam in the cathode ray tube (see FIGURE 62). At the end of every fourth RS time period, a positive-going signal is produced on the step horizontal and reset vertical bus 10:1L1 by the next succeeding positive voltage level W1 timing signal on bus 9:1R8. This signal, in conjunction with a positive RS signal on RS bus 9:1R6, inverted by inverter D/U–8.2, resets the vertical staircase generator D/U–4.7 and, thereby, introduces one step into the horizontal staircase generator D/U–4.8. This single pulse input to the horizontal staircase generator will properly position the succeeding digit position in the horizontal display, this procedure continuing as shown in FIGURE 62.

As explained supra, the vertical staircase generator D/U–4.7 is advanced one step by storing a voltage in a capacitive circuit, this voltage being applied by negative-going transitions applied along the step vertical buses 9:1R4 and 10:1L2. At the following W1 time period, one of the input terminals of the AND gate D/U–4.5 will have a positive voltage level on the W1 input terminal thereof, this terminal being the W1 bus 9:1R8. When the RS bus 9:1R6 goes positive, a positive-going transition will be applied at the output of AND gate D/U–4.5 due to the concurrence of positive signals at the input thereof, this positive-going transition being delayed by the delay circuit D/U–4.6 and appearing on the step horizontal reset vertical bus 9:1R7. This positive-going transition is applied to the step horizontal/reset vertical bus 10:1L1 to reset the vertical staircase generator and step the horizontal staircase generator to its next position. It is noted that this operation takes place once every four RS time periods or, after the track 4 read head has traversed one digit segment of each of the registers therein.

At each resetting of the vertical staircase generator D/U–4.7, a negative-going voltage transition is provided at the output of the vertical staircase generator and transmitted to the input of the horizontal staircase generator, thereby stepping the horizontal staircase generator D/U–4.8.

The horizontal staircase generator is reset once every revolution of the drum. The reset signal is obtained on the H bus 9:1R2 when this bus has a negative transition thereon. This negative transition is delayed and inverted in the one shot D/U–4.1 to provide a positive-going transition on the reset horizontal bus 9:1R3. This positive-going transition is applied to the reset horizontal bus 10:1L3, this bus being an input terminal of the horizontal staircase generator, and resets this circuit to its initial condition. The output of the vertical staircase generator is applied over the vertical staircase buses 10:1R1 and 11:1L11 to one of the input terminals of the vertical amplifier D/U–6.1.

The output of the horizontal staircase generator is applied along the horizontal staircase buses 10:1R2 and 11:1L12 to one of the input terminals of the horizontal amplifier D/U–6.2.

The output waveforms of the vertical and horizontal staircase generators are indicated on FIGURES 62.

Additional signals required to develop the relative positions of the strokes for each character are produced in the following manner:

The track 6 timing signals, previously discussed, are applied along the shift bus 9:1R1 to the shift bus 10:1L4. For each of the 7 pulses obtained from track 6 as discussed supra, a positive-going voltage transition will be obtained, this positive voltage transition being applied to the complement input of the segment generator flip flop No. 1 D/U–4.9 (FIGURE 16), alternately setting and resetting this flip flop. Initially, all of the flip flops D/U–4.9 to D/U–4.12 of the segment generator are in the set condition, i.e., each of the FF· outputs thereof are at a negative voltage level.

After the seven strokes have been obtained from the track 6 read head, the next succeeding signal on the RS bus 9:1R6 will provide a positive-going transition on the reset segment generator bus 9:1R5 and 10:1L5 to reset the segment flip flops D/U–4.9, D/U–4.10, D/U–4.11 and D/U–4.12 of FIGURE 16. As mentioned hereinabove, a resetting of the segment generator places all of the segment generator flip flops in the set condition.

The segment flip flops D/U–4.9, D/U–4.10 and D/U–4.11 of the segment or stroke generator act as an up counter because the setting of the segment No. 1 flip flop will cause the segment No. 2 flip flop to be reset while the settinng of the segment No. 2 flip flop will cause the segment No. 4 flip flop to be reset, thus producing a binary output signal pattern as indicated in FIGURE 61. The No. 4′ flip flop of the segment generator D/U–4.12 produces a signal output with a staggered timing pattern in relation to the No. 4 flip flop D/U–4.11. The output signal from the No. 4′ flip flop D/U–4.12 will shift the output of a sine wave producing stroke oscillator D/U–5.3 between the vertical and horizontal deflection amplifiers as required.

The segment generator outputs labelled SEG 1 (10:1R3), SEG 2 (10:1R6) and SEG 4 (10:1R7) are applied to the input terminals of the vertical summing network D/U–4.13 (FIGURE 17). The vertical summing network produces an output voltage based upon the condition of the three inputs thereto from the segment generator. The vertical summing circuit therefore provides an output voltage which is weighted in accordance with the condition of the inputs thereto. The specific weighting of the output voltage of the vertical summing circuit as based on input conditions is set forth in FIGURE 65.

An additional input is applied to the vertical summing network through a resistor D/U–5.8 which originates at the output of the oscillator OR gate D/U–5.2 which resistor is part of a circuit (not shown) for providing a decimal point.

The output of the vertical summing network is applied to an input terminal of the vertical mixing network D/U–5.6 which, when not inhibited by the inhibit gate D/U–5.5, passes vertical deflection signals to the vertical deflection amplifier D/U–6.1.

The inhibit gate D/U–5.5 passes signals therethrough from the oscillator D/U–5.3 to the vertical mixing network to provide the required oscillatory scan for making a line trace. The inhibit gate D/U–5.5 is enabled when a negative voltage level appears on the input 11:1L1. The situation occurs when the No. 4′ flip flop of the segment generator is in the set condition, i.e., the SEG (4′)· output is at a negative voltage level.

The segment generator outputs labelled SEG 2· (10:1R5) and SEG 4 (10:1R7) are applied to the input terminals of the horizontal summing network D/U–4.14 (FIGURE 17). The horizontal summing network produces an output voltage based upon the condition of the inputs thereto from the segment generator. The horizontal summing circuit therefore provides an output voltage which is weighted in accordance with the condition of the inputs thereto. The specific weighting of the output voltage of the horizontal summing circuit as based on input conditions is set forth in FIGURE 65.

The output of the horizontal summing network is applied to an input terminal of the horizontal mixing network D/U–5.7 which, when not inhibited by the inhibit gate D/U–5.4, passes horizontal deflection signals to the horizontal deflection amplifier D/U–6.2.

The inhibit gate D/U–5.4 is identical to inhibit gate D/U–5.5, described hereinabove. This gate operates when gate D/U–5.5 is not operating because, whereas the gate D/U–5.5 is coupled to the FF· output of the No. 4′ flip flop of the segment generator, the gate D/U–5.4 is coupled to the FF. output of this same flip flop.

The two inhibit gates D/U–5.5 and D/U–5.4 control the path taken by the oscillator stroke-producing signal by the application of signals from the segment generator. That is, the output of the pigment flip flop No. 4′ FF. terminal 10:1R9 is applied to the inhibit gate D/U–5.5, thereby enabling this gate and transferring the oscillator signal to the vertical deflection amplifiers.

The output of the segment flip flop No. 4′ FF terminal 10:1R8 controls the inhibit gate D/U–5.4, this gate controlling the transfer of the oscillator stroke signal to the horizontal deflection amplifier when enabled by the signal of bus 10:1R8. The sequence of the stroke generation pattern is shown in FIGURES 64 and 65.

A slant adjustment circuit D/U–6.3 is coupled between the buses 11:1L11 and 11:1L12.

Typical generation of the character stroke proceeds as follows:

Initially, all of the flip flops D/U–4.9 to D/U–4.12 of the segment generator (FIGURE 16) are in the set condition. Therefore, initially, the segment generator provides a negative voltage level on the SEG 1· bus, a positive voltage level on the SEG 2. bus, a negative voltage level on the SEG 2· bus and a positive voltage level on the SEG 4. bus. Therefore, initially, the segment generator will provide an output voltage configuration as shown for stroke No. Zero (0) in FIGURE 65. The vertical coordinate will have a weight of two (2) and the horizontal coordinate will have a weight of one (1).

The weights are determined in the following manner.

A positive voltage level on the SEG 1· output of the segment generator provides a weight of two (2). A positive voltage level on SEG 2·, SEG 2. or SEG 4. outputs provides a weight of one (1). Negative voltage levels on these outputs provide a weight of zero (0).

When the first pulse from track 6 of the drum is applied through TK6 read head and associated circuitry (FIGURE 15) to the shift input 10:1L4 of the segment generator, the generator counts one count and provides the configuration of outputs set forth for stroke No. 1 in FIGURE 65. In this condition the output SEG 1. is at a positive voltage level as are the SEG 2. and SEG 4. outputs. The SEG 2· output is at a negative voltage level. In this manner a vertical weight of four (4) is provided and a horizontal weight of one (1) is provided, corresponding to stroke No. 1 in FIGURE 65.

The next pulse from track 6 shifts the segment generator to the stroke No. 2 condition as set forth in FIGURE 65 and all subsequent pulses from track 6 will provide generation of the remaining strokes in order, as shown in FIGURES 64 and 65.

The FF· output of the No. 4′ segment flip flop will be at a negative voltage level during the zero stroke time and thus will enable the inhibit gate D/U–5.4, thereby causing a stroke signal as produced by the oscillator D/U–5.3 to be directed to the horizontal deflection amplifier D/U–6.2. Also, during the No. 1 and No. 6 stroke times, the inhibit gate D/U–5.4 will remain enabled, again producing a horizontal stroke during the No. 1 stroke time. During the No. 2, No. 3, No. 4 and No. 5 stroke times the FF. output of the No. 4′ segment flip flop will be at a negative voltage level, thereby causing a stroke signal as produced by the oscillator to be directed to the vertical deflection amplifier D/U–6.1.

This operation is carried on for the remaining strokes in a similar manner to generate each segment of the "8" pattern of FIGURE 64. As mentioned supra, the desired character is scanned on the face of the CRT by timely blanking the grid of the CRT when the unwanted strokes of the figure "8" are scanned, thereby eliminating certain ones of the figure "8" strokes. This is provided since both the shift register (FIGURE 15) and the segment generator (FIGURE 16) are stepped by the same timing pulses from track 6 of the drum, thereby providing synchronism therebetween. In this manner, the contents of the track 4 registers are displayed on the face of the CRT.

FIGURES 42 to 60 set forth a typical circuit diagram of the preferred embodiment of the invention previously described.

Before discussing the circuit diagram, it will first be necessary to set forth the conventions utilized and the contents of various blocks depicting a typical circuit configuration.

CONVENTIONS

In order that the buses of the various sheets of drawing be easily followed, bus numbers have been provided, some of which appear above the bus line and some of which appear below the bus line. The numbers include a first number, a letter (T, B, L or R) and a second number. The first number refers to the sheet number in parentheses ( ) rather than the figure number. The letter indicated top (T), bottom (B), left (L) and right (R). The second number indicates the number of the bus.

All bus numbers appearing above a bus line refer to that bus on that sheet. All bus numbers appearing below a bus line refer to the sheet or sheets and bus thereon to which this bus is connected. For example, a number 167T2 above a bus line indicates a bus which leaves sheet (167) at the top thereof and is the second top bus going from left to right. A number 173L1 below a bus line indicates that the bus line continues at sheet (173), the first bus down from the top on the left side of sheet (173).

SUMMARY OF THE "FLIP FLOP MODES OF OPERATION" DIAGRAM (FIGURE 18)

Referring to FIGURE 18, the table therein defines the RESET ("0") and the SET ("1") conditions for the several flip flops numbered I, II, III used in the circuit. The flip flops are defined as being RESET if output $b$ thereof is at a negative voltage level and output $a$ thereof is at a positive voltage level. The values provided in this table are approximate values only.

FIGURE 18 also illustrates all possible input and output configurations, though it is apparent, by referring to the individual flip flop diagrams, that only certain combinations of these inputs are used with any given flip flop. This diagram will serve primarily as a reference aid to location of flip flop terminals. As set forth in FIGURE 18, the following inputs require a positive transition signal (i.e., a rapid change in voltage levels from a negative voltage to a positive voltage level), $i, h, g, f$. The following inputs operate by the application of a positive pulse: $d$ (T), $c$ (W), $a, b$. (Note: connections $a$ and $b$ may be considered as bifunctional connections in the sense that these connections primarily function as outputs. However, a positive pulse may be introduced into the flip flop to momentarily force the appropriate output connection to a positive voltage level.) Terminals $j$ and $e$ serve as static inputs, i.e., changes of voltage levels at these inputs do not, of themselves, change the state of the flip flop. Rather, these "gate" inputs serve to retain appropriate voltage levels until it is desired to transfer these levels to the corresponding output terminals $a$ and $b$ by the application of a positive transition signal to the input $c$ (W). Input $d$ (T) operates as a "toggle" input. That is, the flip flop will continue to change states upon the application of sucecssive positive transition signals thereto. As shown in FIGURE 45, a positive-going transition on the $f$ and $h$ input terminals will set the flip flop, whereas a positive-going transition on the $g$ and $i$ input terminals will reset the flip flop. If the $g$ and $h$ input terminals are tied together, these inputs will then operate as a complementing input for all positive-going transitions applied thereto, thereby alternately setting and resetting this flip flop. A positive voltage level applied to the $b$ input terminal will set the flip flop, whereas a positive voltage level applied to the $a$ input terminal will reset the flip flop.

The above symbology will be utilized in depicting all flip flops in FIGURES 42 to 60.

FIGURE 19 illustrates the operation of a typical one shot circuit. Upon the application of a positive transition signal at the left-hand input (denoted by a diamond shaped symbol), the one shot circuit will produce a negative output signal. The pulse width of this signal is determined by the RC time constant of the one shot. The letter M signifies a connection point to the one shot circuit wherein an external capacitor may be connected from point M to the output connection in order to change the pulse width of the output signal.

FLIP FLOP 1

Circuit operation

FIGURES 20 and 21 set forth the circuit diagram and block diagram of the type I flip flop. The type I flip flop is typical of the type circuit designed to remain in one of two stable states at the termination of a triggering signal thereto. Six separate input terminals are available, two of which make use of bifunctional connections being primarily operated as outputs. The four connections used as inputs only are labelled: $i, h, g,$ and $f$. Two outputs (previously mentioned as bifunctional connections) are provided: $a$ and $b$. A typical cycle of operation follows wherein it is assumed that the flip flop is reset, i.e., in FIGURE 20, Q2 is "on" (conducting) and Q1 is "off" (non-conducting). Assuming further that a positive transition signal is to be applied to the $h$ input, the $h$ input would be initially at a negative level. The lower side of capacitor C3 would then be at a negative voltage level. Also, the upper side of this capacitor would be at a positive voltage level because of the connection thereat to the collector of transistor Q2 through resistor RS5. As a result, capacitor C3 will have a charge of approximately 6 volts thereacross. At the arrival of the positive-going transition pulse, the lower side of the capacitor C3 will be driven to a positive voltage level, causing the upper side of capacitor C3 to be driven to a level of approximately +6 volts. The diode D4, pointing toward and connected to the base of transistor Q2, will transfer this positive transition signal to the base of transistor Q2, causing this transistor to be turned "off."

As transistor Q2 is turned "off", the collector thereof will approach —6 volts. A negative transition signal will be developed at the collector of transistor Q2, therefore, and will be transferred to the base of transistor Q1 through capacitor C1. This negative transition signal, by being applied to the base of transistor Q1 will turn transistor Q1 "on," causing the collector thereof to approach a positive voltage level. A positive-going transition signal will, therefore, be produced at the collector of transistor Q1 and will be transferred to the base of transistor Q2 through capacitor C4, aiding in turning "off" transistor Q2 by the initial positive transition signal applied to input $h$ thereof. As a result, a rapid build-up of reinforced signals will develop wherein transistor Q2 will be turned "off" and transistor Q1 turned "on."

Biasing networks for each transistor will establish the required voltage levels at the respective bases of each transistor to maintain the resulting state of the flip flop as follows: Since transistor Q2 is now turned "off," the collector thereof will be at a negative voltage level. As a result, the midpoint of the voltage divider composed of RS1 and RS2 and connected to the collector of transistor Q1 will be sufficiently negative to maintain transistor Q1 turned "on." Also, the voltage level at the midpoint of the voltage divider composed of RS7 and RS8 and connected to the collector of transistor Q1, will be sufficiently positive to maintain transistor Q2 turned "off." The diodes D2 and D3 are used to speed up the charging of capacitors C2 and C3, respectively, at the time the flip flop is changing states.

Resistors RS3 and RS6 serve as load resistors for transistors Q1 and Q2, respectively.

Additional methods of triggering the flip flop may be employed, such as applying a positive pulse to input $f$ which is connected directly to the base of transistor Q2. (It has been assumed that the flip flop is "reset" and transistor Q2, therefore, would be turned "on".) A positive transition signal, being applied directly to the base of transistor Q2, will initiate a triggering action similar to that caused by a positive transition signal at the input $h$.

Again, assuming the flip flop to be "reset" with transistor Q2 turned "on" and transistor Q1 turned "off," a negative transition signal may be introduced via input $i$ directly to the base of transistor Q1. Transistor Q1 would then be turned "on," the collector thereof approaching a positive voltage level and developing a positive transition signal which would be introduced through capacitor C4 to the base of transistor Q2, turning transistor Q2 "off." As transistor Q2 is turned "off," a negative transition signal is developed at the collector thereof and further aids the negative transition signal applied to the base of transistor Q1 via input $i$. This action continues with a result that transistor Q1 is turned "on" and transistor Q2 turned "off," thus setting the flip flop.

A final variation in methods of triggering the flip flop involves the "grounding" of one of the output leads.

Beginning with the flip flop in the reset condition ($a$ at a positive voltage level and $b$ at a negative voltage level), the application of a positive voltage level signal to output $b$ will result in a positive transition signal being applied to the base of transistor Q2 and to capacitor C4, turning transistor Q2 "off." As transistor Q2 is turned "off," a negative transition signal is developed at the collector thereof which signal is applied to the base of transistor Q1 through capacitor C1, turning transistor Q1 "on." As transistor Q1 is turned "on," the collector thereof will remain at a positive voltage level as previously established by the positive voltage level signal at output $b$. Transistor Q2 will remain turned "off" and transistor Q1 turned "on," upon the termination of the initiating positive voltage level signal at output $b$. With the exception of the fact that a positive voltage level signal is established at the collector of transistor Q1, sooner than usual, the application of a positive voltage level signal to the output $b$ will produce a triggering action similar to that produced by applying a positive signal to the input $f$.

Inputs causing the flip flop I to change from a "set" to a "reset" condition, initiate triggering action similar to that developed by input signals changing the flip flop from a "reset" to a "set" condition. Assuming the flip flop to be set, the application of a positive transition signal to input $g$ will turn transistor Q1 "off" and turn transistor Q2 "on" in the same way as that previously described for the application of a positive transition signal to input $h$.

SUMMARY OF FLIP FLOP TYPE I TRIGGERING METHODS

Group A Signals (reset to set)

|  | Transition signal |
|---|---|
| Input $i$ | Negative |
| Input $h$ | Positive |
| Input $f$ | Positive |
| Output $b$ | Positive |

Group B Signals (set to reset)

| Input $i$ | Positive |
|---|---|
| Input $g$ | Positive |
| Input $f$ | Negative |
| Output $a$ | Positive |

FLIP FLOP II

Referring to FIGURES 22 and 23, there is shown the circuit diagram of the type II flip flop. The type II flip flop is typical of the type of circuit designed to remain in one of two stable states at the termination of a triggering input signal. The principal differences between the type II flip flop and the other flip flops in this series are limited to the methods of triggering the transistors and the inclusion of "gating inputs." Four separate inputs are available, two of which make use of bifunctional terminals primarily operated as outputs. The two connections used as inputs only are labelled $i$ and $f$. Two outputs previously mentioned as bifunctional connections are labelled $a$ and $b$. In addition, two gates ("gating inputs") $j$ and $e$ are included. Finally, a transfer input is used to change the state of the flip flop upon each application of positive transition signal. This input is labelled $c(W)$.

The two gate inputs, $j$ and $e$, peculiar to the type II flip flop, serve to transfer voltage levels appearing on these inputs to the outputs $a$ and $b$ respectively. Output terminal $a$ will assume the voltage level on gate input $j$ while the output terminal $b$ will assume the voltage level on the gate input $e$. A typical cycle of operation follows wherein it is assumed that the flip flop is reset, i.e., transistor Q2 is "on" and transistor Q1 is "off." Assuming further that a positive transition signal is applied to the transfer input $c$, input $c$ will be at a negative voltage level. The common plate of capacitor C2 and C3, connected to input $c$ will be at a negative voltage level also. (An additional assumption will be made at this point that gate input $e$ is at a positive voltage level and gate input $j$ is at a negative voltage level.) The plate of capacitor C3, therefore, connected to resistor RS6, will be at a positive voltage level, while the plate of capacitor C2, connected to resistor RS3, will be at a negative voltage level. As a result, capacitor C2 will have no charge thereacross while capacitors C3 will have an approximate 6 volt charge thereacross. At the arrival of a positive transition signal at input c(W), the common plates of capacitors C2 and C3 will approach the positive voltage level, while the plates of capacitor C3 connected to resistor RS6 will approach +6 volts. Therefore, a positive transition signal of approximately +6 volts will be applied to the base of transistor Q2 through diode D4 (pointing toward and connected to the base of Q2), turning transistor Q2 "off." Since capacitor C2 has no charge thereacross, there will be no effect upon the base of Q1 at the arrival of the positive transition signal at input c(W).

As transistor Q2 is turned "off," a negative transition signal is developed at the collector thereof, this signal being applied to the base of transistor Q1 through capacitor C1 and turning transistor Q1 "on." As transistor Q1 is turned "on," the collector thereof approaches a positive voltage level, developing a positive transition signal at this point. This positive transition signal is then applied to the base of transistor Q2 through capacitor C4, aiding the initial positive transition signal applied to the base of transistor Q2 from input c. Therefore, a rapid change of state will ensue wherein transistor Q1 will be turned "on" and transistor Q2 will be turned "off." The flip flop will now be set.

Biasing networks for each transistor will establish the required voltage levels at the respective bases of each transistor to maintain the resulting state of the flip flop as follows: Since transistor Q2 is now turned "off," the collector thereof will be at a negative voltage level. As a result, the midpoint of the voltage divider composed of RS1 and RS2 and connected to the base of transistor Q1, will be sufficiently negative to maintain transistor Q1 turned "on." Also, the voltage level at the midpoint of the voltage divider composed of RS7 and RS8 and connected to the base of transistor Q2 will be sufficiently positive to keep transistor Q2 turned "off." The diodes D2 and D3 are used to speed up the charging of capacitors C2 and C3 respectively at the time the flip flop is changing states. Resistors RS4 and RS5 serve as load resistors for transistors Q1 and Q2 respectively.

Additional methods of triggering the flip flop may be employed such as applying a positive pulse to input $f$ which is connected directly to the base of transistor Q2. (It has been assumed that the flip flop is "reset" and that transistor Q2 is, therefore, turned "on.") A positive transition signal, applied directly to the base of transistor Q2 will initiate a triggering action similar to that cause by a positive transition signal at the input c. A third triggering method proceeds as follows: Assuming the flip flop to be reset (transistor Q2 "on," transistor Q1 "off"), a negative transition signal may be introduced via input $i$ directly to the base of transistor Q1. Transistor Q1 will then be turned "on," the collector thereof approaching a positive voltage level and developing a positive transition signal which is applied, through capacitor C4, to the base of transistor Q2, turning transistor Q2 "off." As transistor Q2 is turned "off," a negative transition signal is developed at the collector thereof which further aids the negative transition signal applied to the base of transistor Q1 via input $i$. This action continues with the transistor Q1 being turned "on" and transistor Q2 being turned "off," thus "setting" the flip flop.

A unique feature of the type II flip flop concerns the relationship of the gate inputs $j$ and $e$ and the outputs $a$ and $b$. This relationship is such that if the outputs are at the same voltage levels as the respective inputs, there will be no change of state of the flip flop upon the application of a positive transition signal at the transfer gate c. If, however, the input gates have voltage levels of opposite polarity to those voltage levels at the respective outputs, then, upon application of a positive transition signal at the transfer gate c, the flip flop will change states wherein the outputs will assume voltage levels matching the voltage levels at the respective gate inputs.

SUMMARY OF FLIP FLOP TYPE II TRIGGERING METHODS

Group A signals (reset to set) gate voltage levels

Gates:
- Input $j$ _____ Negative voltage level.
- Input $e$ _____ Positive voltage level.
- Input $i$ _____ Negative transition signal.
- Input $f$ _____ Positive transition signal.
- "Transfer" input $c(W)$ _____ Positive transition signal.

Group B signals (set to reset) gate voltage levels

Gates:
- Input $j$ _____ Positive voltage level.
- Input $e$ _____ Negative voltage level.
- Input $i$ _____ Positive transition signal.
- Input $f$ _____ Negative transition signal.
- "Transfer" input $c(W)$ _____ Positive transition signal.

FLIP FLOP III

Circuit operation

Referring to FIGURES 24 and 25, there is shown the circuit diagram of the type III flip flop. The type III flip flop is typical of the type of circuit designed to remain in one of two stable states at the termination of a triggering signal. Principle differences between the type III flip flop and other flip flops in this series are: (a) type III flip flop uses supply voltages of negative 12 volts and positive 12 volts rather than the 6 volt supply used elsewhere, (b) there are no speed-up diodes used in conjunction with the charging of the capacitors in the triggering circuits and (c) the toggle input $d$ is connected to a negative 12 volt source through a resistor. Two separate inputs are available, one of which makes use of a bifunctional connection basically classed as an output. The single connection used as an input only is labelled $d(T)$ and is used as a "toggle" input, i.e., the flip flop will change states upon the application of successive positive transition signals at this input. Two outputs are provided: $a$ and $b$ (note: output $b$ has previously been mentioned as a bifunctional connection). A typical cycle of operation follows wherein it is assumed that the flip flop is reset, i.e., transistor Q2 is "on" and transistor Q1 is "off."

The application of a positive transition signal to input terminal $d(T)$ indicates a previously established negative voltage level at this input wherein the input capacitors C2 and C3 are charged as follows:

The common plates of these capacitors, connected to the input $d$, are at a negative voltage level. The plate of capacitor C3, connected to the collector of transistor Q1 through resistor RS9, is at a negative level because transistor Q1 is turned "off" and the collector thereof will be at an approximate 12 volt level. The plate of capacitor C2, connected to the collector of transistor Q2 through resistor RS1, is at approximately positive voltage level due to the fact that transistor Q2 is turned "on" and the collector thereof is at about ground level. Therefore, capacitor C2 will have an approximate 6 volt charge thereacross, whereas capacitor C3 will have no charge thereacross. Therefore, since a positive transition signal is applied, the common junction of input capacitors C2 and C3 will approach ground level. As a result, a positive pulse of approximately 6 volts will be applied to the base of transistor Q2 through the diode D2, pointing toward, and connected to, the base of transistor Q2. Transistor Q2 will then be turned "off," the collector thereof approaching a —12 volt level and a negative transition signal being developed at the collector. This negative transition signal is applied, through capacitor C1, to the base of transistor Q1, turning transistor Q1 "on," and developing a positive transition signal at the collector thereof. This positive transition signal is applied to the base of transistor Q2 through capacitor C4, aiding in turning "off" transistor Q2 by the initial positive transition signal applied at input $d$. A rapid change of state, therefore, occurs wherein transistor Q2 is turned "off" and transistor Q1 is turned "on," setting the flip flop. Biasing networks will maintain the flip flop in a "set" condition as follows:

Since transistor Q2 will be turned "off," the collector thereof will be at an approximate −12 volt level. Therefore, the midpoint of the voltage divider connected to the collector of transistor Q2 and comprising resistors RS3 and RS5, will be sufficiently negative to maintain transistor Q1 turned "on." Conversely, the collector of transistor Q1 will be at an approximate ground level. The midpoint of the voltage divider connected to the collector of transistor Q1 and comprising resistors RS7 and RS6, will be sufficiently positive to maintain transistor Q2 turned "off." As a result, the flip flop will remain in a set condition, i.e., output $a$ will be at a −12 volts and output $b$ will be at an approximate ground level. Resistors RS2 and RS8 serve as load resistors for transistors Q2 and Q1 respectively. An additional set input is available by "grounding" (applying a positive transition signal to) the output $b$. This action will impress a positive transition signal upon the base input of transistor Q2 through capacitor C4, turning "off" transistor Q2. A negative transition signal is then produced at the collector of transistor Q2 which is applied to the base of transistor Q1 through capacitor C1, turning transistor Q1 "on." As transistor Q1 is turned "on," the collector thereof will approach ground level, developing a positive transition signal which signal will aid in turning "off" transistor Q2 by the initial "grounding" of the output $b$. Transistor Q2 is then turned "off" and transistor Q1 is turned "on," thereby "setting" the flip flop.

Identical triggering action is established in setting and resetting the flip flop upon the application of successive positive transition signals to the input $d(T)$. The application of a ground level signal to output $b$ will result in a positive transition signal being applied to the base of transistor Q2 through capacitor C4, turning transistor Q2 "off." With the exception of the fact that a ground level signal is established at the collector of transistor Q2 sooner than usual, the application of a positive transition signal to the output $b$ will produce a triggering action similar to that produced by applying a positive-going transistion signal to the input $d$.

SUMMARY OF FLIP FLOP TYPE III TRIGGERING METHODS

Triggering methods of the type III flip flop are limited to two types: the "toggle" input $d(T)$ and a "SETTING" input using the bifunctional connection $b$. The latter input may be considered as a means of changing the state of the flip flop by forcing one or more outputs to the desired voltage level.

STANDARD ONE SHOT

Referring to FIGURE 27, there is shown the circuit diagram of the standard one shot (FIGURE 26). The principal function of this circuit is to develop output pulses with: (a) voltage transitions corresponding to those of the input signals that are delayed by a fixed amount and (b) specific waveshapes and pulses widths relatively independent of the input signals. Differences between the standard one shot circuit and others of this series are (a) the output signal is delayed from the input signal, (b) the output signal is inverted in relation to the input signal, and (c) a single transistor is used to accomplish the one shot function. A typical cycle of operation is initiated by the application of a positive transition signal at the input thereof (denoted by the diamond shape symbol). Prior to the application of the initiating input signal, the "rest" condition of the one shot is as follows: the input lead to a capacitor C is at an approximate −6 volt level while the other plate of capacitor C connected to resistor R1 and to the base of the transistor is at approximately ground level. This ground level is developed because the transistor is biased "on" by the connection to the −12 volt supply through resistor R1 and, therefore, the voltage drop across resistor R1 will establish a ground level voltage at the junction between resistor R1 and the base of the transistor. The transistor is then turned "on," the collector thereof approaching an approximate ground level. The positive transition signal impressed upon the input lead is transferred to the base of the transistor as +6 volt signal due to the 6 volt charge across the capacitor. This 6 volt positive transition signal will then turn the transistor "off," driving the collector thereof toward −12 volts, i.e., a negative transition signal will be developed at the collector of the transistor. The output of the one shot will then remain at a negative voltage level for a period of time determined by the RC time constant of capacitor C and resistor R1. At the time capacitor C has discharged to a sufficiently low negative voltage level, the transistor will be turned "on" and the collector thereof will return to an approximate ground level. The one shot, therefore, produces a negative pulse of predetermined pulse width upon the application of a positive transition signal at the input terminal.

This type of one shot, when set forth by letter (e.g., CAC in FIGURE 26) refers to the components set forth in the one shot of FIGURE 27. Referring to FIGURE 27, it is noted that the first such letter refers to the value of capacitor C, the second letter refers to the value of resistor R1 and the third letter refers to the resistor R2. Therefore, the one shot CAC would be a one shot as set forth in FIGURE 27, wherein the capacitor is 0.0015 μf., resistor R1 is 6.8K ohms and resistor R2 is 2.2K ohms.

ONE SHOT I

Referring to FIGURE 28, there is shown the circuit diagram of the type I one shot (FIGURE 29). The function of the type I one shot is such that an independently controlled positive output pulse of variable width and shaping will be produced upon the application of a positive transistion input signal thereto. The principal difference between the type I one shot and the other one shots in this series is the use of two transistors acting in a type of flip flop operation to produce the output pulse. Also, there is no inversion of the input pulse as this input pulse is acted upon by the one shot, i.e., a positive input pulse will produce a positive output pulse.

A typical cycle of operation proceeds as follows:

The "rest" position of the one shot is indicated by transistor Q1 being "off" and transistor Q2 being "on," the output terminal, therefore, being at a negative voltage level.

The input (denoted by a diamond-shaped symbol), being at a negative voltage level prior to the application of the input signal thereto, the plate of capacitor C2 connected to the input will also be at a negative voltage level. The other plate of capacitor C2 is connected to ground through resistor RS4. As a result, capacitor C2 has an approximate 6 volt charge thereacross. Upon the application of a positive transition signal to the input, the plate of capacitor C2 connected to the input terminal will be raised to ground level (0 v.) while the other plate thereof, connected to diode D2, will be raised to approximately +6 volts. Thus, a +6 volt transition signal will be applied to the base of transistor Q2 through the diode D2, pointing toward and connected to the base of transistor Q2. Transistor Q2 will, therefore, be turned "off," producing a negative transition signal at its collector. This negative transition signal is then applied to the base of transistor Q1 through capacitor C1, turning transistor Q1 "on" and causing the collector thereof to approach ground level (0 v.).

Capacitor C3 connected from the base of transistor Q2 to the collector of transistor Q1 has an approximate 6 volt charge because the plate of capacitor C3 connected to the base of transistor Q2 is at ground level (0 v.). This ground level is established because transistor Q2 is turned "on" with the base thereof being close to the ground level due to the voltage drop across resistor RS6. The other plate of capacitor C3 will be at an approximate +6 volt level because transistor Q1 is turned "off" and the collector thereof is at an approximate −6 volt level. The plate of capacitor C3 connected to the base of transistor Q2, will then approach a +6 volt level. A +6 volt transition signal is therefore applied to the base of transistor Q2 aiding the initial positive transition signal applied to the base of transistor Q2 through the input circuit. Therefore, transistor Q2 will be turned "off" and transistor Q1 will be turned "on." The one shot will remain in this condition until capacitor until capacitor C3 has discharged sufficiently to cause the base of transistor Q2 to return to a negative voltage level, turning "on" transistor Q2. As transistor Q2 is turned "on," the collector thereof approaches ground level, producing a positive transition signal which is applied to the base of transistor Q1 through capacitor C1, turning transistor Q1 "off." Therefore, the one shot will be returned to its original state wherein transistor Q2 will be turned "on" and transistor Q1 will be turned "off."

A biasing circuit is provided to maintain a positive "cut-off" voltage on the base of transistor Q1. This biasing circuit is comprised of resistors RS1 and RS2, the upper side of this biasing circuit being connected to the collector of transistor Q2. Resistors RS3 and RS5 serve as load resistors of transistors Q1 and Q2 respectively. Capacitor C4 is an optical component which may be used to change the RC time constant as initially determined by capacitor C3 and resistor RS6 of the one shot and thus vary the output pulse width thereof.

ONE SHOT V

Referring to FIGURE 30 for the circuit diagram of the type V one shot (FIGURE 31), the principal function of the type V one shot is to establish an approximate −12 volt signal level at the output of the one shot for a period of time determined by the RC time constant of the one shot upon the application of a positive transition signal at the input thereof (denoted by a diamond-shaped symbol). During the quiescent condition of the one shot, as indicated by a negative signal level at the input, the transistor Q1 will be biased "off" by being connected to a −90 volt supply through resistor RS3, establishing, therefore, a relatively positive signal level at the output. Capacitor C1 will have relatively little charge thereon because both plates thereof will be very nearly at −12 volts. Also, capacitor C2 will have a relatively small charge thereon, due to the small voltage drop across resistor RS2. A positive transition signal applied to the input will be transferred through capacitors C1 and C2 to the base of transistor Q1, turning transistor Q1 "on." The output of the one shot will then be driven to an approximate −12 volt signal level and will remain at this level for a period of time determined by the RC time constant of capacitor C1 and resistor RS1. When capacitor C1 has discharged to a sufficiently low voltage, the base of transistor Q1 will return to a sufficiently negative level to turn transistor Q1 "off."

At the time transistor Q1 is turned "off," the output thereof will return to a relatively positive level.

ONE SHOT VI

Referring to FIGURE 32 for the circuit diagram of the type VI one shot (FIGURE 33), the principal function of the type VI one shot is similar to the type V one shot, except that the type VI one shot operates slower as a result of the omission of a speed-up capacitor across the transistor base input resistor thereof. Differences between the one shot type V and VI and others in this series are the inclusion of additional resistors in the transistor base bias circuit and stabilization of the −12 volt supply and a collector resistor RS4. During the quiescent condition of the type VI one shot, as indicated by a negative signal level at the input (denoted by a diamond-shaped symbol), transistor Q1 will be biased "off" due to the negative voltage level established at the base of the transistor Q1 by the connection thereto of a −90 volt supply through resistor RS3. The transistor output, therefore, will be at a relatively positive voltage level. Since both plates of capacitor C1 will be at a similar −12 volt level, capacitor C1 will have relatively no charge thereacross. A positive transition signal applied to the one shot input, therefore, will be transferred to the base of transistor Q1 through resistor RS2, turning transistor Q1 "on." As transistor Q1 in turned "on," the collector thereof will approach −12 volts and a negative transition signal will be developed at the output of the one shot. The output of the one shot will remain at a negative signal level for a period of time determined by the RC time constant of capacitor C1 and resistor RS1. When capacitor C1 has discharged to a sufficiently low voltage, the base of transistor Q1 will return to a negative level such that transistor Q1 will be turned "off," causing the collector thereof to return to a relatively positive level.

STANDARD INVERTER

Referring to FIGURE 35 for the circuit diagram of the standard inverter (FIGURE 34), the principal functions of the standard inverter are: (a) the inversion of an input signal, e.g., if the input signal is negative, then the output signal will be positive (b) the amplification of the input signal (in this application, the inverter may be considered as a "buffer"). FIGURE 34 indicates the symbol used to represent the standard inverter. In addition, the designations describe the location of the individual inverter within any particular figure and the type of inverter, i.e., the values of the components that are used for that particular inverter. The tabulations of FIGURE 35 summarize the various parameter values of the components indicated for different inverters. The example shown below these tabulations would be interpreted as follows: The first B indicates that the input capacitor C has a value of 220 $\mu f$. F. indicates that the input resistor R1 has a value of 6.8K ohms (6.8 thousand ohms). The second B indicates that the bias resistor R2 has a value of 22K ohms. The third B indicates that the voltage supply V has a value of −12 volts. The figure 1.8 following the dash represents the value of the load resistor R3 in kilohms, in this case, 1.8 kilohms. During the quiescent condition, the transistor will be biased "off" by a positive voltage developed at the base of the transistor because the base of the transistor is connected to a +6 volts supply through resistor R2. A negative signal applied to the inverter input will be transferred to the base of the transistor through "speed up" capacitor C. Resistor R1 is a "current limiting" resistor, which limits the input signal current flowing in the base circuit of the transistor. The negative-going signal appearing at the base of the transistor will turn the transistor "on" (cause the transistor to conduct) and develop a positive-going signal at the output thereof since the collector thereof is driven toward ground. Therefore, an input signal will produce an inverted and amplified output signal.

STANDARD GATE

Referring to FIGURE 36 for the circuit diagram of the standard gate (FIGURE 37), the standard gate can be operated to perform either of two logical functions, the "AND" function and the "OR" function. The gate is defined as an AND gate, if a particular output signal is obtained only upon coincidence of all input signals. A coincidence of inputs in this case would constitute the presence of negative signal levels at all input terminals to the gate. The particular type of gate illustrated may be further defined as a NEGATIVE AND gate due to the requirement of negative signal levels at the inputs assuming a negative source voltage.

Resistor R is the gate "load" resistor across which the output voltages are developed. If any of the inputs are at a ground level (0 volts), then the input terminal will also be at ground level. At the instant all inputs acquire negative voltage levels, the output terminal will also develop a negative voltage level. This effect is caused by the reverse biasing of all diodes in the gate, thus establishing a high resistance between the input voltage and the supply voltage. Therefore, the predominant part of the difference between these voltages will be developed across the diodes, causing a voltage level to develop at the output terminal closely approaching that of the supply voltage. FIGURE 37 illustrates the symbol used to indicate the standard gate.

The circuit of FIGURE 36 will also operate as an OR gate. Assuming a negative source voltage, a positive voltage on any of the input terminals will provide a positive voltage level at the output.

Accordingly, the circuit of FIGURE 36 and the gate symbol of FIGURE 37 may represent an AND or an OR gate.

The first number of the lower line of FIGURE 37 represents the negative value of the source voltage (v.) while the second number represents the value in kilohms of the common load resistor (R) FIGURE 36.

READ HEAD

Referring to FIGURE 38 for the circuit diagram of the read head (FIGURE 39), the read head senses changes in the flux patterns of the various storage registers on the memory drum. As the read head senses information on the drum, a signal is produced thereby which varies the bias on the transistor of a "phase inverter" circuit. The phase inverter circuit generates an additional signal which is 180 degrees out of phase with the original signal. Two signals, then, are produced, which signals are applied to the bases of two transistors (Q2 and Q3) forming part of a "push-pull" circuit. Signals at the outputs of these transistors are then applied to the bases of two more transistors (Q4 and Q5) and then to the output terminals (7 and 8) of the read head and amplifier circuit. The output signal at either output terminal (7 or 8) will be a series of negative pulses. In applications where the output terminals are "jumpered" together, the negative pulses will occur at twice the rate of those pulses produced by either transistor alone. Successive pulses, therefore, would be produced by first one transistor and then the other, i.e., one transistor will be turned "on," producing a negative pulse while the other transistor will be "cut off." This condition is then reversed during the next half of the input signal.

More specifically, the information "bits" or pulses, which are developed in the read head as information is read from the drum, are applied to the base of transistor Q1, causing transistor Q1 to operate about the midpoint of its operating range (class "A" operation) as determined by the biasing resistors RS1 and RS2. As the positive portion of the input signal is developed on the base of transistor Q1, the conduction of transistor Q1 will decrease, causing the voltage level at the collector thereof to approach −6 volts and the voltage level at the emitter (at the junction of resistor RS5, capacitor C1, resistor RS6 and capacitor C4) to approach ground level. Therefore, two signals of opposite polarity are developed at the same time.

The −6 volt supply voltages for the read circuitry is provided by a voltage stabilizing network comprised of resistor RS7, capacitor C2 and capacitor C5. The negative-going signal developed at the collector of transistor Q1 is applied to the base of transistor Q2 through capacitor C3, increasing the conduction of transistor Q2 and causing the collector thereof to approach ground level. The bias voltage at the base of transistor Q2 as developed by resistor RS8, connected from the base of transistor Q2 to ground, and the two resistors in the emitter circuit RS11 and RS12, connecting the emitter of transistor Q2 to a +6 volts, will be such that transistor Q2 will be partially conducting. The positive-going signal thus produced at the collector of transisor Q2 will be applied to the base of transistor Q4 through resistor RS16, transistor Q4 having been previously biased "off" by the negative signal developed at the collector of transistor Q2 during its quiescent state. Transistor Q4 will then be turned "on," causing the collector thereof to change from an approximate +6 volt level to a −6 volt level.

A negative pulse, therefore, will be produced at the output terminal 7. Concurrently, with the development of the negative-going signal at the collector of transistor Q1, the positive-going signal being developed in the emitter circuit of transistor Q1 will be applied to the base of transistor Q3 through capacitor C4, decreasing the conduction through transistor Q3 and causing the collector of transistor Q3 to approach −12 volts. A negative-going signal is therefore developed at the collector of transistor Q3 and is applied to the base of transistor Q5 through resistor R17, causing transistor Q5 to remain turned "off," transistor Q5 having been previously biased "off" by the negative signal level as developed at the collector of transistor Q3 during the quiescent state. The output signal produced at the collector of transistor Q5, connected to the output terminal 8, will remain at an approximate +6 volt level. Therefore, during the positive portion of the input signal as applied to the base of transistor Q1, the output signal at output terminal 7 will be negative while the output signal at output terminal 8 will remain positive. During the negative portion of the input signal as applied to the base of transistor Q1, the signal at the output terminal 8 will be negative while the signal at the output terminal 7 will remain positive. For applications where output terminals 7 and 8 are connected together, a series of negative pulses will be produced as previously described.

DEFLECTION AMPLIFIER

Referring to FIGURE 40 for the circuit diagram of the vertical and horizontal deflection amplifier (FIGURE 41), the principal function of the deflection amplifier is to amplify: (a) "staircase" type voltage signals which position characters on a cathode ray tube screen and (b) stroke generating signals which create and position the individual strokes for each character through the use of differential amplifiers. These signals are then amplified and applied to the appropriate deflection plates of a cathode ray tube. During the quiescent period, transistors Q1 and Q3 will be biased "on." Transistors Q2 and Q4 will also be biased "on." However, the voltage levels on the outputs of transistors Q2 (output "D") and Q4 (output "E") will develop deflection potentials at the cathode ray tube such that the first character to be displayed will be positioned in the lower right-hand corner of the display pattern. Transistors Q1 and Q3, together with their associated components, form a high input impedance circuit or "buffer" unit between the staircase generators and the actual circuitry of the deflection amplifiers. Representative signals applied to input A of the "buffer" unit comprise incremental positive voltage steps. These positive voltage steps applied at input A will be transferred directly to the base of transistor Q1, turning transistor Q1 "off" and developing positive transition signals at the emitter thereof. These positive transition signals are then applied to the base of transistor Q3, turning transistor Q3 "on" and developing a series of positive transition signals at the emitter thereof. The first of two directions taken by these positive transition signals at transistor Q3 is through a coupling capacitor (C1) to the junction of three resistors: RS3, RS4 and RS6. These signals are then applied to the base of transistor Q1 through resistor RS4 and reinforce the initial signals appearing at input A. The positive transition signals developed at the emitter of transistor Q3, as previously mentioned, will also be applied to the base of transistor Q4 through capacitor C2, turning transistor Q4 "off" and developing a series of negative transition signals at the collector thereof. These negative transition signals are then applied to the appropriate deflection plates of the cathode ray tube and thus contribute to the generation of the display pattern. Signals applied to the input B are representative of the stroke developing and positioning signals from the stroke generator. These signals will be applied to the base of transistor Q2 through resistors RS1 and RS2, developing voltage levels at the collector of transistor Q2 and subsequently at the appropriate deflection plates of the cathode ray tube to generate and position the individual strokes for each of the characters in the display pattern. Input C represents the connections between the vertical and horizontal amplifiers for the "character slant" control circuit. Potentiometer RS2 is typical of the two centering controls, one for each deflection amplifier, provided for the positioning of the display pattern. Potentiometer RS10 is typical of the two adjustment controls, one for each deflection amplifier, provided for the adjustment of the size of the display pattern.

The display circuit described herein displays information on a cathode ray tube which information is contained in various storage registers of a memory unit.

BASIC CIRCUIT DESCRIPTION

Integers to be displayed on the cathode ray tube are entered into an entry counter (FIGURE 45) in the form of information or "bit" pulses. This information is then modified by the following steps: (a) encoding into decimal notation by a diode array (FIGURE 47), (b) decoding into a seven count notation by a diode array (FIGURE 48) and (c) transfer to a seven stage shift register (FIGURE 49). The output signals generated by the shift register control the "unblanking" of the various segments of a figure "8" raster required to generate a given character.

The unblanking operation is accomplished by means for controlling the voltage level at the grid of the cathode ray tube which in turn controls the brightness of the segments of the figure "8" from which the characters to be displayed are formed. Concurrently, with the development of the unblanking signals, character generator and positioning signals are developed as follows: Horizontal and vertical "staircase" waveforms are produced to establish the relative positioning of the characters on the cathode ray tube display (FIGURES 53 and 54). A segment (stroke) timing generator (FIGURE 52) is provided to: (a) develop the segments used in the formation of each character in the display and (b) control the directing of the individual segments to either the horizontal or the vertical deflection amplifiers as required. A sine wave oscillator is provided to generate the individual segments for each character. Positioning of the segments in the manner required to form each character is accomplished by a "weighting" or current summing circuit such that each segment is assigned a vertical and horizontal voltage to establish the position of each said segment in each character. The sine wave signal is superimposed upon the signal provided by the "weighting" circuit. The "weighting" circuit (FIGURES 56 and 58) determines whether the segment to be displayed is a vertical or a horizontal stroke and positions the cathode ray beam at the center of the segment. The output from the oscillator varies the voltage output from the weighting circuit sufficiently to cause the cathode ray beam to oscillate back and forth in a single harmonic type of motion to trace out the segment. The segments (as produced by the sine wave oscillator) and the segment positioning voltages are mixed together before being applied to the deflection amplifiers. The deflection amplifiers mix the "staircase" waveforms with the segment development signals and apply the resultant waveforms to the cathode ray tube to scan a figure "8" as shown in FIGURE 64.

DETAILED CIRCUIT DESCRIPTION

In addition to the introduction of integers in the form of information or "bit" pulses, the display unit is designed to operate with the following timing signals: (a) positive and negative pulses applied at the beginning of each digit interval (the time required to display each character) hereinbefore referred to as the RS signal or RS time period; (b) a series of seven negative "segment timing" pulses evenly spaced throughout the RS time period herein referred to as the track 6 timing signals (FIGURES 2, 6, 62 and 63); (c) a positive-going transition signal applied at the beginning of every fourth RS time period herein referred to as the W1 signal and (d) a negative-going transition signal applied at the beginning of each display period (a display period is that period of time required to display each of the 25 characters on the cathode ray tube) herein referred to as the H signal.

INFORMATION INPUT

Positive RS signals on the input 165L2 are fed through diode 165D2 and a shunt RC circuit comprising resistor 165RS4 and capacitor 165C2 to the base of transistor 165Q2 to turn this transistor "off" and place a negative voltage level on the collector output thereof 165R2.

The RS pulses at input 165L2 are applied to the input (161L2) of a diode (161D3) so that, during the RS time period, this input will be at a negative voltage level. Negative information bit pulses applied from a storage device to the input labelled track 4 read amp (161L1) of a diode (161D2) concurrently with the negative input on bus 161L2 will produce negative signals at the junction of diodes 161D2 and 161D3. These negative information signals are applied to the base of transistor 161Q3 through resistor 161RS6 in parallel with capacitor 161C2, thereby causing transistor 161Q3 to conduct and to develop positive output pulses at the collector 161R1 thereof.

Resistor 161RS4 develops the voltages occurring at the junction of diodes 161D2 and 161D3, whereas resistor 161RS9 is a base bias resistor and resistor 161RS11 is the load resistor for transistor 161Q3.

ENTRY COUNTER CIRCUIT

The positive output pulses produced at the collector of transistor 161Q3 are applied to the complementing input (160L2) of the No. 1 flip flop (160FF4) of the entry counter (FIGURE 45), thereby setting the No. 1 flip flop (it is assumed that all flip flops in the entry counter have been reset prior the application of the information pulses to the entry counter). The application of a second information bit to the complementing input (160L2) of the No. 1 flip flop (160FF4) will reset the No. 1 flip flop causing a positive-going transition signal to be developed at the FF· or Q output thereof. This positive-going transition signal is applied to the complementing input of the No. 2 flip flop (160FF3), setting the No. 2 flip flop. In a similar manner, succeeding information bit pulses applied to the input (160L2) of the entry counter during an RS time period will count an integer into the entry counter as indicated by the states of the various flip flops in a binary manner to represent the integer in the storage device to be displayed in excess of one bit notation as explained hereinabove.

The signal developed at the FF. output of the No. 1 flip flop (160FF4) is applied to the base of transistor 160Q7 through resistor 160RS8. The signal developed on the FF· or Q output of the No. 1 flip flop is applied to transistor 160Q6 through resistor 160RS11. The signal developed on the FF. output of the No. 2 flip flop (160FF3) is applied to transistor 160Q5 through resistor 160RS7. The signal developed on the FF· output of flip flop No. 2 is applied to transistor 160Q4 through resistor 160RS10. The signal developed on the FF. output of the flip flop No. 4 (160FF2) is applied to the base of the transistor 160Q3 through resistor 160RS6. The signal developed on the FF· output of the No. 4 flip flop is applied to the base of the transistor 160Q2 through resistor 160RS9. The signal developed at the FF. output of No. 8 flip flop (160FF1) is applied to the base of the transistor 160Q1 through resistor 160RS5. The resistors numbered 160RS12 through 160RS18 are bias resistors for the above-mentioned transistors.

The transistors 160Q1 to 160Q7 will be conducting or non-conducting depending upon the state of their associated flip flop 160FF1 to 160FF4; transistor 160Q1 will conduct and provide a positive collector voltage when flip flop 160FF1 is reset; transistor 160Q2 will conduct and provide a positive collector voltage when flip flop 160FF2 is set; transistor 160Q3 will conduct and provide a positive collector voltage when flip flop 160FF2 is reset; transistor 160Q4 will conduct and provide a positive collector voltage when flip flop 160FF3 is set; transistor 160Q5 will conduct and provide a positive collector voltage when flip flop 160FF3 is reset; transistor 160Q6 will conduct and provide a positive collector voltage when flip flop 160FF4 is set; and transistor 160Q7 will conduct and provide a positive collector voltage when flip flop 160FF4 is reset.

At the end of the RS time period, the signal on the RS input 165L2 will go negative, thereby causing transistor 165Q2 to conduct and provide a positive-going signal on the collector 165R2 thereof. This positive-going transition is passed to the input 167B5 of the one shot 167N2 and, after a delay and inversion therein, a negative-going transition is provided on the output 167T5 thereof. This negative-going transition is applied to the input 161L3 of the diode 161D1 and undergoes a double inversion through the transistors 161Q1 and 161Q2 to provide a negative-going transition at the input of the one shot 161N1. As explained hereinabove in the description of the one shot, such as 161N1, a negative-going transition will not cause operation of these one shots. Accordingly, the one shot will not be operated. After the one shot 167N2 has sensed the positive-going transition at the input 167B5 thereof and this positive-going transition has now levelled off to a positive voltage level, the one shot will revert to its original state and thereby provide a positive-going transition at the output 167T5 thereof. This positive-going transition is applied to the input 161L3 of the diode 161D1, causing transistor 161Q1 to be turned off and providing a negative-going transistion at the collector thereof. This negative-going transition will turn on the transistor 161Q2 and provide a positive-going transition on the collector thereof. This positive-going transition is fed to the input of the one shot 161N1 and, after a delay and inversion, a negative-going transition is provided at the output 161R2 thereof. This negative-going transition is applied to the input 160L1 of the diodes 160D1 through 160D4 to reset the entry counter.

DIODE ENCODER

The information stored in the entry counter is applied to the input of a diode encoder (FIGURE 47) as follows: the signal developed on the collector of transistor 160Q7 is applied to the input (162L4) of the encoder. This input is connected to four diodes numbered 162D6, 162D12, 162D15 and 162D17. The signal developed on the collector of transistor 160Q6 is applied to the input (162L5) of the encoder, this input being connected to two diodes numbered 162D8 and 162D14. The signal developed at the collector of transistor 160Q5 is applied to the input (162L3) of the encoder, this input being connected to five diodes numbered 162D4, 162D10, 162D11, 162D13 and 162D22. The signal developed at the collector of transistor 160Q3 is applied to the input (162L1) of the encoder, this input being connected to four diodes numbered 162D1, 162D7, 162D9 and 162D19. The signal developed at the collector of transistor 160Q2 is applied to the input (162L6) of the encoder, this input being connected to two diodes numbered 162D16 and 162D21. The signal developed at the collector of transistor 160Q1 is applied to the input (162L2) of the encoder, this input being connected to three diodes numbered 162D2, 162D3 and 162D5.

The diode encoder is composed of a series of AND gates, each of which is composed of one or more diodes and an enabling circuit. The enabling circuit for each AND gate is a resistor 162RS1 to 162RS12, one of these resistors being coupled between the junction of the cathodes of the diodes composing each AND gate and the emitter 167T4 of a transistor 167Q5. At the trailing edge of the RS time period the signal on the output 165R2 (FIGURE 50) will go positive as explained hereinabove and provide a negative-going transition at the output of the one shot 167N2 (FIGURE 52), thereby causing transistor 167Q5 to conduct. When transistor 167Q5 is conducting, a negative voltage level is placed on the emitter thereof, thereby providing a negative voltage level on the enabling circuit of each AND gate through one of the resistors 162RS1 to 162RS12. It will be noted that the enabling signal along output 167T4 occurs ahead of the reset signal to the entry counter along the output 161R2 (FIGURE 46) due to the added delay in the one shot 161N1. This added delay allows the content of the entry counter to be encoded and passed along in the system prior to resetting of the entry counter for counting of the next character.

The AND gates of the encoder are (1) 162D1, (2) 162D2, (3) 162D3 and 162D4, (4) 162D5 and 162D6, (5) 162D7 and 162D8, (6) 162D9 and 162D10, (7) 162D11 and 162D12, (8) 162D13 and 162D14, (9) 162D15 and 162D16, (10) 162D17 and 162D18, (11) 162D19 and 162D20 and (12) 162D21 and 162D22, plus the enabling signal for each AND gate as discussed hereinabove.

The above mentioned AND gates are arranged to be enabled in a predetermined manner in response to a number counted into the entry counter. The output signals from these AND gates thereby represent the particular strokes of the figure "8" raster to be unblanked to provide a display of the number stored in the entry counter.

DIODE DECODER

The output of the encoder (FIGURE 47) is applied to the input of the decoder (FIGURE 48) when a negative pulse is applied to the input (162R1) of the encoder.

This negative pulse, as explained hereinabove, is developed when the input bus designated RS 165L2 (FIGURE 50) receives a negative transistion at the trailing edge of an RS time period thereon. This negative transition is applied to the input diode 165D2 and, in conjunction with resistor 165RS2, produces a negative transition at the junction of the said diode and resistor. This negative transition is applied to the base of transistor 165Q2 through the resistor 165RS4 and the capacitor 165C2 in shunt therewith, causing transistor 165Q2 to conduct.

A positive signal will thereby be developed on the collector output (165R2) of the transistor 165Q2 at the junction of the collector and the collector load resistor 165RS8 thereof. This positive transition is applied to the input (167B5) of a one shot 167N2 (FIGURE 52), developing a negative pulse on the base of the transitsor 167Q5 and causing conduction thereof, this negative pulse thereby being developed on the emitter of transistor 167Q5 and at the output thereof (167T4). As a result, a negative pulse will be applied to the enabling input (162R1) of the encoder previously mentioned (FIGURE 47).

This negative pulse is applied to resistors 162RS1 to 162RS12, thereby enabling this encoder. The outputs of this encoder, 162R2 through 162R13, inclusive, are applied to the inputs, 163L1 through 163L12, inclusive, of the decoder (FIGURE 48).

The diode decoder (FIGURE 48) is composed of a plurality of OR gates. These OR gates are as follows: (1) diodes 163D1 to 163D4, (2) diodes 163D5 to 163D8, (3) diodes 163D9 to 163D11, (4) diodes 163D12 and 163D13, (5) diodes 163D14 to 163D17, (6) diodes 163D18 to 163D21 and (7) diodes 163D22 to 163D25. These seven OR gates represent the seven segments or strokes labelled "0" through "6" of the figure "8" raster (FIGURE 64). Enabling of any one of the above mentioned OR gates will provide a signal to reproduce and display the segment associated therewith. The OR gate (1) composed of diodes 163D1 to 163D4 is associated with the stroke labelled "0" in FIGURE 64. Likewise OR gate (2) is associated with the stroke labelled "6"; OR gate (3) is associated with the stroke labelled "5"; OR gate (4) is associated with the stroke labelled "4"; OR gate (5) is associated with the stroke labelled "3"; OR gate (6) is associated with the stroke labelled "2" and OR gate (7) is associated with the stroke labelled "1."

When a negative voltage level is provided from the diode encoder to the input of an OR gate of the diode decoder, this OR gate will be enabled and provide a negative voltage level at the output thereof. Accordingly, it can be seen that the complement of negative output signals from the diode encoder to the diode decoder will determine which of the strokes of the figure "8" raster is to be displayed.

When a negative voltage level is applied, for example, to the input 162L1 of the encoder (FIGURE 47), a negative pulse is developed at the output thereof (162R2) when the enabling pulse is applied to the enabling input 162R1 of the encoder. This negative pulse is applied to the input (163L3) of the decoder (FIGURE 48), producing a negative pulse at the inputs to the diodes 163D3 and 163D20. The negative pulse at the input of the diode 163D3 is applied to the base of the transistor 163Q1 through the said diode and the resistor 163RS1, causing this transistor to conduct. A positive pulse will be developed at the collector of the transistor 163Q1 on the output thereof (163R1).

The negative pulse at the input to diode 163D20 is applied to the base of the transistor 163Q6 through the said diode and the resistor 163RS6, causing this transistor to conduct. In a similar manner, when a negative pulse is developed on the input to any of the diodes numbered 163D1 through 163D25 inclusive, a positive pulse is developed on the output of the associated transistor.

SHIFT REGISTER

Positive pulses developed on the outputs 163R1 through 163R7 of the decoder are applied to the inputs 164L1 through 164L7 inclusive of the shift register flip flops 164FF1 to 164FF7, inclusive (FIGURE 49). Output 163R1 is connected to input 164L1; output 163R2 is connected to input 164L7; output 163R3 is connected to input 164L6; output 163R4 is connected to input 164L5; output 163R5 is connected to input 164L4; output 163R6 is connected to input 164L3; and output 163R7 is connected to input 164L2. Positive pulses developed at the inputs to the shift register are applied to the FF. terminals of the appropriate flip flop therein, these positive pulses setting the associated flip flops.

The flip flops in the shift register (FIGURE 49) numbered 0, 1, 2, 3, 4, 5 and 6 represent the identically numbered segments of the character to be generated as indicated in FIGURE 64. This information, then, will provide the unblanking information to be supplied to the grid of the CRT 174R5 of the display.

The signals for the transfer or W input (164R2) of the shift register are developed at the output of the read amplifier of track 6 167RA1 (FIGURE 52), these signals being negative pulses (FIGURE 63). A negative transition applied to the base of transistor 167Q1 from the leading edge of the output of the TK6 read amplifier through resistor 167RS1 and capacitor 167C1 causes transistor 167Q1 to conduct and produces a positive transition at the collector of transistor 167Q1, the junction of the collector load resistor 167RS3 and the input to the one shot circuit 167N1. The positive transition signal developed at the input to the one shot circuit 167N1 produces a negative transition at the output thereof, this negative transition being applied to the base of the transistor 167Q2 through the resistor 167RS4. The capacitor 167C2, tied to the base of the transistor 167Q2 suppresses noise appearing at the base of the said transistor.

The previously mentioned negative transition applied to the base of the transistor 167Q2 causes this transistor to conduct and produces a positive transition signal at the collector thereof at the junction of the collector load resistor 167RS6 and the resistor 167RS8. This positive transition signal is applied to the base of the transistor 167Q3 and makes this transistor cease conduction and, thereby, produces a negative transition signal at the collector thereof. The resistor 167RS11 is the collector load resistor for the transistor 167Q3. The negative transition signal at the collector of transistor 167Q3 is applied to the base of the transistor 167Q6 through the resistor 167RS12 and the capacitor 167C3 in shunt therewith, causing transistor 167Q6 to conduct, thereby producing a positive transition signal at the collector of the transistor 167Q6.

The resistor 167RS14 is a collector load resistor and, in association with the diode 167D4, clamps the collector at a negative (—6) voltage level. Therefore, the positive transition signal produced at the collector of transistor 167Q6 will be about a 6 volt transition rather than a 12 volt transition.

The positive transition developed at the output 167T1 (FIGURE 52) is applied to the input 164R2 (FIGURE 49) of the transfer input W (164R2) of the shift register. The transfer input provides seven shift pulses during each RS time period (FIGURE 63) to completely empty the shift register during RS time period for display of an integer.

The shift register is arranged so that the FF, or $a$, output and the FF, or $b$, output of the flip flop 164FF7 thereof (FIGURE 49) is applied to the upper, or $j$, and lower, or $e$, gate inputs (G) of the flip flop 164FF6. Thus, on the application of a shift pulse along the bus 164R2 the information stored in flip flop 164FF7 (No. 6) is transferred to flip flop 164FF6 (No. 5). Similarly, the information in flip flop 164FF6 (No. 5) is transferred to flip flop 164FF5 (No. 4). Also, the information in flip flop 164FF5 is transferred to flip flop 164FF4; the information in flip flop 164FF4 is transferred to flip flop 164FF3; the information in flip flop 164FF3 is transferred to flip flop 164FF2 and the information in flip flop 164FF2 is transferred to the flip flop 164FF1.

The first shift pulse will transfer a zero into the flip flop 164FF7 because the left-hand reset or $j$ input (G) is connected to ground and the right-hand set or $e$ input (G) is connected to —6 volts.

UNBLANKING SIGNAL AND OPERATION

As the information contained in the shift register is shifted forward to the output (the FF. or $b$ output) (164R1) of the "0" flip flop (164FF1), the voltage level at this output will be at a positive or negative voltage level in accordance with the information contained in the "0" flip flop (164FF1) of the shift register at that time. This output signal of positive or negative voltage levels on the shift register output (164R1) is transferred to an input (167B4) of a diode (167D3), this diode forming an AND gate in conjunction with diodes 167D2 and 167D3. This AND gate provides a positive output voltage when all the inputs thereto are positive.

During the RS time period, a negative voltage level is applied to the input (165L1) of a diode 165D1 and, in conjunction with the negative voltage level at one terminal of resistor 165RS1, a negative voltage level is developed at the junction of diode 165D1 and resistor 165RS1. This negative voltage level is applied to the base of transistor 165Q1 through the shunted capacitor 165C1 and resistor 165RS3. Transistor 165Q1 is then turned "on" developing a positive voltage level at the collector thereof.

Resistor 165RS5 is used for biasing whereas resistor 165RS7 is the load resistor for transistor 165Q1.

The positive voltage level developed at the collector of transistor 165Q1 is applied to the base of transistor 165Q3, turning transistor 165Q3 "off" and producing a positive voltage level at the emitter (165R1) thereof, resistor 165RS9 being the load resistor for transistor 165Q3. The positive voltage level on the emitter (165R1) of transistor 165Q3 is applied to the input (167B3) of the diode 167D2.

The leading edge of the signals produced by the track 6 read amplifier 167RA1 are negative-going pulses, these negative-going pulses being inverted by transistor 167Q1 to provide a positive-going signal at the collector thereof. This positive-going signal is supplied to the one shot 167N1 and causes the one shot to produce a negative output pulse. After a short time delay, the one shot returns to its original stable state and provides a positive output voltage level. This positive output voltage level provides an enabling signal to diode 167D1, one of the AND gate inputs. It will be noted that time of occurrence of the negative voltage level at the output of one shot 167N1 occurs simultaneously with the shift pulses on the input 170L2 of the segment generator (FIGURE 55), to be explained in detail hereinbelow. Therefore, the return of the one shot 167N1 to a positive output signal after some delay is slightly later in time than the shift pulse to the segment generator.

During those segment time periods, when a positive voltage level is developed from the shift register and placed at the input (167B4) of the diode 167D3, each of the inputs to the AND gate will be at a positive voltage level and, thereby, the junction of diodes 167D1, 167D2 and 167D3 will be at a positive voltage level. This positive voltage level will be applied to the base of transistor 167Q4 through resistor 167RS7, turning transistor 167Q4 "off" and developing a negative voltage level on the collector (167T3) thereof. Therefore, enabling of the AND gate turns transistor 167Q4 "off."

During those segment time periods wherein a negative voltage level is developed from the shift register and on the input (167B4) of the diode 167D3, the AND gate will be disabled and the junction of diodes 167D1, 167D2 and 167D3 will be at a negative voltage level, this negative voltage level being applied to the base of transistor 167Q4 through resistor 167RS7, turning transistor 167Q4 "on" and producing a positive voltage level on the collector (167T3) thereof. Resistor 167RS9 is a biasing resistor for transistor 167Q4.

It can be seen that the voltage level developed at the output of the shift register (FIGURE 49), will therefore cause transistor 167Q4 to be turned "on" or "off," as the case may be. The periods during which transistor 167Q4 is turned "off" a negative voltage level appears on the collector thereof 167T3 allowing the segment generated during that particular segment time period to be displayed on the cathode ray tube as explained hereinbelow. When the AND gate is disabled the transistor 167Q4 is turned "on" and a segment or stroke is not generated.

The negative or "unblanking" signal, developed at the collector 167T3 of transistor 167Q4 when the AND gate is enabled, is applied to the input (173L1) of the base of transistor 173Q1 through resistor 173RS2 turning transistor 173Q1 "on" and developing a positive-going transition signal at the output (173R1) of the collector thereof. Resistor 173RS1 is the load resistor for transistor 167Q4. Resistor 173RS3 is a biasing resistor, and resistor 173RS14 is the load resistor for transistor 173Q1. The positive-going transition signal developed at the collector output (173R1) of the transistor 173Q1 is applied to the input (174L1), the grid input of the cathode ray tube (174R5) through capacitor 174C3 to cause current to flow through the grid. Resistor 174RS13 in conjunction with capacitor 174C3 serves as a differentiator for the positive-going transition signals developed at the input (174L1).

SEGMENT TIMING GENERATOR

The positive pulses produced at the output (167T2) of the collector of transistor 167Q6 (FIGURE 52) are applied to the T or $d$ input (170L2) of the No. 1 flip flop 170FF1 of the segment timing generator (170FF1 to 170FF4). As mentioned hereinabove, the pulses produced at output 167T2 are simultaneous in time with the negative output of one shot 167N1 and are therefore slightly prior in time to the return to positive voltage at the output of one shot 167N1, the input to diode 167D1.

All of the flip flops 170FF1 to 170FF4 inclusive (Numbers 1, 2, 4 and 4′) of the segment timing generator (FIGURE 55) are in the set state at this time (to be explained hereinbelow). Therefore, upon the application of the first positive pulse thereto along the bus 170L2, the No. 1 flip flop 170FF1 will be reset and thereby produce a positive voltage level on the FF· or Q output (170R1) thereof and a negative voltage level on the FF. or $b$ output (170R2) thereof. Upon the application of the second positive pulse thereto along the bus 170L2, the No. 1 flip flop 170FF1 will be set, producing a negative voltage level on the FF· or Q output (170R1) thereof and a positive-going transition signal on the FF. or $b$ output (170R2) thereof. This positive-going transition signal developed on the FF. or $b$ output of the No. 1 flip flop 170FF1 is applied to the T or $d$ input of the No. 2 flip flop 170FF2, resetting the No. 2 flip flop and developing a positive voltage level at the FF· or Q output (170R4) thereof and a negative voltage level on the FF. or $b$ output (170R5) thereof. This sequence is then continued with the following result:

The No. 1 flip flop changes states upon the application of each positive pulse to the input thereof. The No. 2 flop flop 170FF2 changes states upon the application of every second positive pulse to the No. 1 flip flop. The No. 4 flip flop 170FF3 changes states upon the application of every 4th positive pulse to the No. 1 flip flop (refer to FIGURE 61).

Whenever the No. 2 flip flop 170FF2 is reset, a positive-going transition signal will be developed at the FF· or Q output 170R4 thereof. This positive-going transition signal is applied to the T or $d$ input of the No. 4′ flip flop 170FF4, resetting the No. 4′ flip flop. Therefore, the set states of the No. 4 flip flop 170FF3 and the No. 4′ flip flop 170FF4 will be displaced by one-half of the cycle produced by the No. 2 flip flop 170FF2.

SET SEGMENT TIMING GENERATOR

At the end of the RS time period, the negative-going transition signal developed at the emitter output (165R1) of transistor 165Q3 is applied to the input (166L1) at the base of transistor 166Q1 through resistor 166RS1, turning transistor 166Q1 "on" and developing a positive-going transition signal at the collector thereof.

Resistor 166RS3 is a biasing resistor and resistor 166RS6 is a load resistor for transistor 166Q1.

The previously mentioned positive-going transition signal is applied to the one shot 166N1 at the trailing edge of the RS time period, producing a negative-going transition signal at the output thereof. This negative-going transition signal is applied to the base of transistor 166Q4 through resistor 166RS11, turning transistor 166Q4 "on" and developing a positive-going transition signal at the collector output (166R2) thereof.

Resistor 166RS13 is a biasing resistor and resistor 166RS16 is a load resistor for transistor 166Q4.

The positive-going transition signal developed at the collector output (166R2) of transistor 166Q4 is applied to the "setting" inputs of each of the flip flops (1, 2, 4 and 4′) of the segment timing generator. This is accomplished as follows: The input 170L1 is connected through diodes 170D1 to 170D4 to each of the FF. or $b$ outputs of the flip flops 170FF1 to 170FF4 in the segment timing generator. The connection of the FF. or $b$ output of the No. 1 flip flop 170FF1 is made through the diode 170D1. The connection to the FF. or $b$ output of the No. 2 flip flop 170FF2 is made through the diode 170D2. The connection to the FF. or $b$ output of the No. 4 flip flop 170FF3 is made through the diode 170D3 and the connection to the FF. or *b* output of the No. 4' flip flop 170FF4 is made through the diode 170D4. A positive voltage level applied to each of these FF. or *b* inputs of the above named flip flops will force these flip flops to a set state, this being the initial or starting condition of the segment generator.

SIGNAL DIRECTING

The inputs 171L1, 171L2 and 171L3 of the diodes 171D1, 171D2 and 171D3 respectively receive signals from the segment timing generator for the purpose of controlling the output of the Colpitts sine wave oscillator circuit. The input 171L1 is coupled to the FF output 170R2 of the "1" flip flop 170FF1, the input 171L2 is coupled to the FF. output 170R5 of the "2" flip flop 170FF2 and the input 171L3 is coupled to the FF. output 170R6 of the "4" flip flop 170FF3. The diodes 171D1, 171D2 and 171D3 form an OR gate. This OR gate passes a positive enabling signal from its output to the oscillator when at least one of the diode inputs of the above mentioned OR gate is at a positive voltage level. As set forth hereinabove, the segment timing generator (FIGURE 55) is initially in a set condition, i.e., all of the flip flops 170FF1 to 170FF4 are initially in the set condition. Therefore, initially, a positive signal will be applied to the input of each of the diodes 171D1 to 171D3 to enable the OR gate and provide an enabling signal through resistor 171RS2 to provide oscillation of the oscillator. The output from the OR gate is also connected through resistor 171RS1 to the vertical weighting circuit along the input 173L2 thereof to raise a decimal point from the position of stroke "6" (FIGURE 64) and provide a better appearing decimal point. The decimal point circuitry is not set forth herein in its entirety.

The individual segments or strokes of the character to be displayed are created by the Colpitts sweep oscillator circuit (FIGURE 56) comprised of transistor 171Q1, resistors 171RS2, 171RS7, 171RS13 and 171RS14, and capacitors 171C1, 171C2 and 171C6 and the coil 171L1. The sine wave signal developed at the cellector of transistor 171Q1 (Colpitts sine wave oscillator circuit) is applied to the inputs of two "signal directing" circuits, one of which is a vertical signal directing circuit comprised of resistors 171RS5, 171RS6, 171RS10 and 171RS12 and diodes 171D4 and 171D7 and capacitor 171C4, the other being a horizontal signal directing circuit and being composed of resistors 171RS3, 171RS4, 171RS8 and 171RS11 and diodes 171D5 and 171D6 and capacitor 171C3.

When the display cycle reaches the point wherein the No. 4' flip flop 170FF4 of the segment timing generator (FIGURE 55) is reset, the FF. or *b* output (170R9) thereof will be at a negative voltage level. This negative voltage level is applied to the input 171L4 of the first mentioned vertical signal directing circuit through diode 171D4. This negative voltage level is thereby applied to the junction of resistor 171RS5 and diode 171D7, allowing the sine wave signals produced at the collector of transistor 171Q1 to be developed at the output (171R2) as a result of passing through resistor 171RS5, diode 171D7, capacitor 171C4 and transistor 171RS12.

Since the No. 4' flip flop 170FF4 of the segment timing generator (FIGURE 55) is reset as previously mentioned, a positive voltage level is developed at the FF. or Q output (170R8) thereof. The positive voltage level is applied to the input 171L5 of the second mentioned horizontal signal directing circuit through diode 171D5, thus establishing a positive voltage level at the junction of resistor 171RS3 and diode 171D6. This positive voltage level will prevent the sine wave signal developed at the collector of transistor 171Q1 from passing through resistor 171RS3, diode 171D6, capacitor 171C3 and resistor 171RS11 and being developed at the output (171R4) due to the effective short circuit placed between ground and the junction of diode 171D5, diode 171D6 and resistor 171R3. Therefore, the reset state of the No. 4' flip flop 170FF4 of the segment timing generator (FIGURE 55) will direct the sine wave signals produced at the collector of transistor 171Q1 to the output (171R2) while inhibiting the development of these since wave signals at the output 171R4.

Conversely, the set state of the No. 4' flip flop 170FF4 will cause the previously mentioned sine wave signals to be directed to the output (171R4) while inhibiting the development of these sine wave signals at the output (171R2). Resistors 171RS6, 171RS10, 171RS4 and 171RS8 aid in the proper functioning of the "signal directing" circuits.

The circuit appearing in FIGURE 56 comprising resistor 171RS9, one end of which is connected to a −12 volt supply, and capacitor 171C5, one end of which is connected to ground (zero volts), performs a voltage stabilizing function wherein a stabilized −12 volts is established at the junction of resistor 171RS9 and capacitor 171C5. This stabilized voltage appears at the output of resistor 171RS9 and capacitor 171C5 as indicated by the circled quantity −12 v.'. This source of a stabilized −12 volts is provided for thte sine wave oscillator and is connected to the points indicated by the circled quantity −12 v.'.

HORIZONTAL AND VERTICAL STROKE WEIGHTING CIRCUITS

Signals developed at the outputs (170R1), (170R5), (170R6) and (170R4) are applied to the inputs (173L3), (173L4), (173L5) and (173L6), respectively. These signals constitute the segment timing signals developed in the segment timing generator (FIGURE 55) and are "weighted" (assigned relative voltage levels) by two "weighting" circuits or "current summing" circuits, one of which is the vertical weighting circuit and is comprised of resistors 173RS4, 173RS9, 173RS5, 173RS10, 173RS6, 173RS11, 173RS15 and 173RS17, and diodes 173D1, 173D2 and 173D3.

The vertical weighting circuit is composed of three diode and resistor networks, one such circuit coupled to the FF· or Q output of flip flop 170FF1 and including the diode 173D1 and the resistors 173RS4 and 173RS9. In a like manner, the FF. or *b* output of the "2" flip flop 170FF2 is coupled to the circuit composed of diode 173D2 and resistors 173RS5 and 173RS10, whereas, the FF. or *b* output of the "4" flip flop 170FF3 is connected to the circuit including the diode 173D3 and the resistors 173RS6 and 173RS11. For each count in the segment timing generator of FIGURE 55 there will be a unique set of signals on the input buses 173L3, 173L4 and 173L5. The set of signals for each count of the said counter is listed in FIGURE 65 in the designation of the vertical coordinate. It will be noted that the resistance values of the resistors of the above-mentioned circuits are so designed that a positive voltage on the input 173L3 will have a weight of "two," whereas, a positive signal on the inputs 173L4 and 173L5 will have a weight of only "one." Negative voltage levels on these inputs will have a weight of "zero." Accordingly, it can be seen that the vertical weighted components can have a value of anywhere from zero to four as shown in FIGURE 65. It will be noted from FIGURE 65 that the stroke labelled 6 in FIGURE 64 has a relative vertical weighting of zero for the vertical coordinate and that this compares with the chart in FIGURE 65. Also, the remaining stroke segments illustrated in FIGURE 64 have values corresponding to the chart in FIGURE 65. The output from this vertical weighting circuit is transferred along the output terminal 173R2 to the input B of the vertical amplifier 172L2. This signal will provide the relative vertical positioning of the beam of the cathode ray tube in the figure "8" box to be scanned as shown in FIGURE 64.

The horizontal segment weighting circuit is comprised of resistors 173RS7, 173RS12, 173RS8, 173RS13, 173RS16 and 173RS18, and diodes 173D4 and 173D5. The segment weighting voltages generated by the horizontal weighting circuit are developed at the output (173R3).

In a like manner to the vertical weighting circuit discussed hereinabove, the horizontal weighting circuit is composed of a first group of elements including diode 173D4 and resistors 173RS7 and 173RS12 which are coupled to the FF. or b output of the "4" flip flop 170FF3 of the segment timing generator. The diode 173D5 and resistors 173RS8 and 173RS13 which compose the second portion of the horizontal weighting circuit are coupled to the output of the FF· or Q output of the "2" flip flop 170FF2. This circuit works in the identical manner as discussed hereinabove for the vertical weighting circuit. However, the relative weight provided for each of the two component circuits is the same, that is, a relative weight of one is provided for a positive signal on either one of the input terminals 173L5 and 173L6. A positive signal on both of these terminals provides a relative weight of two. Referring now to FIGURE 65, there is set forth a chart showing all the possible combinations of input signals to the horizontal weighting circuit. It will be noted that, for the stroke labelled 6 in FIGURE 64, a weight of one is provided by a negative signal on the input of 173L5 and a positive signal on the input 173L6. The remaining combinations are set forth in the same chart. The output of this horizontal weighting circuit is taken along the output bus 173R3 to the B input 172L4 of the horizontal amplifier 172A2 (FIGURE 57) to provide the proper horizontal positioning of the cathode ray tube beam in the figure "8" to be scanned.

VERTICAL STAIRCASE GENERATOR

The negative pulse developed at the output of the one shot 166N1 at the trailing edge of the RS time period stops current flow through diode 166D4. This causes a negative voltage to be applied at the input (168L3) of the base of transistor 168Q1 through resistor 168RS3, due to cutting off of current flowing through resistor 168RS2. This negative voltage on the base of transistor 168Q1 turns transistor 168Q1 "on" and develops a positive pulse at the collector thereof.

Resistors 168RS1, 168RS5, 168RS3 and 168RS6 are biasing resistors; resistor 168RS8 is the load resistor for transistor 168Q1; and resistor 168RS9 is a current limiting resistor which serves to limit the discharging current of capacitor 168C2 through diode 168D1 and transistor 168Q1.

The positive pulse developed at the collector of transistor 168Q1 causes capacitor 168C2 to be discharged by a fractional amount. A positive "step" voltage will thereby be developed at the junction of diode 168D1 and capacitors 168C2 and 168C3 as a result of the application of the positive pulse at the collector of transistor 168Q1. This positive-going transition or "step" will be developed at the output (168R3) through capacitor 168C3. Succeeding positive pulses produced at the collector of transistor 168Q1 will serve to further discharge capacitor 168C2 and thereby develop the characteristic vertical "staircase" waveform as indicated in FIGURE 62.

The reset signal for the vertical staircase generator will also step the horizontal staircase generator at the same time. This signal is developed as follows: The W1 signal (FIGURE 6) as previously mentioned, is applied to the input (166L2) at the base of transistor 166Q2 through diode 166D2 and resistor 166RS4. The W1 signal is at a positive voltage level during the W1 time period. A negative-going transition signal developed on the input (166L1), as previously described, occurs at the end of each RS time period. However, only one of every four of these negative-going transition signals, occurring at the end of each RS time period, is passed through diode 166D2 and appears at the junction of diode 166D1 and diode 166D2. This negative-going transition signal, occurring at the end of every fourth RS time period, is developed at the junction of diodes 166D1 and 166D2 as a result of the W1 signal remaining at a positive voltage level, as applied to the input of diode 166D2.

When the W1 signal is negative, this negative voltage level will be passed through diode 166D2 and appear at the junction of diodes 166D1 and 166D2. The RS negative-going transition signal, as now produced at the end of an RS time period at the junction of diodes 166D1 and 166D2, is applied to the base of transistor 166Q2 through transistor 166RS4, turning transistor 166Q2 "on" and thus developing a positive-going transition signal at the collector thereof.

Resistor 166RS7 is a biasing resistor, whereas resistor 166RS9 is the load resistor for transistor 166Q2.

The positive-going transition signal developed at the collector of transistor 166Q2 is applied to the input of a one shot circuit 166N2, causing a negative-going transition signal to be developed at the output thereof. This negative-going transition signal is applied to the base of transistor 166Q5 through resistor 166RS12, turning transistor 166Q5 "on" and producing a positive-going transition signal at the collector thereof.

Resistor 166RS14 is a biasing resistor, whereas resistor 166RS17 is the load resistor for transistor 166Q5.

The positive-going transition signal developed at the collector of transistor 166Q5 is passed through diode 166D2 and developed at the output (166R3) thereof. This positive-going transition signal is applied to an input (168L2) of a one shot circuit 168N1 through resistor 168RS4, causing the one shot circuit 168N1 to produce a negative pulse at the output thereof. Resistor 168RS2, in conjunction with diode 166D2, forms a decoupling circuit for the signals developed at the collector of transistor 166Q5. The negative pulse developed at the output of the one shot circuit 168N1 is applied to the upper terminal of capacitor 168C2 (the junction of diode 168D1, capacitor 168C3 and capacitor 168C2), causing a charge to be developed on capacitor 168C2. Resistor 168RS10 is a current limiting resistor which serves to limit the charging current generated as a result of the charging of capacitor 168C2.

Capacitor 168C2 is, therefore, recharged by the development of signals originating with the negative-going transition signal occurring at the end of the RS time period following within each W1 time period. Resistor 168RS7, one terminal of which is connected to a −12 volt supply, and capacitor 168C1, one end of which is connected to ground (zero volts), serve to establish a stabilized −12 volt supply. This stabilized −12 volt supply is developed at the junction of resistor 168RS7 and capacitor 168C1 and is indicated on FIGURE 53 by the output terminal with a circle containing the notation −12 v.'.

HORIZONTAL STAIRCASE GENERATOR

The negative-going transition signal developed at the output (168R2) of the one shot circuit 168N1 at the end of the RS time period is applied to the input (169L1) at the base of transistor 169Q1 through the resistor 169RS2, turning transistor 169Q1 "on" and developing a positive-going transition signal at the collector thereof. This positive-going transition signal causes capacitor 169C1 to be discharged by a fractional amount through diode 169D1, transistor 169Q1 and resistor 169RS7. A positive-going "step" will, therefore, be developed at the junction of diode 169D1 and capacitor 169C1. Resistor 169RS7 is a current limiting resistor to limit the discharge current of capacitor 169C1, through diode 169D1 and transistor 169Q1.

The positive-going "step" signal developed at the junction of diode 169D1 and capacitor 169C1 is developed at the output ı(169R1) through capacitor 169C2. Resistors 169RS4, 169RS5, 169RS2 and 169RS1 are biasing resistors whereas resistor 169RS6 is a load resistor for transistor 169Q1. Capacitor 169C1 is discharged, therefore, in positive voltage increments or "steps" occurring at the end of the RS time period within every W1 time period. A series of 25 positive "steps" are thereby developed at the output (169R1).

A negative-going transition signal is applied to the input (166L3) of the base of transistor 166Q3 through diode 166D3 and resistor 166RS5 at the beginning of each H time period. Transistor 166Q3 will thereby be turned "on," developing a positive-going transition signal at the collector thereof. Resistor 166RS2 and diode 166D3 form a decoupling circuit for the H signals being applied to the input (166L3). Resistor 166RS8 is a biasing resistor, whereas resistor 166RS10 is the load resistor for transistor 166Q3.

The positive-going transition signal developed at the collector of transistor 166Q3 is applied to the input of a one shot circuit 166N3 and, thus, develops a negative pulse at the output thereof. This negative pulse is applied to the base of transistor 166Q6 through resistor 166RS15, turning transistor 166Q6 "on" and developing a positive pulse at the output thereof. This positive pulse is developed at the output (166R4) through diode 166D6. Resistor 166RS18 is a biasing resistor, whereas resistor 166RS19 is the load resistor for transistor 166Q6.

The positive pulse developed at the collector output (166R4) of transistor 166Q6 through diode 166D6 is applied to the input (169L2) of a one shot circuit 169N1, thereby producing a negative pulse at the output thereof. Resistor 169RS3, in conjunction with diode 166D6, forms a decoupling network for the signals produced at the collector of transistor 166Q6. The negative pulses developed at the output of the one shot circuit 169N1 will recharge capacitor 169C1 through diode 169D2 and resistor 169RS8. Resistor 169RS8 is a current limiting resistor which serves to limit the charging current as a result of the charging of capacitor 169C1. Capacitor 169C1 will, therefore, be charged at the beginning of each H time period.

The three-step positive staircase waveform developed at the output (168R3) is applied to the input (172L1) labelled A of the vertical amplifier circuit 172A1. The 25-step positive staircase waveform developed at the output (169R1) is applied to the input (172L3) labelled A of the horizontal amplifier circuit 172A2. These staircase waveforms are then mixed in the vertical and horizontal amplifiers with the segment generating and positioning signals which are developed as set forth hereinabove.

The positive-going "staircase" waveforms applied to inputs (172L1) and (172L3), and the segment generating and "weighting" voltages applied to the inputs (172L2) and (172L4), as previously described, are mixed in the deflection amplifiers 172A1 and 172A2 in a manner which generates the required character shape and positioning as viewed on the cathode ray tube.

A character slant adjust circuit is provided by the circuit comprised of transistor 172Q1, resistors 172RS1 and 172RS2 and capacitors 172C1 and 172C2. The output labelled C of the vertical deflection amplifier 172A1 is connected to the base of transistor 172Q1. The signal developed across the emitter resistor 172RS1 of transistor 172Q1 is applied to the input labelled C of the horizontal deflection amplifier 172A2 through capacitor 172C1 and transistor 172RS2 and capacitor 172C2.

The vertical deflection signals produced by the vertical deflection amplifier 172A1 are applied to the vertical deflection plates of the cathode ray tube through the outputs (172R1) and (172R2). The horizontal deflection signals produced by the horizontal deflection amplifier 172A2 are transferred to the horizontal deflection plates of the cathode ray tube through the outputs (172R3) and (172R4).

The voltages necessary for the proper operation of the display circuit are generated by the power supply illustrated in FIGURES 59 and 60. 117 volts AC is applied to the inputs (174L2) and (174L3) of the transformer 174T1. The transformer 174T1 provides the following voltages for operation of the display circuit; 30 volts RMS at 120 milliamps across the secondary winding indicated by the outputs (174R1) and (174R2), 90 volts RMS at 50 milliamps across the secondary winding indicated by the outputs (174R3) and (174R4), 1,700 volts RMS at 3 milliamps across the secondary winding indicated at one end by the junction of resistor 174RS1 and diode 174D1 and the other end by a ground connection and 6.3 volts (for the operation of the filament in the cathode ray tube) across the secondary winding indicated by the outputs (174R7) and (174R8).

Further control of the cathode ray tube display is developed by the voltages and signals appearing at the outputs (174R5) and (174R6) of the circuitry comprised of resistors 174RS1 through 174RS12 and resistors 174RS14 through 174RS23, diodes 174D1 through 174D14, and capacitors 174C1, 174C2 and 174C4. The 30 volts RMS developed at the output (174R1) and (174R2) is applied to the inputs (175L1) and (175L2) of a −12 volt DC power supply comprised of transistors 175Q1 and 175Q4 and resistors 175RS1, 175RS4 and 175RS8 and diodes 175D1 and 175D2 and capacitors 175C1 and 175C4. A −12 volts is produced at the emitter of transistor 175Q4 serving as the output for the power supply circuit. The 30 volts RMS developed at the outputs (174R1) and (174R2) is also applied to a +12 volt DC power supply circuit comprised of the transistor 175Q3, resistors 175RS5, 175RS2 and 175RS6, and diodes 175D5 and 175D6 and capacitors 175C2 and 175C5. An additional voltage supply circuit to develop a −90 volts DC is comprised of the transistors 175Q2 and 175Q5 and resistors 175RS3, 175RS7, 175RS9 and 175RS10 and diodes 175D3 and 175D4 and capacitors 175C3 and 175C6. The 90 volt RMS developed at the outputs (174R3) and (174R4) is applied to the inputs (175L3) and (175L4) of the −90 volt DC supply. An additional cathode ray tube control voltage is developed at resistor 175RS10 and is produced at the output (175R4).

All values of capacitance, where not otherwise provided, are in micromicrofarads. Typical values of circuit components used in the preferred embodiment of the invention, other than the circuit values provided in the drawings are as follows:

The capacitor C4 in one shot type I (FIGURE 28) is optional.

The diodes in the typical gate circuit of FIGURE 36 are type IN662.

In addition to the above, circuit elements provided in the drawings have values as follows:

| Resistor No.: | Resistance (in ohms) | Resistor No.: | Resistance (in ohms) |
|---|---|---|---|
| 137RS1 | 47K | 161RS10 | 820 |
| 160RS1 | 6.8K | 161RS11 | 1K |
| 160RS2 | 6.8K | 162RS1 | 5.6K |
| 160RS3 | 6.8K | 162RS2 | 5.6K |
| 160RS4 | 6.8K | 162RS3 | 5.6K |
| 160RS5 | 10K | 162RS4 | 5.6K |
| 160RS6 | 10K | 162RS5 | 5.6K |
| 160RS7 | 10K | 162RS6 | 5.6K |
| 160RS8 | 10K | 162RS7 | 5.6K |
| 160RS9 | 10K | 162RS8 | 5.6K |
| 160RS10 | 10K | 162RS9 | 5.6K |
| 160RS11 | 10K | 16 RS10 | 5.6K |
| 160RS12 | 33K | 162RS11 | 5.6K |
| 160RS13 | 33K | 162RS12 | 5.6K |
| 160RS14 | 33K | 163RS1 | 12K |
| 160RS15 | 33K | 163RS2 | 12K |
| 160RS16 | 33K | 163RS3 | 12K |
| 160RS17 | 33K | 163RS4 | 12K |
| 160RS18 | 33K | 163RS5 | 12K |
| 161RS1 | 12K | 163RS6 | 12K |
| 161RS2 | 6.8K | 163RS7 | 12K |
| 161RS3 | 22K | 163RS8 | 33K |
| 161RS4 | 12K | 163RS9 | 33K |
| 161RS5 | 3.3K | 163RS10 | 33K |
| 161RS6 | 6.8K | 163RS11 | 33K |
| 161RS7 | 6.8K | 163RS12 | 33K |
| 161RS8 | 22K | 163RS13 | 33K |
| 161RS9 | 22K | 163RS14 | 33K |

| Resistor No.: | Resistance (in ohms) | Resistor No.: | Resistance (in ohms) |
|---|---|---|---|
| 165RS1 | 12K | 171RS5 | 4.7K |
| 165RS2 | 12K | 171RS6 | 6.8K |
| 165RS3 | 6.8K | 171RS7 | 2.2K |
| 165RS4 | 6.8K | 171RS8 | 470 |
| 165RS5 | 22K | 171RS9 | 47 |
| 165RS6 | 22K | 171RS10 | 680 |
| 165RS7 | 2.2K | 171RS11 | 470 |
| 165RS8 | 2.7K | 171RS12 | 330 |
| 165RS9 | 10K | 171RS13 | 6.8K |
| 166RS1 | 6.8K | 171RS14 | 6.8K |
| 166RS2 | 12K | 172RS1 | 5K |
| 166RS3 | 22K | 172RS2 | 10K |
| 166RS4 | 8.2K | 173RS1 | 2.2K |
| 166RS5 | 6.8K | 173RS2 | 6.8K |
| 166RS6 | 2.2K | 173RS3 | 15K |
| 166RS7 | 33K | 173RS4 | 1.8K |
| 166RS8 | 22K | 173RS5 | 3.3K |
| 166RS9 | 10K | 173RS6 | 3.3K |
| 166RS10 | 2.2K | 173RS7 | 3.3K |
| 166RS11 | 10K | 173RS8 | 3.3K |
| 166RS12 | 6.8K | 173RS9 | 3.3K |
| 166RS13 | 22K | 173RS10 | 6.8K |
| 166RS14 | 22K | 173RS11 | 6.8K |
| 166RS15 | 6.8K | 173RS12 | 6.8K |
| 166RS16 | 2.2K | 173RS13 | 6.8K |
| 166RS17 | 2.2K | 173RS14 | 22K |
| 166RS18 | 22K | 173RS15 | 500 |
| 166RS19 | 2.2K | 173RS16 | 1K |
| 167RS1 | 8.2K | 173RS17 | 330 |
| 167RS2 | 22K | 173RS18 | 330 |
| 167RS3 | 1K | 174RS1 | 820K |
| 167RS4 | 3.3K | 174RS2 | 820K |
| 167RS5 | 10K | 174RS3 | 820K |
| 167RS6 | 2.2K | 174RS4 | 820K |
| 167RS7 | 6.8K | 174RS5 | 820K |
| 167RS8 | 10K | 174RS6 | 820K |
| 167RS9 | 22K | 174RS7 | 820K |
| 167RS10 | 22K | 174RS8 | 820K |
| 167RS11 | 2.2K | 174RS9 | 820K |
| 167RS12 | 6.8K | 174RS10 | 820K |
| 167RS13 | 22K | 174RS11 | 820K |
| 167RS14 | 3.9K | 174RS12 | 820K |
| 168RS1 | 2.2K | 174RS13 | 100K |
| 168RS2 | 2.2K | 174RS14 | 150K |
| 168RS3 | 4.7K | 174RS15 | 560K |
| 168RS4 | 470 | 174RS16 | 500K |
| 168RS5 | 56K | 174RS17 | 820K |
| 168RS6 | 1.2K | 174RS18 | 2.2M |
| 168RS7 | 470 | 174RS19 | 820K |
| 168RS8 | 56K | 174RS20 | 250K |
| 168RS9 | 220 | 174RS21 | 820K |
| 168RS10 | 10 | 174RS22 | 1M |
| 169RS1 | 180 | 174RS23 | 220K |
| 169RS2 | 1.2K | 175RS1 | 18K |
| 169RS3 | 2.2K | 175RS2 | 18K |
| 169RS4 | 56K | 175RS3 | 27K |
| 169RS5 | 1.2K | 175RS4 | 33K |
| 169RS6 | 56K | 175RS5 | 82 |
| 169RS7 | 820 | 175RS6 | 33K |
| 169RS8 | 10 | 175RS7 | 220K |
| 171RS1 | 2.2K | 175RS8 | 3.3K |
| 171RS2 | 220 | 175RS9 | 33K |
| 171RS3 | 4.7K | 175RS10 | 20K |
| 171RS4 | 6.8K | | |

| Capacitor No. | Capacitance | Capacitor No. | Capacitance |
|---|---|---|---|
| 137C1 | μμf 150 | 168C1 | μf 200 |
| 161C1 | μμf 330 | 168C2 | μf 0.15 |
| 161C2 | μμf 330 | 168C3 | μf 0.47 |
| 165C1 | μμf 330 | 169C1 | μf 0.47 |
| 165C2 | μμf 330 | 169C2 | μf 0.47 |
| 167C1 | μμf 100 | 171C1 | μf .01 |
| 167C2 | μf .001 | 171C2 | μμf 680 |

| Capacitor No. | Capacitance | Capacitor No. | Capacitance |
|---|---|---|---|
| 167C3 | μf 500 | 171C3 | μμf 330 |
| 171C4 | μμf 330 | 174C4 | μf 0.5 |
| 171C5 | μf 100 | 175C1 | μf 100 |
| 171C6 | μf .033 | 175C2 | μf 100 |
| 172C1 | μμf 62 | 175C3 | μf 15 |
| 172C2 | μf .01 | 175C4 | μf 100 |
| 174C1 | μf 0.5 | 175C5 | μf 100 |
| 174C2 | μf 0.5 | 175C6 | μf 30 |
| 174C3 | μf .005 | | |

Inductor No. (Inductance):
171L1: 1 millihenry.

Cathode Ray Tube 5DEP1.

All transistors are type 2N1305 except the following:

| Transistor No: | Transistor type | Transistor No: | Transistor type |
|---|---|---|---|
| 172Q1 | 2N1304 | 175Q3 | 2N1304 |
| 173Q1 | 2N398A | 175Q4 | 2N669 |
| 175Q2 | 2N398A | 175Q5 | 2N669 |

Magnetic Drum

Bryant-Utility Magnetic Memory Drum Model C-105.

All diodes are type 1N662 except as follows:

| Diode No.: | Diode Type | Diode No.: | Diode Type |
|---|---|---|---|
| 171D4 | 1N192 | 174D11 | D1-56 |
| 171D5 | 1N192 | 174D12 | D1-56 |
| 174D1 | D1-56 | 174D13 | D1-56 |
| 174D2 | D1-56 | 174D14 | D1-56 |
| 174D3 | D1-56 | 175D1 | D1-56 |
| 174D4 | D1-56 | 175D2 | D1-56 |
| 174D5 | D1-56 | 175D2 | D1-56 |
| 174D6 | D1-56 | 175D3 | D1-56 |
| 174D7 | D1-56 | 175D4 | D1-56 |
| 174D8 | D1-56 | 175D5 | D1-56 |
| 174D9 | D1-56 | 175D6 | D1-56 |
| 174D10 | D1-56 | | |

The following list sets forth the components of the circuit diagram (FIGURES 42 to 60) which are included in the various blocs of the logic diagram (FIGURES 10 to 17) and is to be utilized to locate and identify the contents of the various blocks of the logic diagram on the circuit diagram.

BLOCK DIAGRAM TO CIRCUIT DIAGRAM

*Conversion list*

M/U-2.1 (FIGURE 13)
    FIGURE 46: 145RA1
M/U-5.1 (FIGURE 10)
    FIGURE 43: 138RA1
M/U-5.2 (FIGURE 10)
    FIGURE 43: 138RA2
M/U-5.3 (FIGURE 10)
    FIGURE 42: All
    FIGURE 43: All, except 138RA1, 138RA2
    FIGURE 44: All
D/U-1.1 (FIGURE 13)
    FIGURE 45: 160FF1
D/U-1.2 (FIGURE 13)
    FIGURE 45: 160FF2
D/U-1.3 (FIGURE 13)
    FIGURE 45: 160FF3
D/U-1.4 (FIGURE 13)
    FIGURE 45: 160FF4
D/U-1.5 (FIGURE 13)
    FIGURE 46: 161D2, 161D3, 161RS4, 161C2, 161RS6, 161RS9, 161RS11, 161Q3
D/U-1.6 (FIGURE 13)
    FIGURE 46: 161N1
D/U-1.7 (FIGURE 13)
    FIGURE 52: 167N2
D/U-2.1 (FIGURE 11)
    FIGURE 52: 167N2, 167Q5
D/U-2.2 (FIGURE 11)
    FIGURE 47: 162RS1, 162D1

D/U-2.3 (FIGUURE 11)
 FIGURE 47: 162D2, 162RS2
D/U-2.4 (FIGURE 11)
 FIGURE 47: 162D3, 162D4, 162RS3
D/U-2.5 (FIGURE 11)
 FIGURE 47: 162D5, 162D6, 162RS4
D/U-2.6 ( FIGURE 11)
 FIGURE 47: 162D7, 162D8, 162RS5
D/U-2.7 (FIGURE 11)
 FIGURE 47: 162D9, 162D10, 162RS6
D/U-2.8 (FIGURE 12)
 FIGURE 47: 162D11, 162D12, 162RS7
D/U-2.9 (FIGURE 12)
 FIGURE 47: 162D13, 162D14, 162RS8
D/U-2.10 (FIGURE 12)
 FIGURE 47: 162D15, 162D16, 162RS9
D/U-2.11 (FIGURE 12)
 FIGURE 47: 162D17, 162D18, 162RS10
D/U-2.12 (FIGURE 12)
 FIGURE 47: 162D19, 162D20, 162RS11
D/U-2.13 (FIGURE 12)
 FIGURE 47: 162D21, 162D22, 162RS12
D/U-2.14 (FIGURE 14)
 FIGURE 48: 163D1, 163D2, 163D3, 163D4, 163RS1, 163RS8, 163Q1
D/U-2.15 (FIGURE 14)
 FIGURE 48: 163D5, 163D6, 163D7, 163D8, 163RS2, 163RS9, 163Q2
D/U-2.16 (FIGURE 14)
 FIGURE 48: 163D9, 163D10, 163D11, 163RS3, 163RS10, 163Q3
D/U-2.17 (FIGURE 14)
 FIGURE 48: 163D12, 163D13, 163RS4, 163RS11, 163Q4
D/U-2.18 (FIGURE 14)
 FIGURE 48: 163D15, 163D16, 163D17, 163D14, 163RS5, 163RS12, 163Q5
D/U-2.19 (FIGURE 14)
 FIGURE 48: 163D18, 163D19, 163D20, 163D21, 163RS6, 163RS13, 163Q6
D/U-2.20 (FIGURE 14)
 FIGURE 48: 163D22, 163D23, 163D24, 163D25, 163RS7, 163RS14, 163Q7
D/U-3.1 (FIGURE 15)
 FIGURE 49: 164FF1
D/U-3.2 (FIGURE 15)
 FIGURE 49: 164FF2
D/U-3.3 (FIGURE 15)
 FIGURE 49: 164FF3
D/U-3.4 (FIGURE 15)
 FIGURE 49: 164FF4
D/U-3.5 (FIGURE 15)
 FIGURE 49: 164FF5
D/U-3.6 (FIGURE 15)
 FIGURE 49: 164FF6
D/U-3.7 (FIGURE 15)
 FIGURE 49: 164FF7
D/U-3.8 (FIGURE 15)
 FIGURE 52: 167RS4, 167C2, 167RS5, 167RS6, 167RS8, 167RS10, 167RS11, 167Q3, 167C3, 167RS12, 167RS13, 167RS14, 167Q6, 167D4, 167Q2
D/U-3.9 (FIGURE 15)
 FIGURE 52: 167N1
D/U-3.10 (FIGURE 15)
 FIGURE 52: 167RA1, 167C1, 167RS1, 167RS2, 167RS3, 167Q1
D/U-4.1 (FIGURE 15)
 FIGURE 51: 166D3, 166RS2, 166RS5, 166RS10, 166RS8, 166Q3, 166N3, 166RS15, 166RS18, 166RS19, 166D6, 166Q6
D/U-4.2 (FIGURE 15)
 FIGURE 51: 166RS1, 166RS3, 166RS6, 166Q1
D/U-4.3 (FIGURE 15)
 FIGURE 51: 166N1
D/U-4.4 (FIGURE 15)
 FIGURE 51: 166RS11, 166RS13, 166RS16, 166Q4
D/U-4.5 (FIGURE 15)
 FIGURE 51: 166D1, 166RS4, 166RS7, 166RS9, 166Q2
D/U-4.6 (FIGURE 15)
 FIGURE 51: 166N2, 166RS12, 166RS14, 166RS17, 166D2, 166Q5
D/U-4.7 (FIGURE 16)
 FIGURE 53: All
D/U-4.8 (FIGURE 16)
 FIGURE 54: All
D/U-4.9 (FIGURE 16)
 FIGURE 55: 170FF1, 170D1
D/U-4.10 (FIGURE 16)
 FIGURE 55: 170FF2, 170D2
D/U-4.11 (FIGURE 16)
 FIGURE 55: 170FF3, 170D3
D/U-4.12 (FIGURE 16)
 FIGURE 55: 170FF4, 170D4
D/U-4.13 (FIGURE 17)
 FIGURE 58: 173D1, 173RS4, 173RS9, 173D2, 173RS5, 173RS10, 173D3, 173RS6, 173RS11, 173RS15, 173RS17
D/U-4.14 (FIGURE 17)
 FIGURE 58: 173D4, 173RS7, 173RS12, 173D5, 173RS8, 173RS13, 173RS16, 173RS18
D/U-5.1 (FIGURE 15)
 FIGURE 52: 167D1, 167D2, 167D3, 167RS7, 167RS9, 167Q4
D/U-5.2 (FIGURE 17)
 FIGURE 56: 171D1, 171D2, 171D3, 171RS1
D/U-5.3 (FIGURE 17)
 FIGURE 56: 171RS9, 171C5, 171RS2, 171C1, 171C2, 171L1, 171Q1, 171RS7, 171C6, 171RS13, 171RS14
D/U-5.4 (FIGURE 17)
 FIGURE 56: 171D5, 171RS3, 171D6, 171RS4, 171C3
D/U-5.5 (FIGURE 17)
 FIGURE 56: 171D4, 171RS5, 171D7, 171RS6, 171C4
D/U-5.6 (FIGURE 17)
 FIGURE 56: 171RS12, 171RS10
D/U-5.7 (FIGURE 17)
 FIGURE 56: 171RS11, 171RS8
D/U-5.8 (FIGURE 17)
 FIGURE 56: 171RS1
D/U-6.1 (FIGURE 17)
 FIGURE 57: 172A1
D/U-6.2 (FIGURE 17)
 FIGURE 57: 172A2
D/U-6.3 (FIGURE 17)
 FIGURE 57: 172Q1, 172RS1, 172C1, 172RS2, 172C2
D/U-7.0 (FIGURE 17)
 C.R.T. FIGURE 60a
D/U-8.0 (FIGURE 15)
 FIGURE 58: 173RS1, 173RS2, 173RS3, 173RS14, 173Q1
 FIGURE 59: 174RS13, 174RS18, 174C3, 174C4, 174D13, 174D14
D/U-8.1 (FIGURE 11)
 FIGURE 50: 165D2, 165RS2, 165C2, 165RS4, 165RS6, 165RS8, 165Q2
D/U-8.2 (FIGURE 15)
 FIGURE 50: 165D1, 165RS1, 165C1, 165RS3, 165RS5, 165Q1, 165RS7, 165Q3, 165RS9

Though the invention has been described with respect to a specific preferred embodiment, many modifications and variations thereof will immediately become apparent to those skilled in the art. It is therefore the intention that the appended claims be interpreted as broadly as possible in view of the prior art to encompass all such modifications and variations.

What is claimed is:

1. A cathode ray tube beam positioning circuit which includes, in combination, a binary counter having a plurality of bistable devices and a plurality of output terminals, shift means coupled to said binary counter for altering the count therein and means responsive to the condition of predetermined ones of said output terminals for providing a beam positioning signal in accordance with the condition of said predetermined ones of said output terminals, said last-named means including a first summing means for providing a first summing indication, said first summing means having means responsive to a predetermined condition on a first one of said predetermined output terminals to provide a first partial sum indication, and means responsive to a predetermined condition on a second one of said predetermined output terminals to provide a second partial sum indication, said partial sums forming said first summing indication, and said first partial sum being a multiple of said second partial sum.

2. A cathode ray tube beam positioning circuit as set forth in claim 1, further including a second summing means responsive to other predetermined ones of said output terminals for providing a second summing indication, said second summing means having means responsive to a predetermined condition on a first one of said other predetermined output terminals to provide a first partial sum indication, and means responsive to a predetermined condition on a second one of said other predetermined output terminals to provide a second partial sum indication, said partial sums forming said second summing indication.

3. A cathode ray tube beam positioning circuit as set forth in claim 2, further including inhibit means responsive to a first change in the binary state of a predetermined one of said bistable devices for inhibiting the output from said first summing circuit and responsive to a second change in the binary state of said predetermined one of said bistable devices for inhibiting the output from said second summing circuit.

4. A cathode ray tube beam positioning circuit as set forth in claim 3, wherein said inhibit means includes a bistable device responsive to the change in the binary state of said predetermined one of said bistable devices.

5. A cathode ray tube beam positioning circuit which includes, in combination, a binary counter having a plurality of bistable devices and a plurality of output terminals, shift means coupled to said binary counter for altering the count therein and means responsive to the condition of predetermined ones of said output terminals for providing a beam positioning signal in accordance with the condition of said predetermined ones of said output terminals, said last-named means including a first summing means for providing a first summing indication, said first summing means having means responsive to a predetermined condition on a first one of said predetermined output terminals to provide a first partial sum indication, and means responsive to a predetermined condition on a second one of said predetermined output terminals to provide a second partial sum indication, said partial sums forming said first summing indication, a second summing means responsive to other predetermined ones of said output terminals for providing a second summing indication, said second summing means having means responsive to a predetermined condition on a first one of said other predetermined output terminals to provide a first partial sum indication, means responsive to a predetermined condition on a second one of said other predetermined output terminals to provide a second partial sum indication, said partial sums forming said second summing indication, and inhibit means responsive to a first change in the binary state of a predetermined one of said bistable devices for inhibiting the output from said first summing means and responsive to a second change in the binary state of said predetermined one of said bistable devices for inhibiting the output from said second summing means.

6. A cathode ray tube beam positioning circuit as set forth in claim 5, wherein said inhibit means includes a bistable device responsive to the change in the binary state of said predetermined one of said bistable devices.

7. A cathode ray tube beam positioning circuit which includes, in combination, a first beam positioning means, a second beam positioning means, a first staircase wave generator, a second staircase wave generator, means responsive to said first beam positioning means and said first staircase generator for providing a first deflection signal, means responsive to said second beam positioning means and said second staircase generator for providing a second deflection signal, said first beam positioning means including first means for providing a weighted signal, a bistable means, first means responsive to a first stable state of said bistable means for providing an oscillatory signal, and means for mixing said weighted signal and said oscillatory signal.

8. A cathode ray tube beam positioning circuit as set forth in claim 7, wherein said second beam positioning means includes second means for providing a weighted signal, second means responsive to a second stable state of said bistable means for providing an oscillatory signal, and means for mixing said weighted signal and said oscillatory signal.

9. A stroke-providing means for a cathode ray tube beam which includes vertical deflection means and horizontal deflection means, said vertical deflection means including a sinusoidal wave generator for providing a first and second sinusoidal output signal, a vertical staircase generator and means responsive concurrently to said first sinusoidal output signal and said vertical staircase generator for providing a sinusoidally varying vertical deflection signal.

10. A stroke-providing means as set forth in claim 9, further including means responsive to a first predetermined condition for inhibiting said first sinusoidal output signal.

11. A stroke-providing means as set forth in claim 9, wherein said horizontal deflection means includes a horizontal staircase generator, further including means responsive concurrently to said second sinusoidal output signal and said horizontal staircase generator for providing a sinusoidally varying horizontal deflection signal.

12. A stroke-providing means as set forth in claim 10, wherein said horizontal deflection means includes a horizontal staircase generator, further including means responsive concurrently to said second sinusoidal output signal and said horizontal staircase generator for providing a sinusoidally varying horizontal deflection signal.

13. A stroke-providing means as set forth in claim 12, further including means responsive to a second said predetermined condition for inhibiting said second sinusoidal output signal.

14. A stroke-providing means as set forth in claim 9, further including means responsive to a first predetermined condition for inhibiting said first sinusoidal output signal.

15. A stroke-providing means for a cathode ray tube beam which includes horizontal deflection means and vertical deflection means, said horizontal deflection means including a sinusoidal wave generator for providing a first and second sinusoidal output signal, a horizontal staircase generator and means responsive concurrently to said first sinusoidal output signal and said horizontal staircase generator for providing a sinusoidally varying horizontal deflection signal.

16. A method of positioning a cathode ray tube beam, which includes the steps of generating a first signal indicative of the vertical stroke position of the beam, generating a second signal indicative of the horizontal stroke position of the beam, adding a first oscillatory signal to said signal indicative of the vertical stroke position of the beam, adding a second oscillatory signal to said signal indicative of the horizontal stroke position of the beam, inhibiting said first oscillatory signal in response to the occurrence of a first of two possible conditions, inhibiting said second oscillatory signal in response to the occurrence of the second of said two possible conditions, generating a vertical beam position signal, generating a horizontal beam position signal, mixing the vertical stroke position signal and the vertical beam position signal to proved a vertical deflection signal, and mixing the horizontal stroke position signal and the horizontal beam position signal to provide a horizontal deflection signal.

References Cited

UNITED STATES PATENTS

| | | | |
|---|---|---|---|
| 3,292,034 | 12/1966 | Braaten | 315—19 X |
| 3,336,497 | 8/1967 | Osborne | 315—18 |

RODNEY D. BENNETT, JR., *Primary Examiner.*

BRIAN L. RIBANDO, *Assistant Examiner.*

U.S. Cl. X.R.

340—324

UNITED STATES PATENT OFFICE
CERTIFICATE OF CORRECTION

Patent No. 3,430,095 February 25, 1969

Jack J. Bialik et al.

It is certified that error appears in the above identified patent and that said Letters Patent are hereby corrected as shown below:

Column 3, line 9, "therefore" should read -- therefor --. Column 1, line 39, "displaced" should read -- displayed --. Column 4 line 34, "dipslay" should read -- display --; line 35, "magentic materal" should read -- magnetic material --; line 58, "reprsented" should read -- represented --; line 59, "deail" should read -- detail --. Column 5, line 23, "repectively" should read -- respectively --. Column 7, line 36, "poistive" should read -- positive --; line 45, "1388T3" should read -- 138T3 --; line 60, "The" should read -- This --; line 64, "condtion" should read -- condition --. Column 8, line 19, "indicate" should read -- indicates --; line 22, "occurence" should read -- occurrence --; lines 40 and 41, cancel "and output terminals are defined to indicate the type of input". Column 9, line 18, "regsters" should read -- registers --; line 37, "transistion" should read -- transition --. Column 11, line 59, "D/U-2.17" should read -- D/U-2.16 --; line 64, "D/U-2.7" should read -- D/U-2.17 --. Column 12, line 6, "D/U2.6" should read -- D/U-2.6 --. Column 13, line 57, "enable" should read -- enabled --; line 69, "displaced" should read -- displayed --. Column 14, line 21, "bottom most" should read -- bottom-most --; line 49, "election" should read -- electron --. Column 15, line 32, "FIGURES" should read -- FIGURE --; line 60, "settinng" should read -- setting --. Column 16, line 50, "pigment" should read -- segment --; line 54, "FF" should read -- FF˙ --. Column 17, line 11, "SEG 1." should read -- SEG 1˙ --. Column 18, line 33, "sucecssive" should read -- successive --. Column 20, line 60, "inal" should read -- minal --; line 61, "outpu" should read -- output --; line 75, "capacitors" should read -- capacitor --. Column 21, line 48, "cause" should read -- caused --. Column 23, line 34, "transistion" should read -- transition --; line 43, "transistion" should read -- transition --; line 59, "pulses" should read -- pulse --. Column 24, line 5, "transistion" should read -- transition --; line 8, "transistion" should read -- transition --; line 14, "C", each occurrence, should read -- c --; line 21, "letter" should read -- letters --; line 37, "transistion" should read -- transition --. Column 25, line 10, cancel "until capacitor", second occurrence; line 26, "optical" should read -- optional --. Column 26, line 73, "input" should read -- output --. Column 27, line 73, "transisor" should read -- transistor --. Column 29, line 36, "generator" should read -- generation --. Column 31, line 38, "transistion" should read -- transition --; line 64, "160Q2" should read -- 160Q3 --. Column 32, line 41, "transistion" should read -- transition --; line 54, "transitsor" should read -- transistor --. Column 35, line 33, "tector" should read -- lector --. Column 36, line 30, "flop", first occurrence, should read -- flip --. Column 37, line 39, "cellector" should read -- collector --; line 63, "(170R8" should read -- (170R8) --. Column 38, line 20, "thte" should read -- the --. Column 42, line 59, "16 RS10"

should read -- 162RS10 --. Column 45, line 1, "FIGUURE" should read -- FIGURE --. Column 46, line 4, after "166D1" insert -- 166D2, --. Column 9, line 9, "proved" should read -- provided --.

Signed and sealed this 7th day of April 1970.

(SEAL)
Attest:

EDWARD M. FLETCHER, JR.
Attesting Officer

WILLIAM E. SCHUYLER, JR
Commissioner of Patents